US012119871B1

(12) United States Patent
Chaffee et al.

(10) Patent No.: US 12,119,871 B1
(45) Date of Patent: Oct. 15, 2024

(54) REDUCING SCINTILLATION NOISE IN FREE SPACE OPTICAL COMMUNICATIONS

(71) Applicant: Attochron, LLC, Lexington, VA (US)

(72) Inventors: Thomas M. Chaffee, Lexington, VA (US); Wayne H. Knox, Rochester, NY (US); Alexander B. LeBon, Lexington, VA (US); Brian M. Gregory, Lexington, VA (US); Taz M. Colangelo, Lexington, VA (US)

(73) Assignee: Attochron, LLC, Lexington, VA (US)

( * ) Notice: Subject to any disclaimer, the term of this patent is extended or adjusted under 35 U.S.C. 154(b) by 0 days.

(21) Appl. No.: 18/763,291

(22) Filed: Jul. 3, 2024

Related U.S. Application Data

(63) Continuation of application No. 18/583,825, filed on Feb. 21, 2024, which is a continuation of application No. 18/355,398, filed on Jul. 19, 2023, now Pat. No. 11,942,988, which is a continuation of application No. 18/164,947, filed on Feb. 6, 2023, now Pat. No. 11,757,529, which is a continuation of application No. 17/932,364, filed on Sep. 15, 2022, now Pat. No. 11,575,433.

(51) Int. Cl.
H04B 10/112 (2013.01)

(52) U.S. Cl.
CPC ..... *H04B 10/1123* (2013.01); *H04B 10/1129* (2013.01)

(58) Field of Classification Search
None
See application file for complete search history.

(56) References Cited

U.S. PATENT DOCUMENTS

2013/0182620 A1* 7/2013 Chaffee ................. H04J 14/06
398/43

* cited by examiner

Primary Examiner — David W Lambert
(74) Attorney, Agent, or Firm — Scale LLP

(57) ABSTRACT

In some embodiments, an optical communication system may include an optical source, a modulator, and a photoreceiver. The optical source may be configured to generate a beam comprising a series of light pulses each having a duration of less than 100 picoseconds. The photoreceiver may have a detection window duration of less than 1 nanosecond. When a first pulse travels through a variably refractive medium, photons in the first pulse may be refracted to travel along different ray paths to arrive at the photoreceiver according to a temporal distribution curve. A full width at half maximum (FWHM) value of the temporal distribution curve may be at least three times as large as a coherence time value of the first pulse, and the detection window of the photoreceiver may be at least six times as large as the FWHM value of the temporal distribution curve.

20 Claims, 41 Drawing Sheets

REDUCING SCINTILLATION NOISE IN FREE SPACE OPTICAL COMMUNICATIONS

CROSS-REFERENCE TO RELATED APPLICATION(S)

This application is a continuation of U.S. application Ser. No. 18/583,825, filed Feb. 21, 2024.

U.S. application Ser. No. 18/583,825, filed Feb. 21, 2024, is a continuation of U.S. application Ser. No. 18/355,398, filed Jul. 19, 2023, now issued as U.S. Pat. No. 11,942,988, on Mar. 26, 2024.

U.S. application Ser. No. 18/355,398, filed Jul. 19, 2023, is a continuation of U.S. application Ser. No. 18/164,947, filed Feb. 6, 2023, now issued as U.S. Pat. No. 11,757,529, on Sep. 12, 2023.

U.S. application Ser. No. 18/164,947, filed Feb. 6, 2023, is a continuation of U.S. application Ser. No. 17/932,364, filed Sep. 15, 2022, now issued as U.S. Pat. No. 11,575,433, on Feb. 7, 2023.

The contents of each of the above referenced applications are hereby incorporated by reference in its entirety.

FIELD OF THE DISCLOSURE

The subject matter described herein relates to free-space optical (FSO) wireless transmission including optical communications, remote-sensing, laser ranging, power beaming, etc., and more particularly, to enhanced optical transport efficiencies that can be realized for wavelength propagation using ultra-short-pulse-laser (USPL) sources for beam propagation through a variably refractive medium such as the Earth's atmosphere.

BACKGROUND

FSO communications have potential to greatly increase data throughput, decrease cost, and increase access for high-speed internet and other communications technologies. To date, however, FSO communication systems have had limited operational success due to atmospheric interference, which reduces the distance over which data can be optically transmitted and introduces bit errors. Meanwhile, alternative communications technologies, such as radiofrequency and microwave communications, face significant spectrum limitations and cannot be used to deliver sufficient data to meet demand. Currently available optical systems are not able to produce sufficiently accurate, reliable, and available data transmission results that can reliably offload communications demand from these radiofrequency and microwave systems and improve data transmission and access, nor can currently available optical systems transmit data over long distances.

Accordingly, there is a need for optical communication systems that can provide highly reliable, highly available data transmission over long distances. Further, there is a need for optical communication that can reliably transmit data over long distances, such as half a mile or more.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, an optical communication system for optically transmitting data through a variably refractive medium may include an optical source, a modulator, and a photoreceiver. The optical source may be configured to generate a beam comprising a series of light pulses each having a duration of less than 100 picoseconds. The modulator may be configured to modulate the series of light pulses in response to a data transmission signal, thereby encoding transmission data into the series of light pulses. The photoreceiver may have a detection window duration of less than 1 nanosecond and a detection threshold. The photoreceiver may be configured to indicate whether a received optical energy during a given detection window is greater than the detection threshold. The series of light pulses may include a first light pulse having a coherence length of less than 400 microns. When the first pulse travels through the variably refractive medium, photons in the first pulse may be refracted to travel along different ray paths having different lengths to the photoreceiver, and the photons of the first pulse may arrive at the photoreceiver according to a temporal distribution curve that depends, at least in part, on the duration of the first pulse and the lengths of the different ray paths taken by the photons in the first pulse to the photoreceiver. A full width at half maximum (FWHM) value of the temporal distribution curve may be at least three times as large as a coherence time value equal to the coherence length of the first pulse divided by the speed of light through the variably refractive medium, and the detection window of the photoreceiver may be at least six times as large as the FWHM value of the temporal distribution curve.

In some embodiments, a laser ranging system may include an optical source and a photoreceiver. The optical source may be configured to generate a beam comprising a series of light pulses each having a duration of less than 100 picoseconds. The photoreceiver may have a detection window duration of less than 1 nanosecond and a detection threshold. The photoreceiver may be configured to indicate whether a received optical energy during a given detection window is greater than the detection threshold. The series of light pulses may include a first light pulse having a coherence length of less than 400 microns. When the first pulse travels through the variably refractive medium, photons in the first pulse may be refracted to travel along different ray paths having different lengths to the photoreceiver. The photons of the first pulse may arrive at the photoreceiver according to a temporal distribution curve that depends, at least in part, on the duration of the first pulse and the lengths of the different ray paths taken by the photons in the first pulse to the photoreceiver. A full width at half maximum (FWHM) value of the temporal distribution curve may at least three times as large as a coherence time value equal to the coherence length of the first pulse divided by the speed of light through the variably refractive medium, and the detection window of the photoreceiver may be at least six times as large as the FWHM value of the temporal distribution curve. The laser ranging system may be configured to transmit the series of light pulses toward a surface, receive at least a portion of the series of light pulses that have been reflected by the surface, and, based on a time of flight of the received portion of the series of light pulses, determine a distance of at least a portion of the surface from the laser ranging system.

Further variations encompassed within the systems and methods are described in the detailed description of the invention below.

BRIEF DESCRIPTION OF THE DRAWINGS

The accompanying drawings, which are incorporated in and constitute a part of this specification, show certain aspects of the subject matter disclosed herein and, together with the descriptions, help explain some of the principles associated with the disclosed implementations.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1:
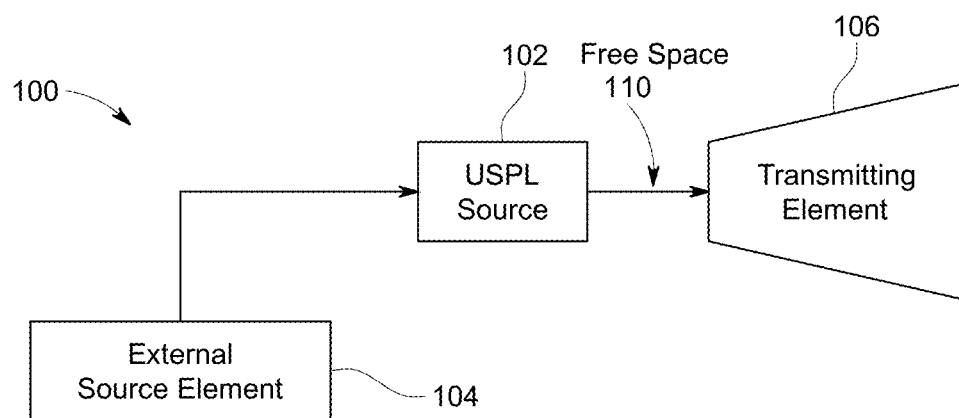
FIG. 1 depicts an example of an optical communications platform including free-space coupling of a USPL source as an optical source for transport to a remote optical receive terminal.

FIG. 1 illustrates an example of an optical communications platform 100 configured to use an USPL source as an optical source for transport. As shown in FIG. 1, a USPL source 102 may be directly modulated by an external source element 104. Optical power from the USPL source 102 can be coupled across free space 110 to a transmitting element 106, optionally by an optical telescope. The transmitting element 106 can optionally include optical components formed by hyperbolic mirror fabrication techniques, conventional Newtonian designs, or the like. A reciprocal receiving telescope at a receiver system can provide for optical reception. Consistent with implementations of the current subject matter, each optical transport platform can be designed to operate as a bi-directional unit. In other words, the transmitting element 106 of the optical communications platform 100 can also function as a receiving element. In general, unless otherwise explicitly stated, a transmitting element 106 as described can be considered to also be functional as a receiving element and vice versa. An optical element that performs both transmission and receiving functions can be referred to herein as an optical transceiver.

Figure 2:
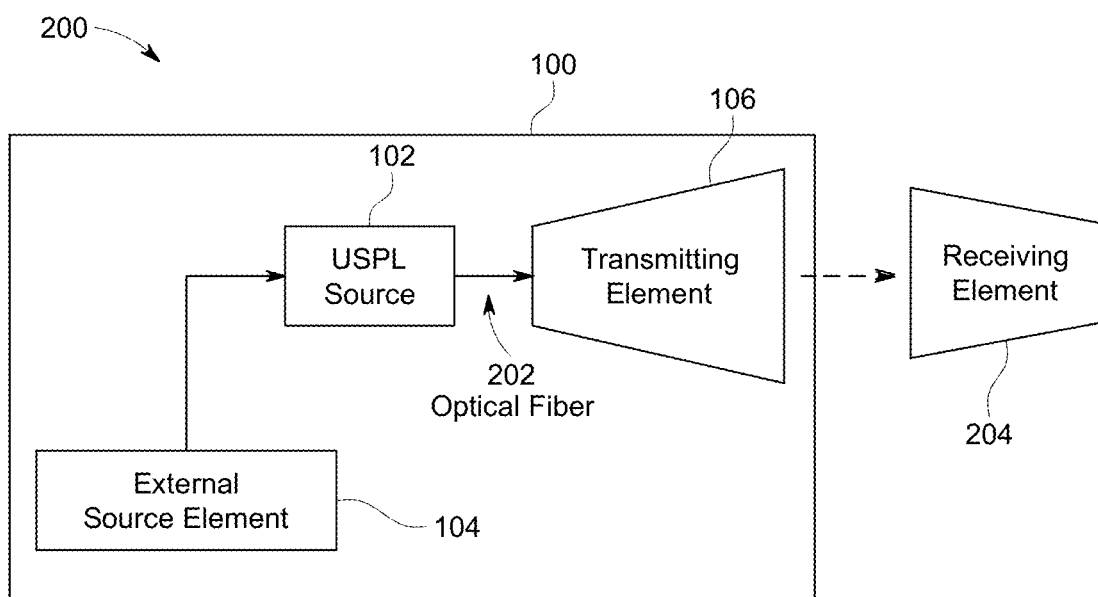
FIG. 2 depicts an example of an optical communications platform including fiber coupling of a USPL source as an optical source for transport to a remote optical receive terminal.

FIG. 2 illustrates an example of an optical communications system 200 that includes the optical communications platform 100 of FIG. 1. Also shown in FIG. 2 is a second complementary receiving element 204, which can be a receiving telescope located at a remote distance from the transmitting element 106. As noted above, both the transmitting element 106 and the receiving element 204 can be bi-directional, and each can function as both a transmitting element 106 and a receiving element 204 depending on the instantaneous direction of data transmission in the optical communications system 200. This feature applies throughout this disclosure for transmitting and receiving elements unless otherwise explicitly stated. Either or both of the transmitting element 106 and the receiving element 204 can be optical telescopes or other devices for transmitting and receiving optical information.

Figure 3:
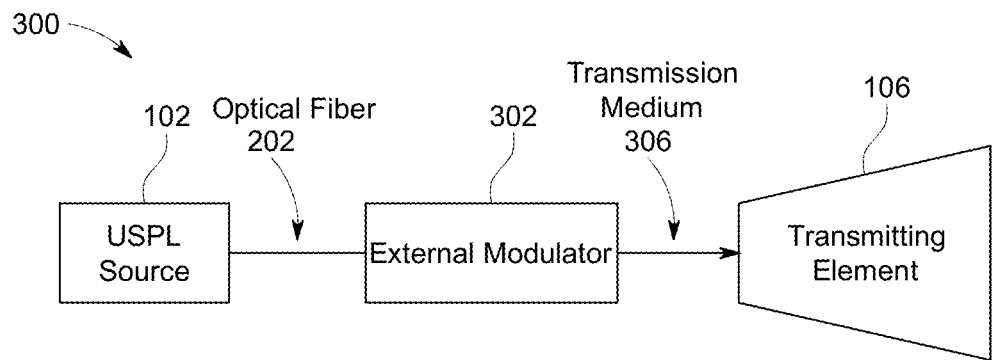
FIG. 3 depicts an example of an optical communications platform including fiber coupling of a USPL source to an external modulator for transport to a remote optical receive terminal.

FIG. 3 illustrates an example of an optical communications platform 300 for using an USPL source 102 fiber coupled to an external modulator 302 through a fiber medium 304 and connected to a transmitting element 106 through an additional transmission medium 306, which can optionally be a fiber medium, a free space connection, etc. The USPL source 102 can be externally modulated by the external modulator 302 such that optical power from the USPL source 102 is fiber coupled to the transmitting element 106 or handled via an equivalent optical telescope.

Figure 4:
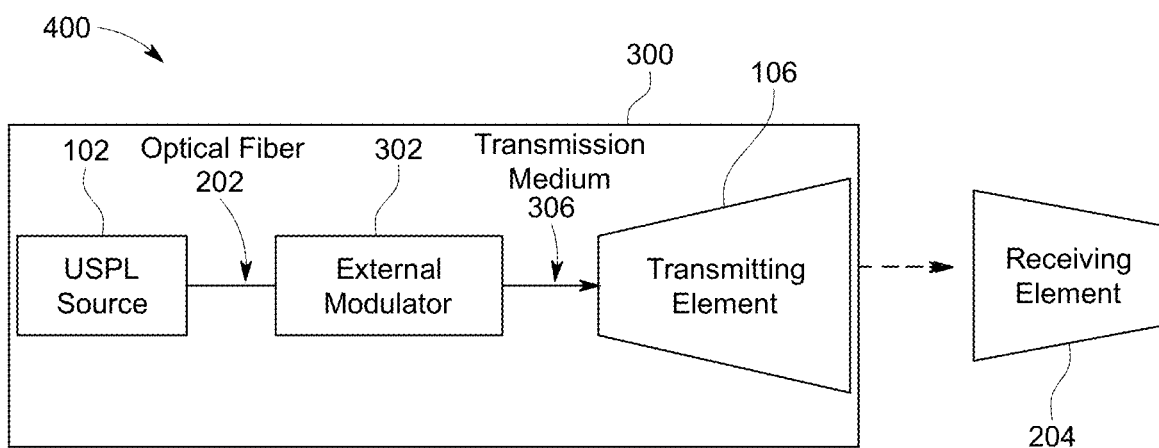
FIG. 4 depicts an example of an optical communications platform including fiber coupling of a USPL source to an external modulator through a fiber medium for transport to a remote optical receive terminal.

FIG. 4 illustrates an example of an optical communications system 400 that includes the optical communications platform 300 of FIG. 3. Also shown in FIG. 4 is a second complementary receiving telescope 204, which, as noted above in relation to FIG. 2, can be a receiving telescope located at a remote distance from the transmitting element 106.

Figure 5:
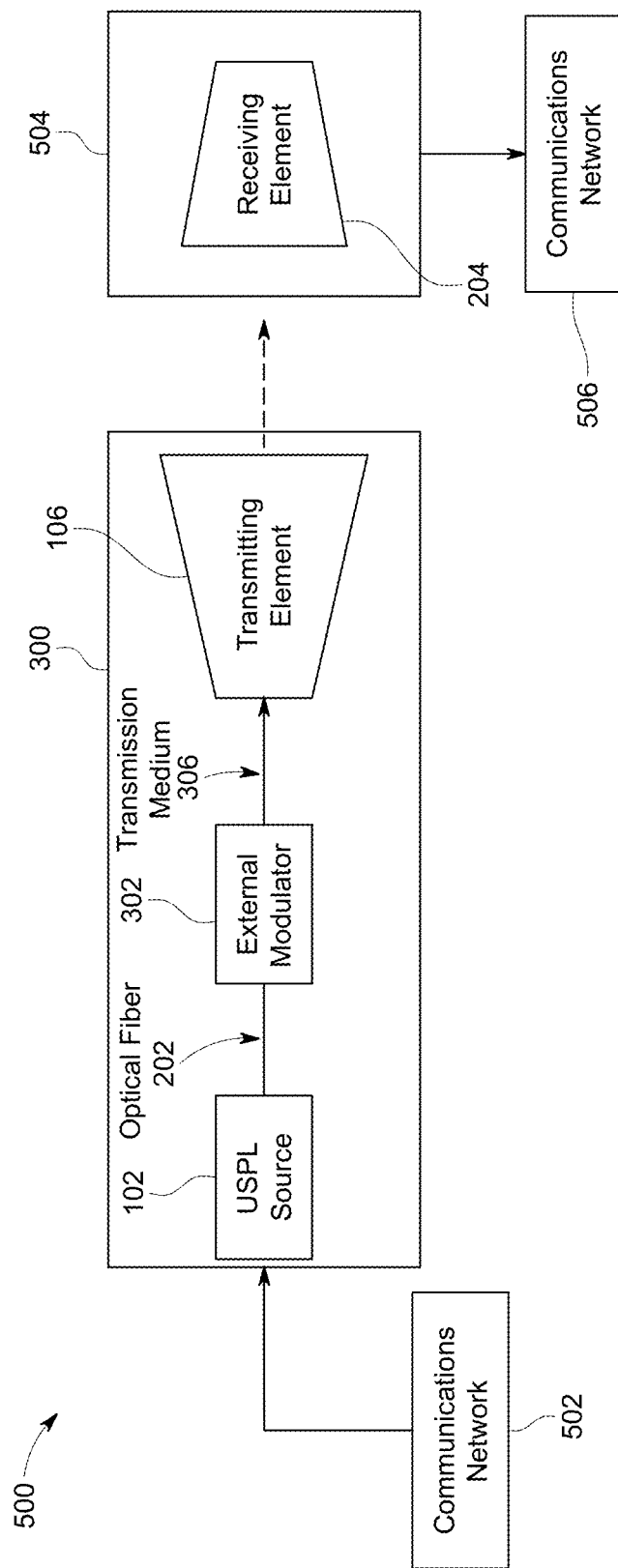
FIG. 5 depicts an example of a transmitting and or receiving elements, which can be of a type from either the Hyperbolic Mirror Fabrication Techniques or conventional Newtonian designs.

FIG. 5 illustrates an example of an optical communications architecture 500. The architecture 500 of FIG. 5 may include the elements of FIG. 4 and may further include a first communication network 502 connected to a first optical communications platform 300. The receiving element 204 is part of a second optical communications platform 504, which can optionally include components analogous to those of the first optical communications platform 300. A second communications network 506 can be connected to the second optical communications platform 504 such that the data transmitted optically between the transmitting element 106 and the receiving element 204 or are passed between the first and second communications networks 502, 506, which can each include one or more of optical and electrical networking features.

Figure 6:
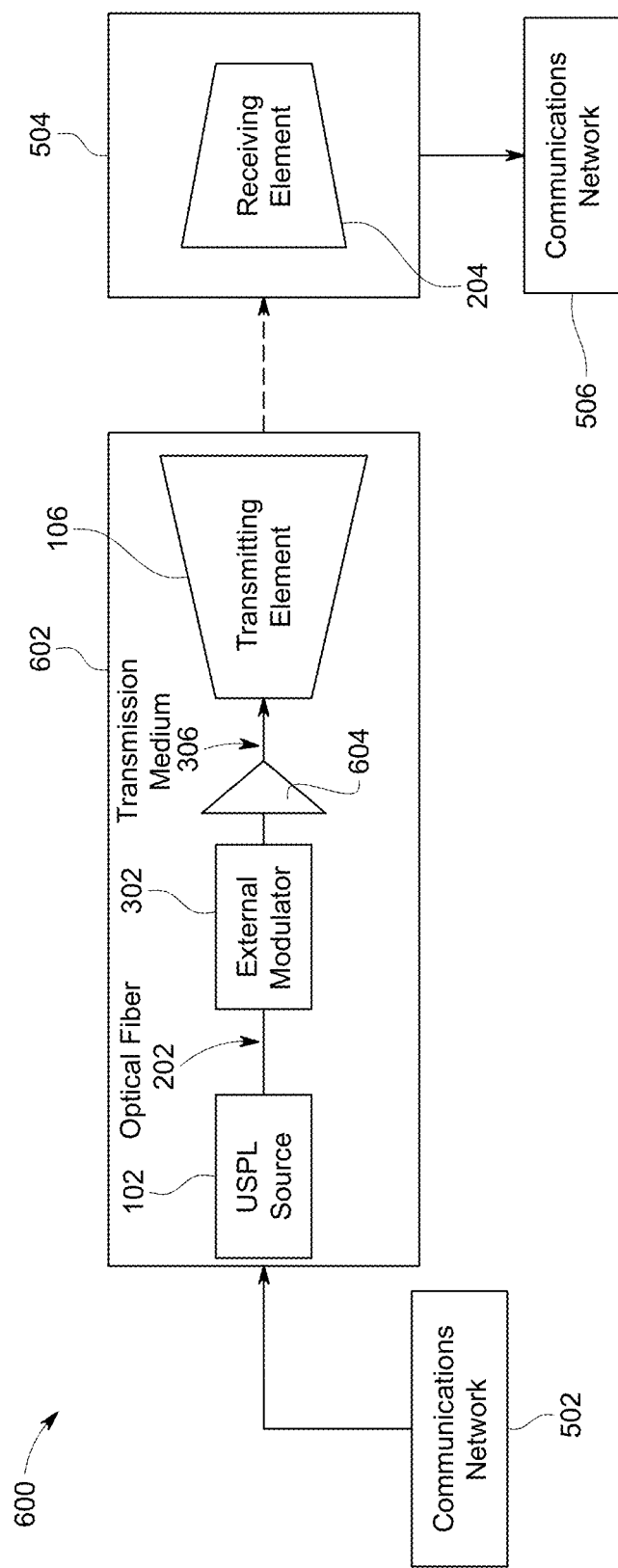
FIG. 6 depicts an example of an optical fiber amplifier element identified and used to increase enhancing optical transmit launch power for transport to a remote optical receive terminal.

FIG. 6 illustrates an example of an optical communications system 600. As part of an optical communications platform 602, an USPL source 102 is fiber coupled to an external modulator 302, for example through an optical fiber 202 or other transmission medium. The light from the USPL source 102 is propagated via a transmitting element 106 in a similar manner as discussed above. An optical amplifier element 604, which can optionally be an optical fiber amplifier element, can be used to increase optical transmit launch power, and can optionally be disposed between the external modulator 302 and the transmitting element 106 and connected to one or both via an additional transmission medium 306, which can optionally be a fiber medium, a free space connection, etc. Also shown in FIG. 6 is a second complementary receiving element 204 located at a remote distance from the optical communications platform 602. It will be readily understood that a second optical communications platform 504 that includes the receiving element 204 can also include an optical amplifier element 604. First and second communications networks 502, 506 can be connected respectively to the two optical communications platforms 602, 504.

Figure 7:
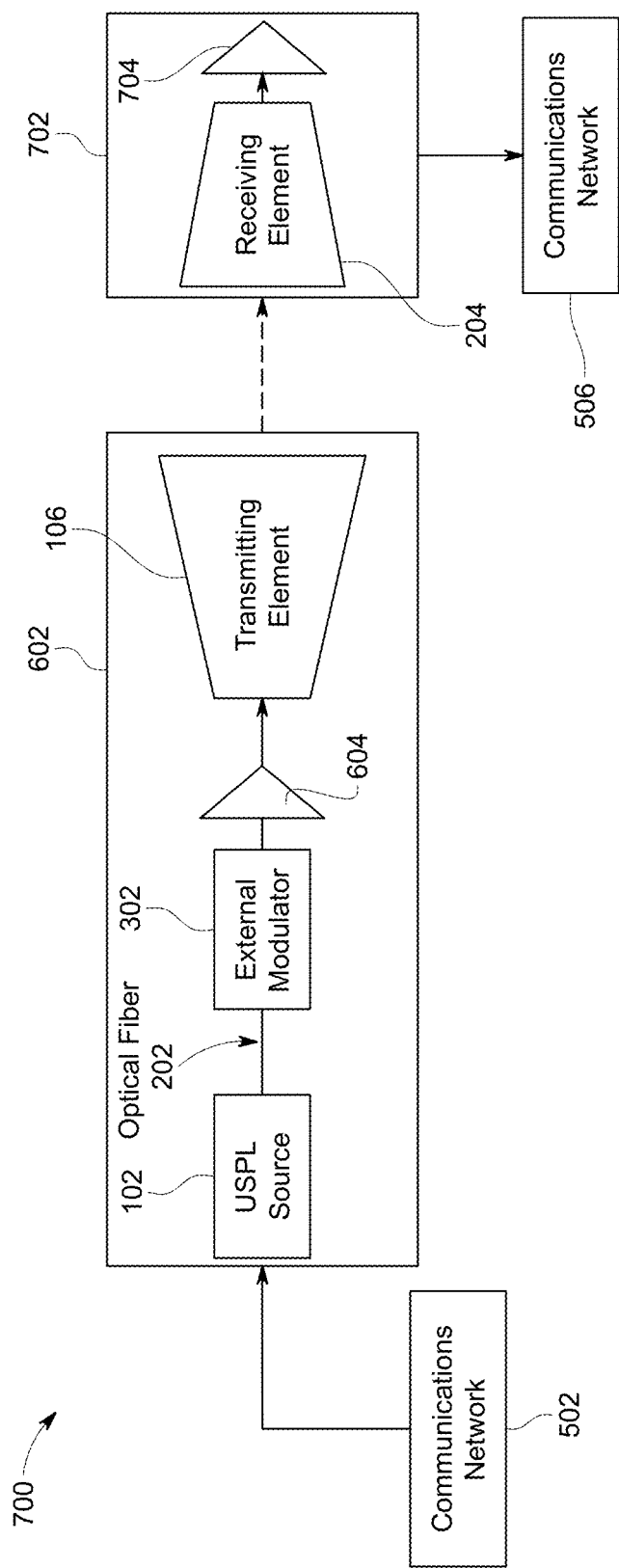
FIG. 7 depicts an example of a USPL laser device that is fiber coupled to an external modulator for transport, in a point-to-point configuration for transport to a remote optical receive terminal.

FIG. 7 illustrates an example of an optical communications system 700. The optical communications platform 602 shown in FIG. 6 can be in communication with a second optical communications platform 702, which can in this implementation include a receiving element 204 and an optical preamplifier 704. Other components similar to those shown in the optical communications platform 602 can also be included in the second optical communications platform 702, although they are not shown in FIG. 7. It will be understood that a bi-directional optical communications platform can include both of an optical preamplifier 704 for amplifying a received optical signal and an optical amplifier element 604 for boosting a transmitted optical signal.

Consistent with the implementation depicted in FIG. 7 and other implementations of the current subject matter, optical amplification (e.g. for either or both of an optical amplifier element 604 or an optical preamplifier 704) be included for enhancing the optical budget for the data-link between the transmitting element 106 and the receiving element 204 (and vice versa), for example using one or more of an erbium-doped fiber amplifier (EDFA), a high power erbium-ytterbium doped fiber amplifier (Er/Yb-DFA), or equivalents, which can include but are not limited to semiconductor-optical-amplifiers (SOA).

Figure 8:
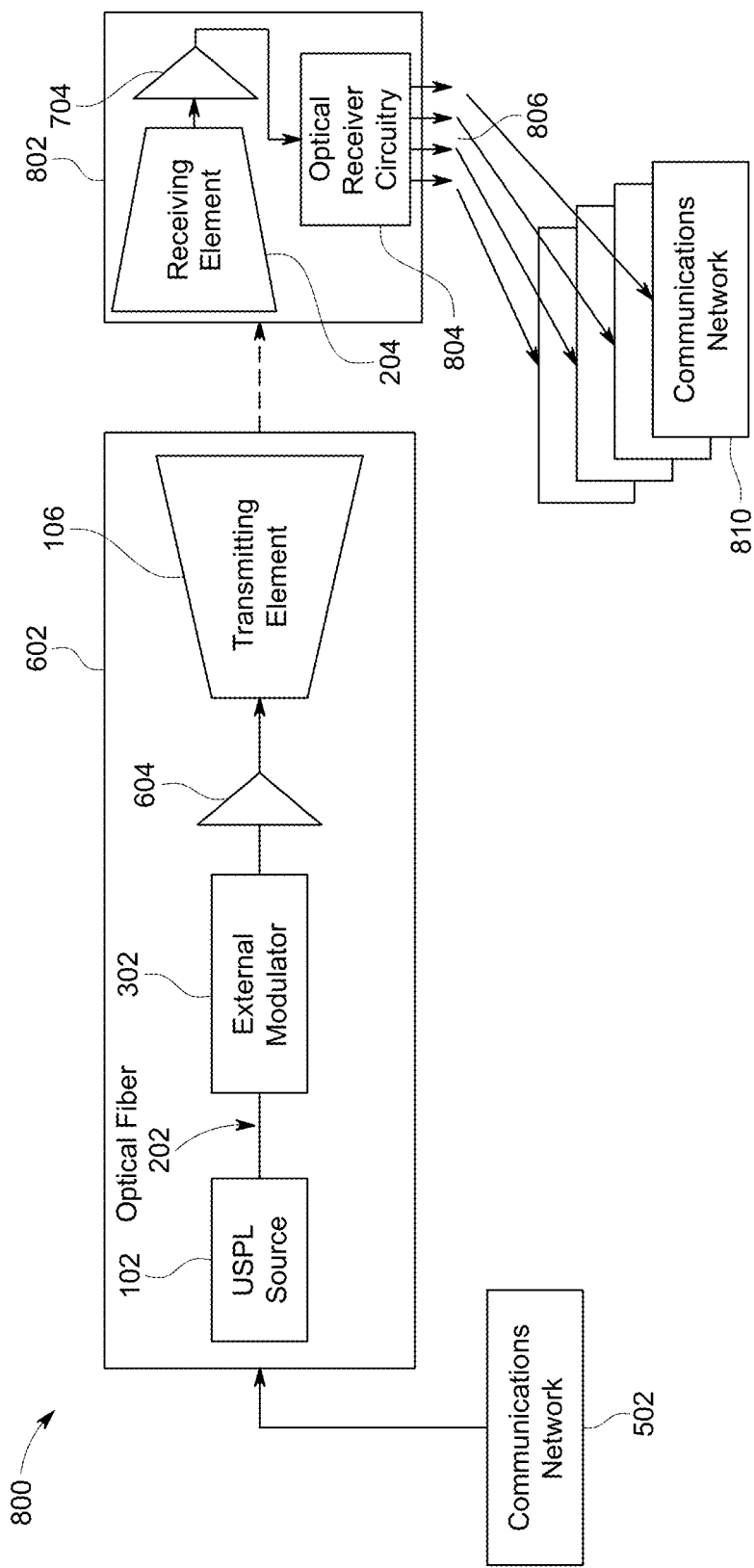
FIG. 8 depicts an example of a USPL laser device that is fiber coupled to an external modulator for transport, in a point-to-multi-point configuration.

FIG. 8 illustrates an example of an optical communications system 800. The optical communications platform 602 shown in FIG. 6 can be in communication with a second optical communications platform 802, which can in this implementation include a receiving element 204 and an optical preamplifier 704 similar to those shown in FIG. 7. As shown in FIG. 8, the second optical communications platform 802 can further include optical receiver circuitry 804, which can receive amplified and electrically recovered data received at the receiving element 204 and amplified by the optical preamplifier. A plurality of clock sources 806 can interface to multiple remote multi-point network connections with a plurality of communications networks 810 as required. In a similar manner, a complementary set of clock sources and multiple communication networks can be operated in conjunction with the optical communications platform 602 (e.g. in place of the single depicted communication network 502 in FIG. 8).

Figure 9:
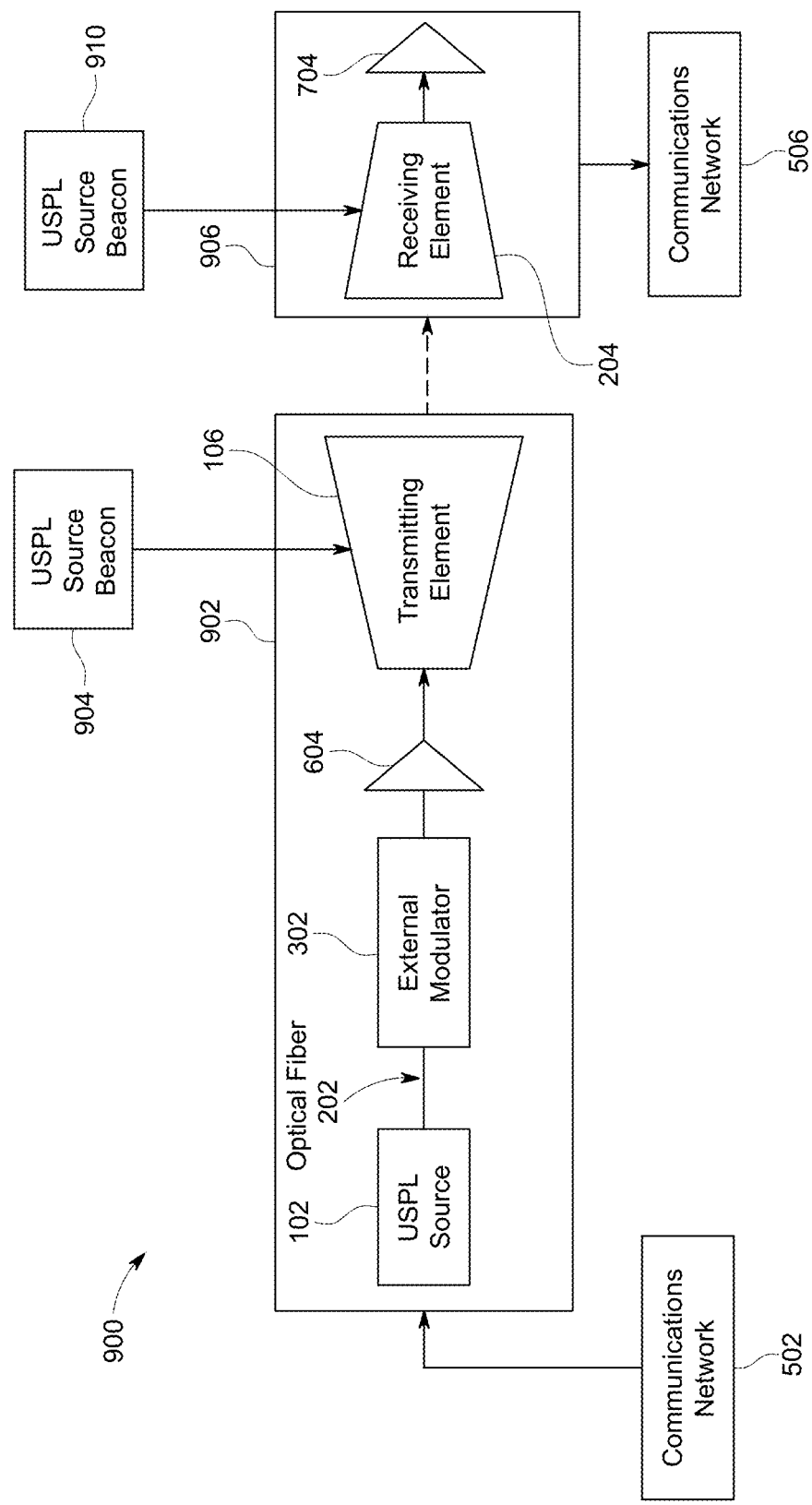
FIG. 9 depicts an example of use of USPL sources acting as tracking and alignment (pointing) beacon sources.

FIG. 9 illustrates an example of an optical communications system 900. An optical communications platform 902, which can feature similar elements to those in the optical communications platform 602 first discussed herein in reference to FIG. 6, can also include an additional USPL source 904 acting as a tracking and alignment (pointing) beacon source. A second optical communications platform 906 can also include an additional USPL source 910 acting as a tracking and alignment (pointing) beacon source. The tracking and alignment (pointing) beacon sources 904, 910 can optionally originate from available communications sources used in data transport transmission, or can be provided by separate, dedicated USPL sources. In addition, each USPL beacon source 904, 910 can include an in-band or out-of-band source, thereby allowing the advantage of available optical amplification sources, or from dedicated optical amplification resources.

Figure 10:
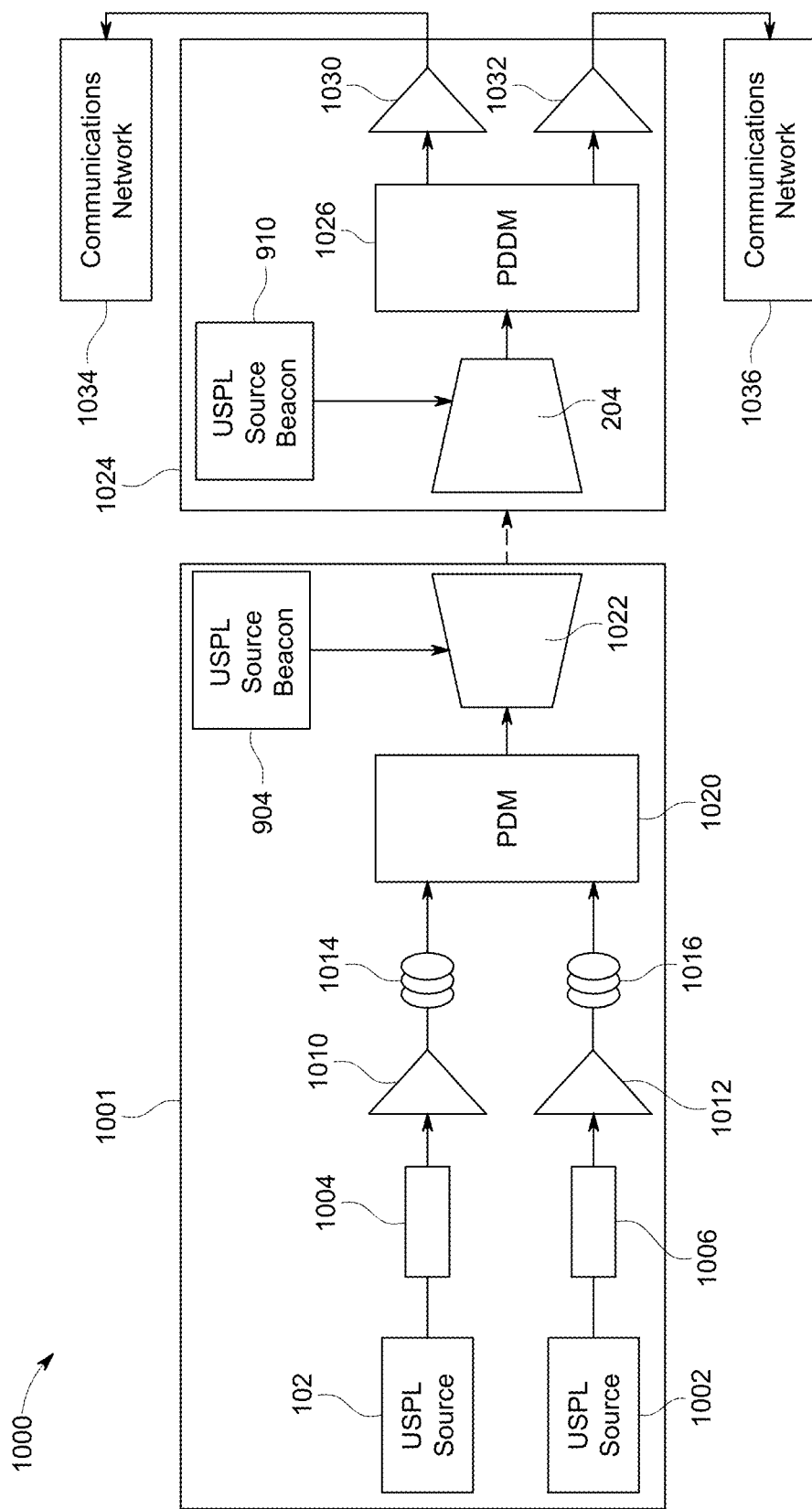
FIG. 10 depicts an example of a USPL laser sources polarization multiplexed onto a transmitted optical signal, to provide Polarization Multiplex USP-FSO (PM-USP-FSO) functionality.

FIG. 10 illustrates an example of a FSO communication system 1000 that includes a dual polarization USPL-FSO optical data-link platform 1001 in which USPL sources are polarization multiplexed onto a transmitted optical signal to thereby provide polarization multiplexed USP-FSO (PM-USP-FSO) functionality. Two USPL sources 102 and 1002 are fiber coupled to either directly modulated or externally modulated modulation components 1004, 1006 respectively. Each respective modulated signal is optically amplified by an optical amplifier component 1010, 1012 followed by adjustment of optical polarization states using polarization components 1014, 1016. The polarization state signals are fiber coupled to a polarization dependent multiplexer (PDM) component 1020 for interfacing to an optical launch platform component 1022, which can be similar to the transmit element 106 discussed above. The PDM 1020 multiplexes the light of differing polarization states into a single pulse train for transmission via the optical launch platform component 1022. An USPL optical beacon 904 can be included to provide capabilities similar to those discussed above in reference to FIG. 9, for example to operate along or in conjunction with a second USPL optical beacon 906 at a receiving platform 1024, which can include a receiving element 204 similar to those described above. As previously noted, the receiving element 204 as well as other features and components of the receiving platform 1024 can generally be capable of supporting transmission functions such that a bi-directional link is established. A received signal recovered by the receiving element 204 can provide an optical signal that is interfaced to an appropriate polarization dependent de-multiplexer 1026 capable of providing two signals for further optical amplification using amplification elements 1030, 1032. Each optical amplified signal as provided by the amplification elements 1030, 1032 can be interfaced to an appropriate optical network 1034, 1036 for network usage.

Figures 11A, 11B:
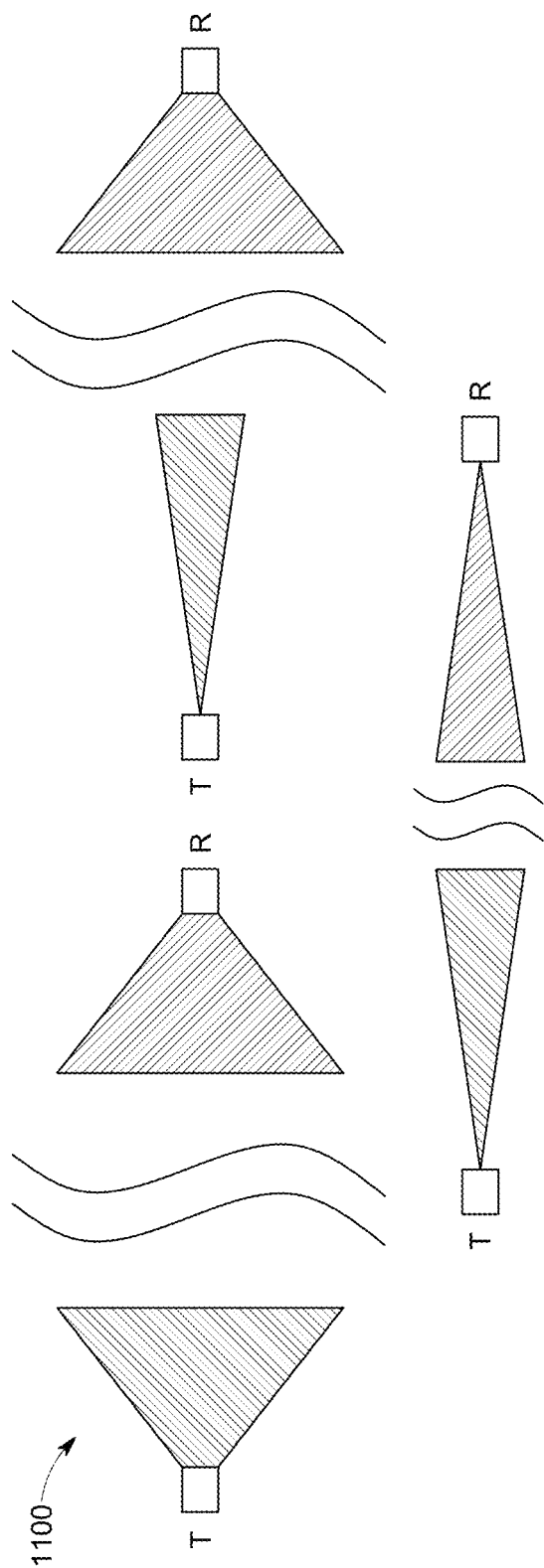
FIG. 11A and FIG. 11B respectively depict examples of USPL-FSO transceivers utilized for use in line-of-sight and non-line-of-sight lasercom applications.

FIG. 11A shows an example of a system 1100 in which USPL-FSO transceivers can be utilized for use in line-of-sight optical communication (e.g. "lasercom") applications, and FIG. 11B shows an example of a system 1150 in which USPL-FSO transceivers can be utilized for use in non-line-of-sight lasercom applications. An advantage to some implementations of the current subject matter can be realized due to scattering of the optical signal sent from a transmit element as the transmitted light passes through the atmosphere. This scattering can permit the use of non-line-of-sight communication. In addition, radios used in such communication systems can operate in the solar-blind portion of the UV-C band, where light emits at a wavelength of 200 to 280 nm. In this band, when solar radiation propagates through the environment, it is strongly attenuated by the Earth's atmosphere. This means that, as it gets closer to the ground, the amount of background noise radiation drops dramatically, and low-power communications link operation is possible. On the other hand, environmental elements such as oxygen, ozone and water can weaken or interrupt the communications broadcast, limiting usage to short-range applications.

When UV waves spread throughout the atmosphere, they are typically strongly scattered into a variety of signal paths. Signal scattering is essential to UV systems operating in non-line-of-sight conditions, and the communications performance can highly dependent on the transmission beam pointing and the receiver's field of view. A line-of-sight arrangement 1100 as shown in FIG. 11A can differ in bandwidth size from a non-line-of-sight arrangement 1150 as shown in FIG. 11B. Ultraviolet communication can more strongly rely on a transmitter's beam position and a receiver's field of view. As a result, refining of the pointing apex angle, for example by experimenting with supplementary equipment to enhance the UV-C signal, can be advantageous.

Figure 12:
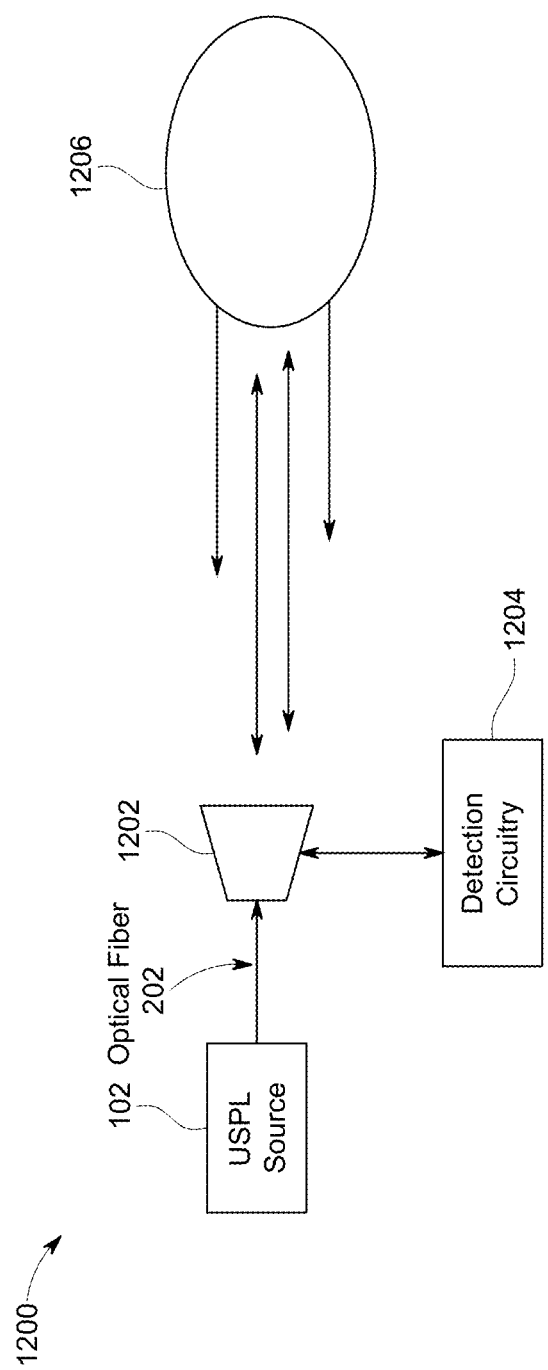
FIG. 12 depicts an example of light including light from the data signal propagated forward being backscattered by interaction with air-borne particulates that are the subject of investigation.

FIG. 12 illustrates an example of a remote sensing system 1200 in which an USPL source 102 is fiber coupled by an optical fiber component 202 to an optical launch element 1202 capable of transmitting and receiving optical signals. Some of the light propagated forward including the light from data signal through the optical launch element 1202 is backscattered by interaction with air-borne particulates that are the subject of investigation. The optical backscattered signal is detected through the optical launch element 1202 or a similar receive aperture and passed along for detection and spectrographic analysis through detection circuitry 1204 or the like in FIG. 12. The signature of particulates within a target atmospheric region 1206 within which an investigation is made can be calibrated through known approaches, for example using predetermined spectrographic calibration measurements based on one or more of ultraviolet spectroscopy, infrared spectroscopy. Raman spectroscopy, etc. Consistent with this implementation, an optical system can be operated as a LIDAR instrument providing enhanced resolution and detection sensitivity performance, using USPL laser sources operating over a spectral range of interest. Adjustability of spectral range can aid in evaluating and analyzing chemical constituents in the atmosphere.

USPL-FSO transceivers can be utilized for remote sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. Also certain adaptations can be related to ionization probing of remote regions include controllable ionization, which has been shown to occur at these frequencies and an ionization process, which can be focused at distance to adjust depth of atmospheric penetration especially in weather and clouds.

Figure 13:
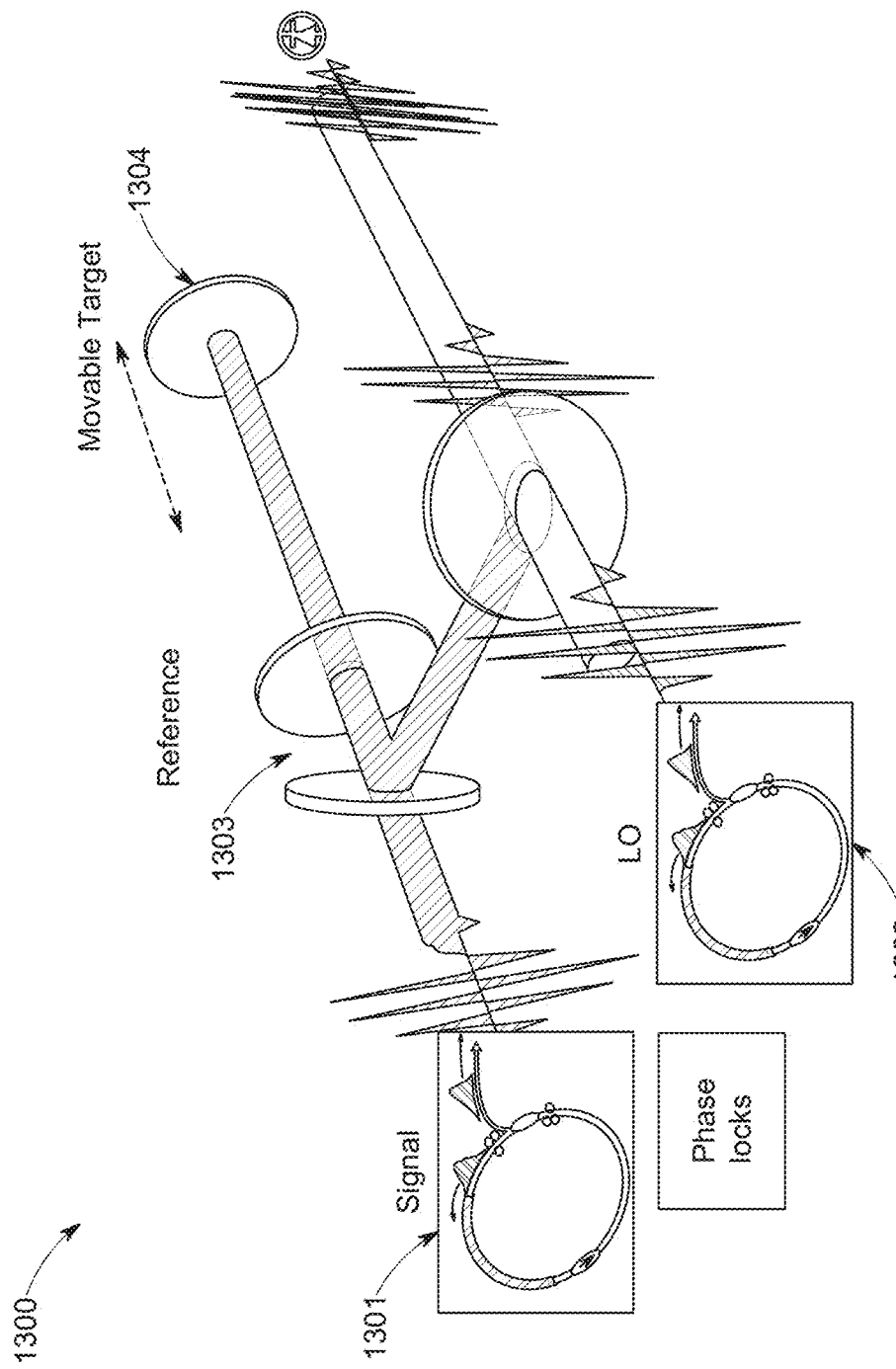
FIG. 13 depicts an example of USPL laser sources as optics reception techniques to improve detection sensitivity; USPL laser sources as well as optical reception techniques to improve detection sensitivity.

FIG. 13 illustrates an example of use of USPL sources as well as optical reception techniques to improve detection sensitivity. Researchers at the National Institute of Standards and Technology (NIST). US, have built a laser ranging system that can pinpoint multiple objects with nanometer precision over distances up to 100 km. The LIDAR (light detection and ranging) system could have applications from precision manufacturing on Earth to maintaining networks of satellites in perfect formation (Nature Photonics DOI: 10.1038/NPHOTON.2009.94). The NIST device uses two coherent broadband fiber-laser frequency combs. Frequency combs output a series of stable short pulses that also contain a highly coherent carrier that extends across the pulse train. This means a frequency comb can be employed to simultaneously make an interferometric measurement as well as a time-of-flight measurement, thereby enhancing analytical capabilities for application specific situations.

In the arrangement shown in FIG. 13, two phase-locked frequency combs 1301 and 1302 are used in a coherent linear optical sampling configuration, also known as a multi-heterodyne, meaning that one frequency comb measures both distance paths, while the other frequency comb provides distance information encoded in the light of the first comb. Pulses from one frequency comb 1301 can be launched out of the fiber and directed towards two glass plates, a reference 1303 and a target 1304. The plates 1303 and 1304 can reflect a certain fraction (e.g. approximately 4%) of the pulse back down the fiber, effectively creating two new pulses. The time separation between the two pulses 1301 can give the distance between the moveable target plate and reference plates. A second frequency comb 1302 is tightly phase-locked with the first, but has a slightly different repetition rate. Due to the different delay between consecutive pulses when the sources interfere, the second frequency comb can sample a slightly different part of the light from the electric field of the first comb.

Using the technique described is reference to FIG. 13, it is possible to replace the two coherent broadband fiber-laser sources with two appropriate USPL sources used within the scope of the configuration outlined having each USPL source fiber coupled to dedicated free-space optical telescope designs. By doing so, the overall efficiency, optical ranging and accuracy can be improved substantially.

In some embodiments, a native pulse repetition rate of a USPL laser source and may be 50 MHz. or less, which may be undesirably low for optical data transmission, limiting the system to low data rate applications of 50 Mbps or less. Accordingly, systems to increase USPL operational rates are needed for providing solutions for data transport in excess of 50 Mbps.

Figure 14:
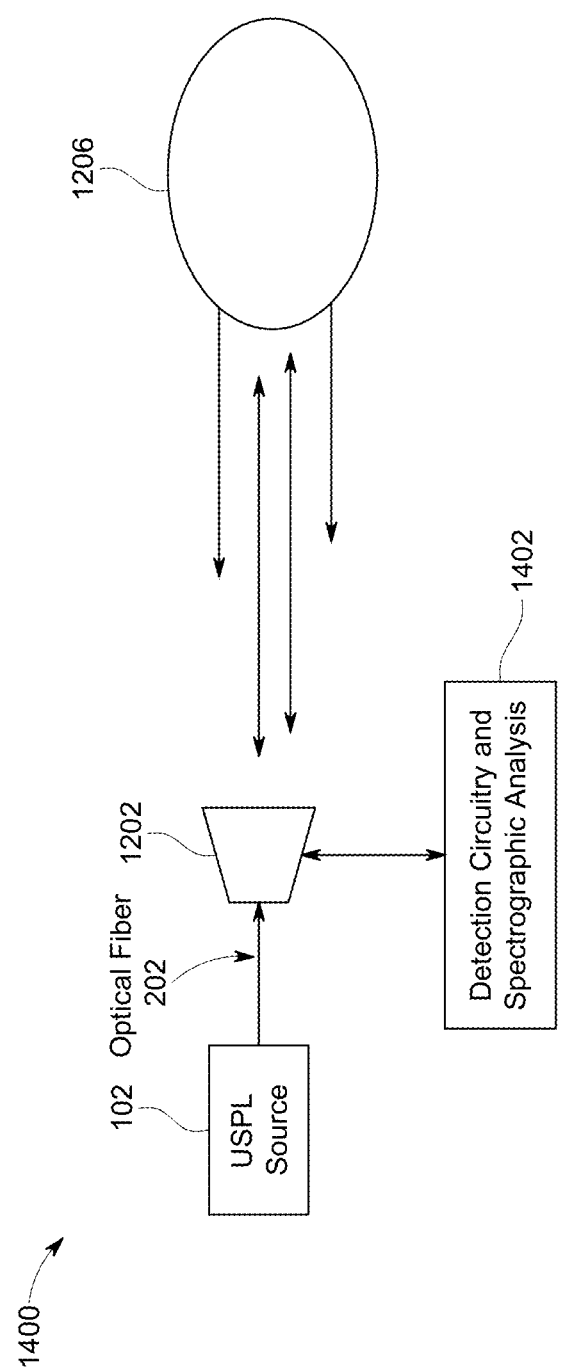
FIG. 14 depicts an example of a USPL-FSO transceiver utilized and operated across the infrared wavelength range optionally including light from the data signal as a range-finder and spotting apparatus for the purposes of target identification.

FIG. 14 illustrates an example of a remote sensing system 1400 in which an USPL source 102 is fiber coupled by an optical fiber component 202 to an optical launch element 1202 capable of transmitting and receiving optical signals. Light propagated forward by the optical launch element 1202 including light from the data signal is backscattered by interaction with targets known and unknown that are the subject of investigation within an atmospheric region 1206. The optical backscattered signal including light from the data signal is detected through the optical launch element 1202 or a similar receive aperture and passed along for detection analysis through a detection circuitry and spectrographic analysis component 1402 in FIG. 14. The signature of particulates within the region 1206 under investigation can be calibrated, for example where range-finding analysis can be performed. A system 1400 as in FIG. 14 can include a USPL-FSO transceiver utilized and operated across the infrared wavelength range as a range-finder and spotting apparatus for the purposes of target identification and interrogation applications. As used herein, the term "optical" includes at least visible, infrared, and near-infrared wavelengths.

Figure 15:
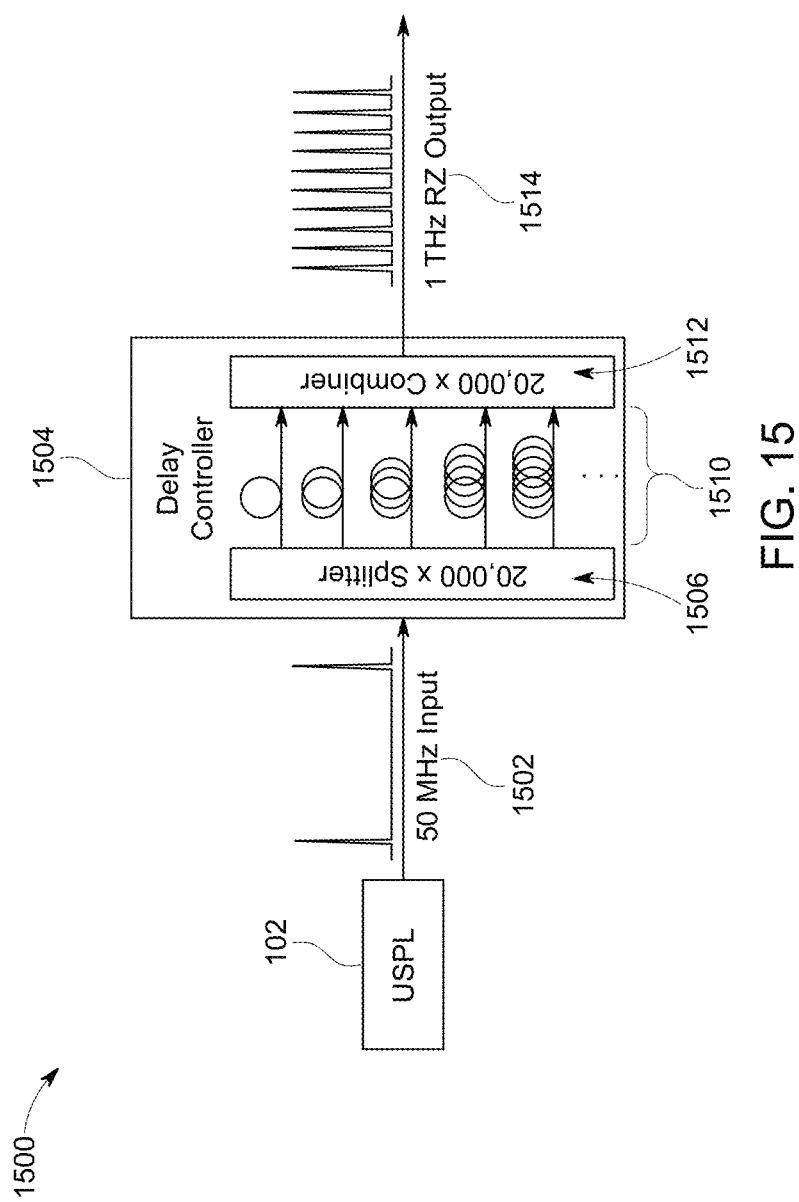
FIG. 15 depicts an example of a USPL pulse multiplier device consistent with implementations of the current subject matter.
Figure 28:
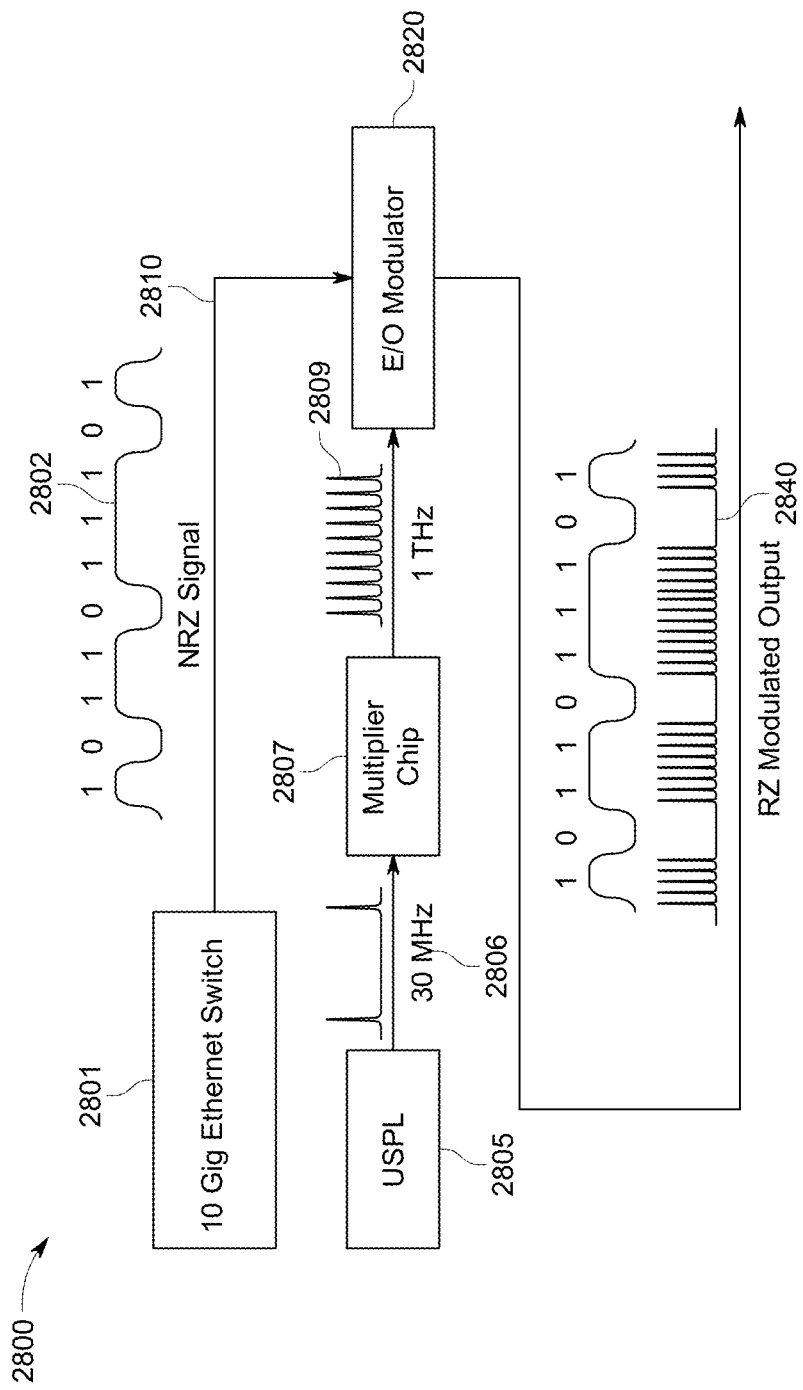
FIG. 28 depicts an example of timing of the TDM chip from the USPL modulation source to provide a Terabit/second (or faster) with a Multiplier Photonic chip.

FIG. 15 illustrates an optical pulse multiplier module 1500 that can increase the repetition rate of the output from a USPL source 102. An exemplary USPL may have a pulse width of 10-100 femto-seconds and a repetition rate of, for example, 50 MHZ. The output from the USPL 102 can be fed as an input 1502 into a USPL photonic chip pulse multiplier module 1504. In this example, the photonic chip can contain a 20,000:1 splitter element 1506 that splits the input into discrete light elements. Each light element on the opposite side of the splitter element 1506 contains the 50 MHZ pulse train. Each light element then passes through a delay controller (either a fiber loop or lens array) 1510, which delays the pulse train for that element in time, for example by a number of picoseconds. Successive light elements are thereby delayed by incremental picoseconds. All of these pulse trains with their unique time delays are combined into a single pulse train in a fashion similar to time division multiplexing utilizing a 20.000:1 optical combiner element 1512. The required ratios of splitters and combiners can be controlled to provide necessary optical designs for the application required. The final output 1514 is a pulse train of 10-100 femto-second pulses with a repletion rate of 1 THz. This THz pulse train can then be modulated by a 10 or 100 GigE signal, such as shown in FIG. 28, resulting in 100 femto-second pulses per bit for the 10 GigE system, and 10 femto-second pulses per bit for 100 GigE systems. The application cited is not limited to specific data rates of 10 and 100 Gbps, but can operate as required by the application under considerations. These numbers are just for illustration purposes. Implementations of the current subject matter can use any multiplier factor to increase the repetition rate of the USPL via the photonic chip pulse multiplier module 1504 to any arbitrary repetition rate. Other examples used in generation of enhanced USPL repetition rates are illustrated within this submission.

Figure 16:
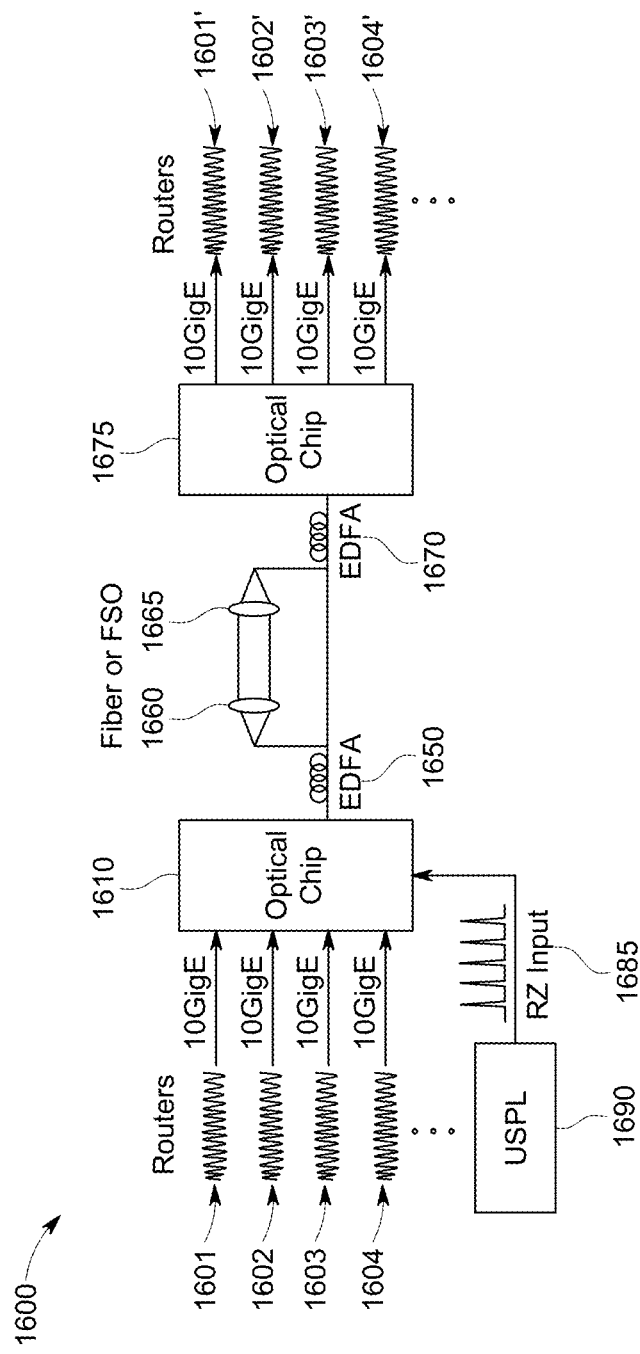
FIG. 16 depicts another example of a device for generation of high pulse rate USPL optical streams consistent with implementations of the current subject matter.

FIG. 16 depicts a system 1600 for generation, transmission, and receiving of high pulse rate USPL optical streams. An optical chip multiplexing module 1610, which can for example be similar to that discussed in reference to FIG. 15, can be used in this application. In this approach to achieve USPL pulse multiplication, a series of 10 GigE router connections (10 GigE is not intended to be a limiting feature) described by signals 1601, 1602, 1603, 1604 (four signals are shown in FIG. 16, but it will be understood that any number is within the scope of the current subject matter) are interfaced to the optical chip multiplexing module 1610. In operation, the optical chip multiplexing module 1610 can support full duplex (Tx and Rx) to connect with the 10 GigE routers 1601, 1602, 1603, 1604. The optical chip multiplexing module 1610 can provide efficient modulation by a USPL signal 1685 output from a USPL source 1690 for ingress optical signals 1601, 1602, 1603, 1604. The optical chip multiplexing module 1610 can provide capabilities to modulate and multiplex these ingress optical signals.

At a remote receive site where a receiving device is positioned, all signals sent via a transmitting element 1660 at the transmitting device can be recovered using an appropriate receiver element 1665. A complementary set of optical chip multiplexing module 1675 can provide necessary capabilities for demultiplexing the received data stream as shown by elements for delivery to a series of routers 1601', 1602', 1603', 1604' (again, the depiction of four such routers is not intended to be limiting). End-to-end network connectivity can be demonstrated through network end-point elements.

Figure 17:
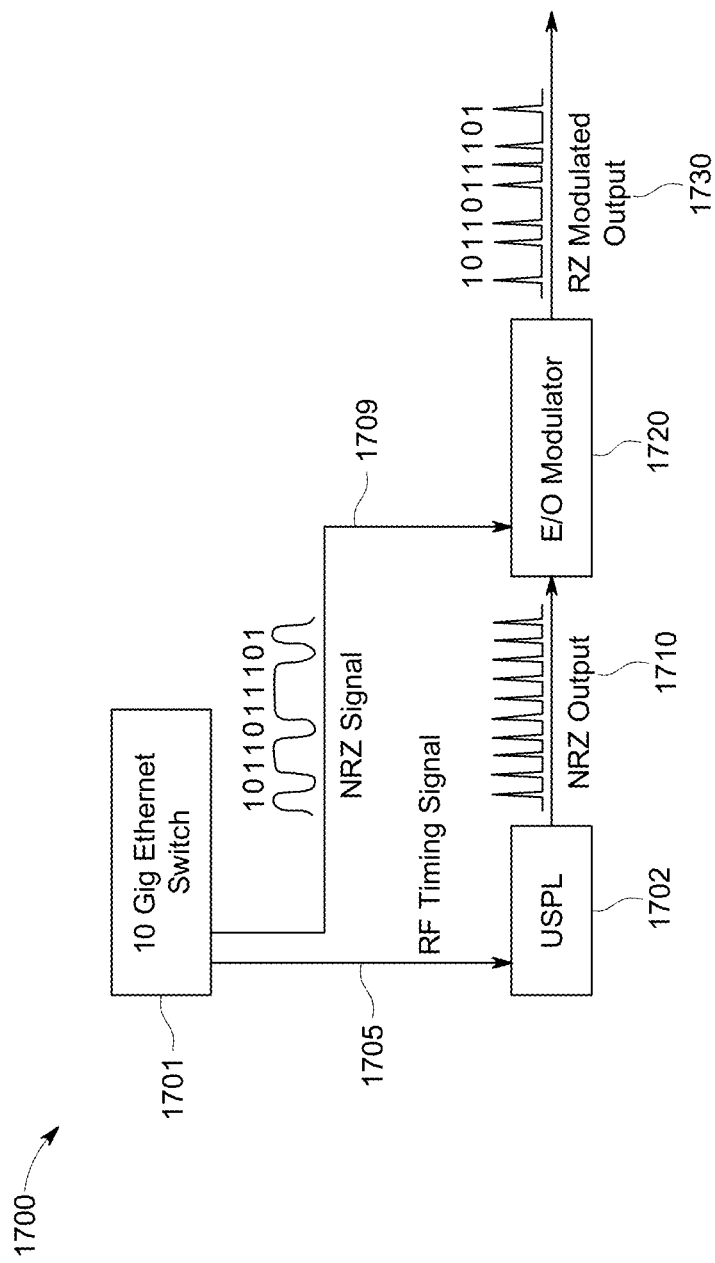
FIG. 17 depicts another example of an optical device to a generate a USPL RZ data stream from a conventional transmission networking element.

FIG. 17 depicts an example system 1700 in which an optical chip is interconnected to a wavelength division multiplexing (WDM) system. WDM systems have the advantage of not requiring timing or synchronization as needed with a 10 GigE (or other speed) router 1701, since each 10 GigE signal runs independent of other such signals on its own wavelength. Timing or synchronization of the TDM optical chip with 10 GigE routers can be important in a TDM optical chip. A GbE switch 1701 can provide the necessary electrical RF signal 1705, from the switch 1701 to modulate a USPL source 1702, either directly or by use of USPL a pulse multiplier module previously detailed within this document. A typical RZ output 1710 can be coupled into an external modulator 1720, which can be modulated using a NRZ clock source for the switch 1701, thereby resulting in a RZ modulated spectrum 1730. The conversion process using readily available equipment can provide capabilities for introducing USPL sources and their benefits into the terrestrial backhaul network spectrum.

For the optical chip system to successfully bridge between two remote 10 GigE switches, the chip may act like a simple piece of fiber. The timing of the TDM chip can therefore be driven by the 10 GigE switch 1701. Both actively mode-locked USPLs (i.e. 40 GHz, 1 picosecond pulse width) and passively mode-locked USPLs (i.e. 50 MHz, 100 femtosecond pulse width) can be driven by a RF timing signal.

Figure 18:
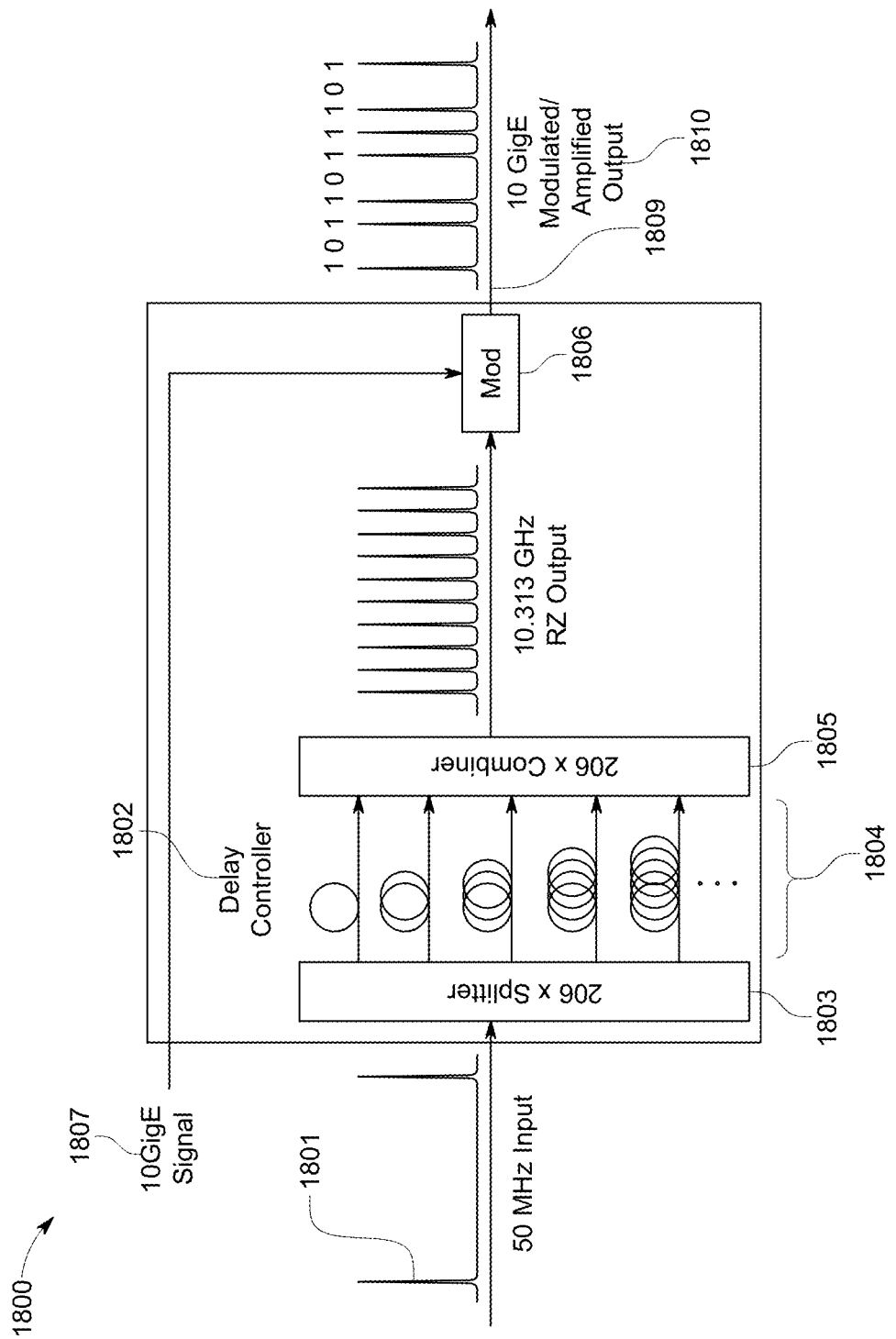
FIG. 18 depicts an example of a implementing a USPL pulse multiplier device for generation of 10×TDM type signals system to give a 100 Gbps output.

FIG. 18 illustrates a device 1800 that can support another approach to progression to a high pulse repetition data rate operation, such as for extremely high data rate operation in which optical chip design can be performed using either fiber or free-space optics. A 50 MHz USPL source 1801 may be interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64B/66B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. In so doing a series of optical signals each identical, and equally spaced between adjacent pulses form a continuum of pulses for modulation. Prior to entering an E-O modulator element 1806, all optical ingress signals can be conditioned by pre-emphasis techniques, for example using typical optical amplification techniques, to result in a uniform power spectrum for each egress signal from the combiner element 1805. The conditioned egress signals may then be coupled into the E-O modulator element 1806 and modulated with an available NRZ signal from the 10 GigE signal source element 1807.

The 10 GigE modulated output 1809 can interface to an EDFA and then into the TX of a FSO system (or a fiber optic system). The Rx side (after the detector) can be fed directly into a 10 GigE switch as a modulated and amplified output 1810.

Figure 19:
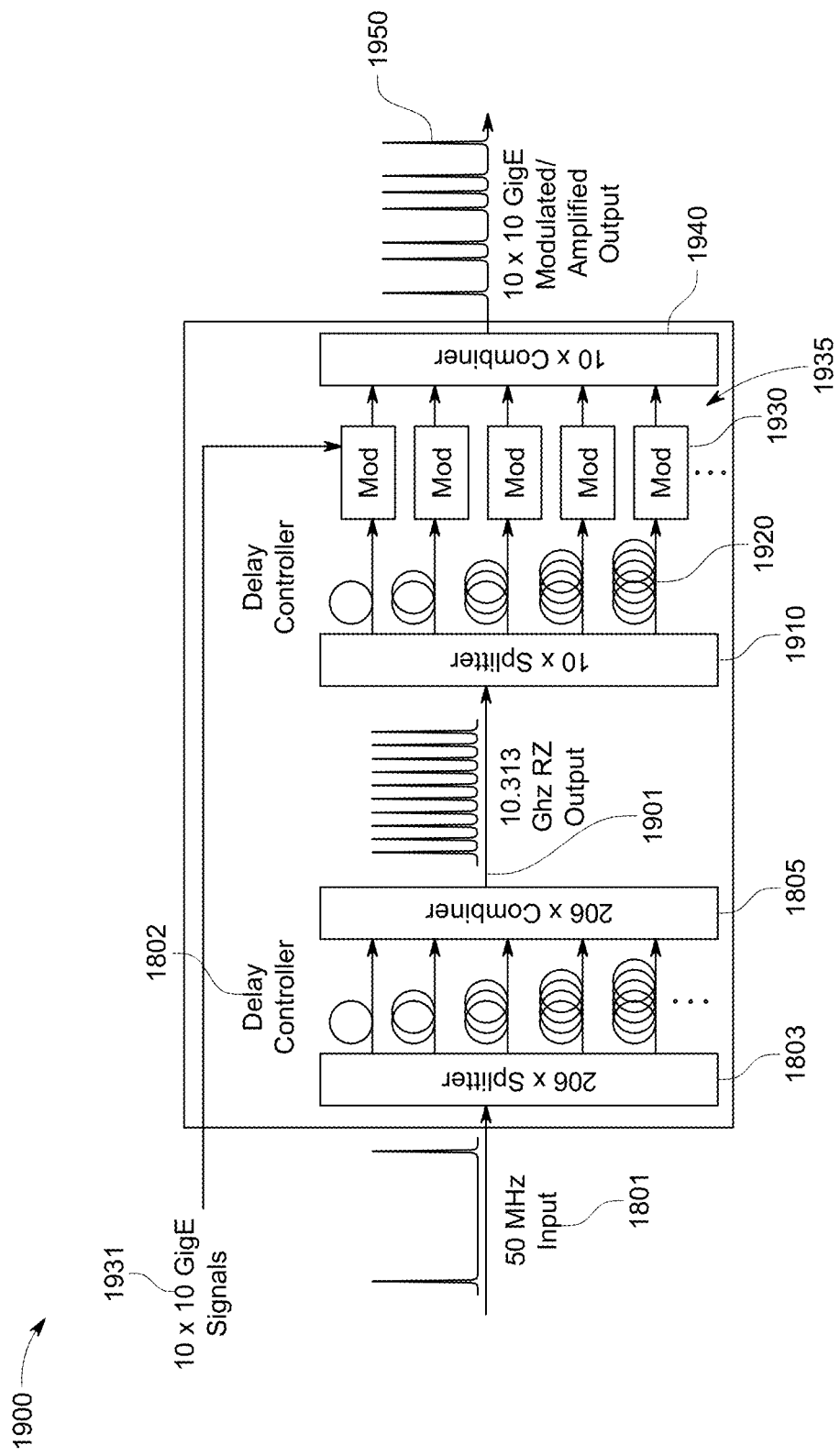
FIG. 19 depicts an example of a implementing another type of USPL pulse multiplier device for extending the pulse repetition rate for use in high capacity networks.

FIG. 19 illustrates another example of a device 1900 that can be used for USPL pulse multiplication consistent with implementations of the current subject matter. Consistent with this approach, a 10×TDM system is configured to give a 100 Gbps output. A TDM demux chip can be on the receive side of a communication link to break up the individual 10 GigE signals, and can include a reciprocal approach to the design shown in FIG. 19.

As in FIG. 18, a 50 MHz USPL source 1801 may be interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64B/66B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. Instead of a single modulator element 1806 as shown in FIG. 18, however, the 10.313 GHz RZ output 1901 from the combiner element 1805 may be fed into a second splitter element 1910, which in this case can be a 10× splitter, which splits the optical signal into ten parallel paths. Other implementations of this design can support various split ratios as required by design. Optical paths out from second splitter element 1910 are individually connected to specified optical delay lines 1920. Each individual delayed path is connected to a dedicated optical modulator of a set of optical modulators 1930 modulated with an available NRZ signal from the 10×10 GigE signal source element 1931, resulting in a series of modulated optical signals 1935. An optical combiner identified 1940 provides a single optical pulse train 1950. The series of optical pulses in the single optical pulse train 1950 can be interfaced to an appropriate optical amplifier for desired optical conditioning for network use.

Figure 20:
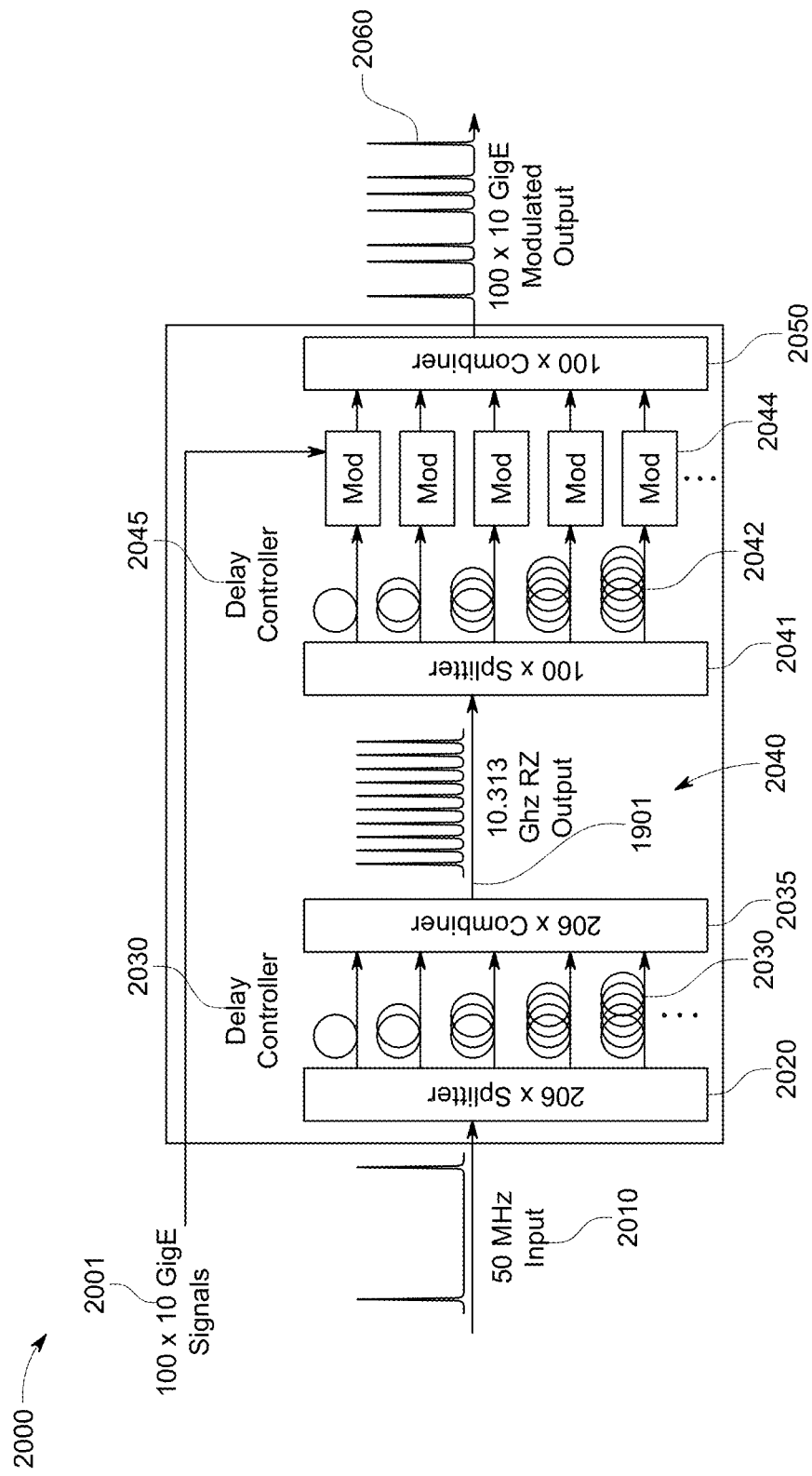
FIG. 20 depicts an example of a implementing another type of USPL pulse multiplier device for extending the pulse repetition rate for use in high capacity networks.

FIG. 20 illustrates another example of a device 2000 that can be used for USPL pulse multiplication consistent with implementations of the current subject matter. A device 2000 as depicted can provide the ability to achieve high USPL pulse repetition data rates for network applications by modulation of the low repetition rate intra-channel pulses. By applying direct modulation of each channel on the delay controller, creation of a modulation scheme, which is not constrained by the current speed limitations from the electronics technology, can be beneficially accomplished. Implementations of the current subject matter can provide a mechanism to enhance the data transmission capacity of a system, by separately modulating individual channels at the current standard electronic modulation speed (in the example of FIG. 20 at the rate of 100×10 GigE signal input 2001) and time-multiplexing the channels into a single frequency high rep rate pulse stream. In this approach, the current standard, which is limited by the speed of electro-optic modulators (40 Gbps), can be enhanced by approximately N orders of magnitude, where N is the number of channels of the time-multiplexer. For example, a 100 channel TDM with each channel amplitude modulated at the current standard data rate can be able to offer data rates at speeds of up to 4 Tbs. N can be limited by the width of the optical pulse itself. In the limit that information is carried 1 bit/pulse, the time slot occupied by 1 bit is the width of the pulse itself (in that sense, RZ system would converge to a NRZ). For example, in the scheme, a 40 fs pulse width laser with a 40 GHz rep rate is able to carry information at a maximum rate of 25 Tbps. This approach can be used in a 40 Gbps-channel modulation scheme (i.e., 1 bit every 25 ps) and can correspond to a capacity of N~625 channels in a single transmission, which can be the number of 40 fs time intervals fitting in a 25 ps time interval. A significant advantage of this approach is the ability to "optically enhance" an otherwise limited data capacity modulation scheme, while still interfacing with the existing data rate limited modulators. For example, an amplitude modulator based on a Mach-Zehnder interferometer can be easily integrated in a TDM IC package, in that required is the ability to branch out the channel into two separate paths, add a tiny phase modulator (nonlinear crystal) in one of the paths, and combine the paths for interference.

FIG. 20 includes a USPL source 2010 coupled to a multi-port optical splitter element 2020. The number of optical ports identified need not be limited to those described or shown herein. A series of optical delay lines 2030 provide required optical delays between each parallel path from the multi-port optical splitter element 2020, and can be tailored for specific applications. The optical delay paths from the optical delay lines 2030 are summed together using an optical combiner element 2035. The resulting combined optical data stream appearing through element 2040 represents a multiplicative enhancement in the pulse repetition rate of the original USPL source identified by element 2010. Further enhancement in pulse repetition rate is accomplished though the usage of element 2041, described by an optical splitter where the incoming signal 2040 is split into a series of paths not limited to those identified by element 2041. By way of a second delay controller 2045, optical delays may be introduced to each path within the device as identified by the second set of optical delay paths 2042. Each parallel path 2042 in turn is modulated by a modulating element 2044 with an available RF signal source element identified by the signal input 2001. An optical combiner element 2050 integrates all incoming signals onto a single data stream 2060.

Optical pre-emphasis and de-emphasis techniques can be introduced within each segment of elements described to custom tailor the optical spectrum for a uniform or asymmetric optical power distribution. Pre- & de-emphasis can be accomplished using commonly used optical amplifiers such as Er-Doped Optical amplifiers (EDFA).

Figure 21:
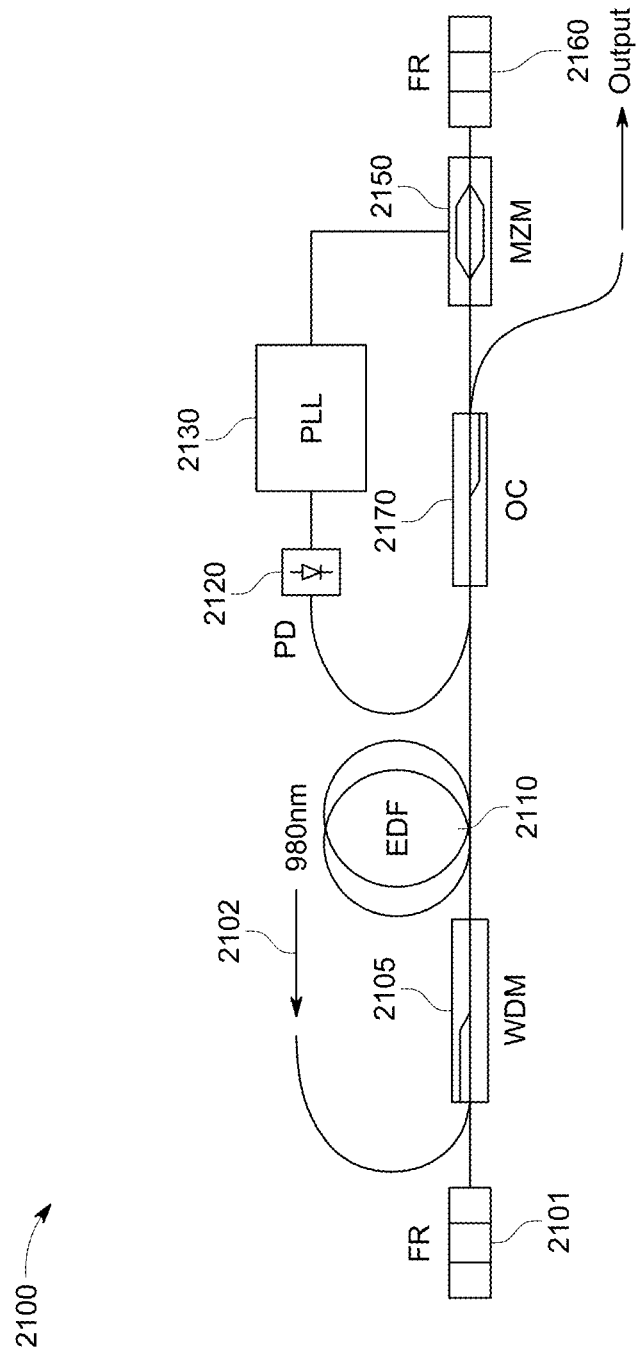
FIG. 21 depicts examples of active mode-locked linear fiber lasers with feedback regenerative systems: fiber reflector (FR), wavelength-division multiplexer (WDM), Erbium-doped fiber (EDF), optical coupler (OC), photo-detector (PD), phase-locked loop (PLL), and Mach-Zehnder Modulator (MZM).

FIG. 21 depicts an example of a system 2100 that includes a mode-locked USPL source 2101, which can be used to generate appropriately required clock and data streams for the application. Mode-locked lasers can represent a choice of high performance, high finesse source for clocks in digital communication systems. In this respect, mode-locked fiber lasers—in either linear or ring configuration—can make an attractive candidate of choice, as they can achieve pulse widths on the USPL source region and repetition rate as high as GHz. In addition to that, fibers offer compactness, low cost, low sensitivity to thermal noise, low jitter, no problems associated with diffraction or air dust pollution, just to name a few. In a communications scenario, the pulse width can determine the available bandwidth of the system, and the repetition rate limits the data rate. The pulse width can be determined by the intrinsic characteristics of the laser cavity—i.e. balancing of the overall group-velocity dispersion (GVD), and the choice of the saturable absorber (in the case of a passive system)—or the bandwidth of an active element (in the case of an active mode-locked system). The repetition rate of the pulse train is constrained by the length of the fiber. For example, in a linear laser, the fundamental mode vos, of the laser can be expressed as:

$$v_{osc} = \frac{c}{2n_g L}$$

where c is the speed of light in vacuum, $n_g$ is the average group index, and L is the length of the cavity. Therefore, a 10 cm long fiber laser cavity element 2110 with an average group index of 1.47 would have a repetition rate of 1 GHz. In strictly passive systems, mode-locking can be achieved through the use of a saturable absorber. In an active laser, an amplitude modulator element 2150 can be inserted in the cavity to increase the repetition rate of the laser (harmonic mode locking). In order to achieve high repetition rate clocks using mode-locked USPL source, it is possible to use one or more of (i) an intra-cavity amplitude Mach-Zehnder modulator (MZM) 2150 as shown in FIG. 21 and (ii) a low threshold saturable absorber. These techniques, known as "harmonic mode-locking", can be utilized within a fiber based plant distribution system or within a FSO system, for terrestrial, submarine or FSO system either in air, space or submarine applications.

Detailed within FIG. 21 is 980 nm pump element 2102 coupled to an optical WDM device 2105. An erbium doped optical amplifier 2110 or equivalent can be used to create a non-linear environment to obtain a mode-locked pulse train emission within a closed cavity established between two Faraday reflectors 2101 and 2160 on either end of the optical USPL cavity. Operation of the device is capable of establishing a self-contained series of optical pulse in excess of 100 Gbps, and highly synchronized in nature at the output port 2170 of the module. In order to achieve a high gain non-linear medium the EDFA 2110 can be specially designed. A phase lock loop 2130 can provide advantageous stability in operation by maintaining a synchronized clock source through modulation of the signal through components 2120, 2130, 2150 of the self-contained high-repetition rate pulse generator. To achieve high rep rates in a laser that is limited by its dimensions (length in the case of a linear laser and perimeter in the case of a ring laser), it can be necessary to stimulate intra-cavity generation of the multiples of the fundamental mode. In the active case, an amplitude modulator inserted in the cavity modulates the loss of the system operating as a "threshold gating" device. For this approach to be successful, it can be necessary that the controlling signal to the modulator be referenced to the oscillation of the laser itself to avoid the driving signal "forcing" an external frequency of oscillation on the laser. This can be realized by the introduction of a phase-lock-loop element 2130, or a synchronous oscillator circuit to track-and-lock onto the repetition rate of the laser, and regenerate the signal. In the case of a PLL, the RF output can be set to a multiple of the input signal (much as this device is used in cell phone technology), and the rep rate of the laser increased. The signal can then be used for triggering of a pulse generator, or in conjunction with a low-pass filter. A MZ amplitude modulator 2150 outside the laser cavity can be used to create On-Off Keying (OOK) modulation on the pulse train coming out of the mode-locked laser.

Figure 22:
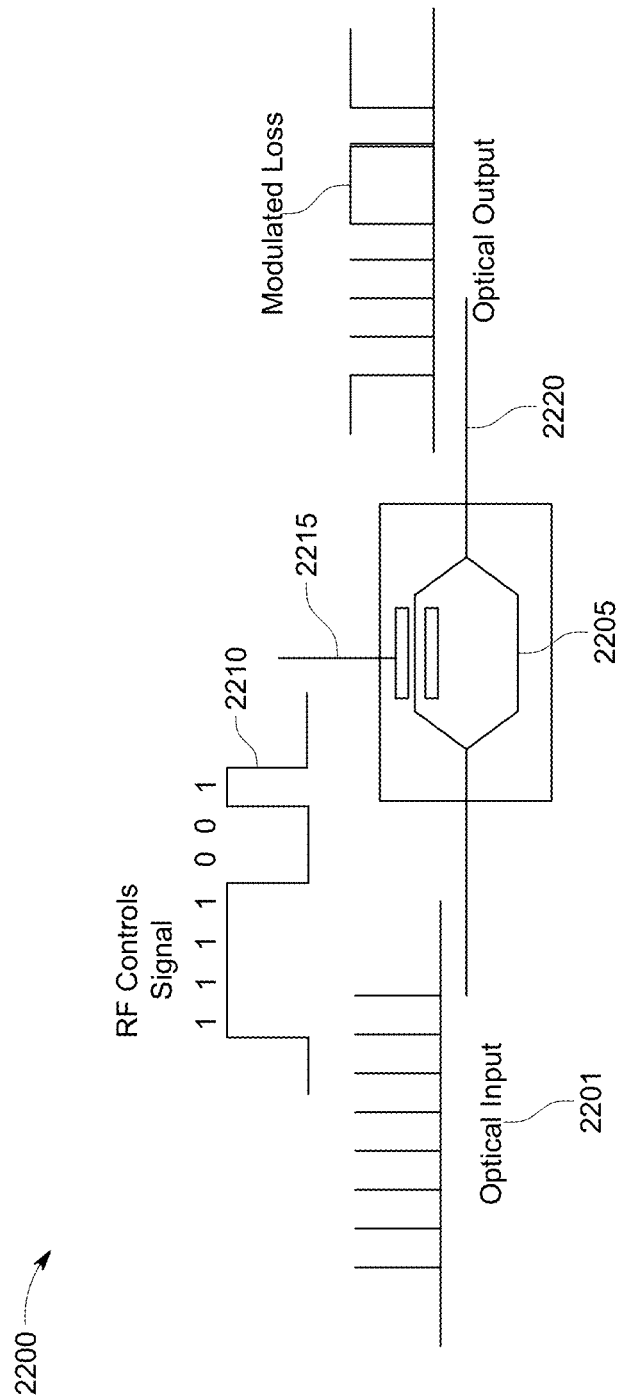
FIG. 22 and FIG. 23 depict examples of passive mode-locked linear fiber lasers using a carbon nano-tubes saturable absorber: fiber reflector (FR), wavelength-division multiplexer (WDM), Erbium-doped fiber (EDF), optical coupler (OC), and saturable absorber (SA).

FIG. 22 shows a graphical depiction 2200 illustrating effects of a loss modulation introduced to the input pulse train 2201 due to the presence of the amplitude modulator 2205 with a controlling signal NRZ signal 2210 made of a bit sequence as illustrated. The resulting signal at the output of the device 2220 represents an NRZ to RZ converter device for use in telecommunications and scientific applications where the application may benefit from RZ data streams. A clock signal 2201 (optical input) at a given pulse repetition rate will pass through the modulator 2205. At the same time, a controlling signal consisting of a sequence of 1's and 0's can be applied to the RF port of the modulator element 2215. When the modulator element 2215 is biased at minimum transmission, in the absence of a controlling signal the loss experienced by the optical signal can be at its maximum. In the presence of the RF signal (1's), the loss will drop to a minimum (OPEN GATE), thus working as an On-Off Keying modulation device. The pulse width of the output optical signal is typically much less than the time slot occupied by a single bit of information (even less than a half clock period of a NRZ scheme) making this system genuinely RZ as identified by element 2220.

Figure 23:
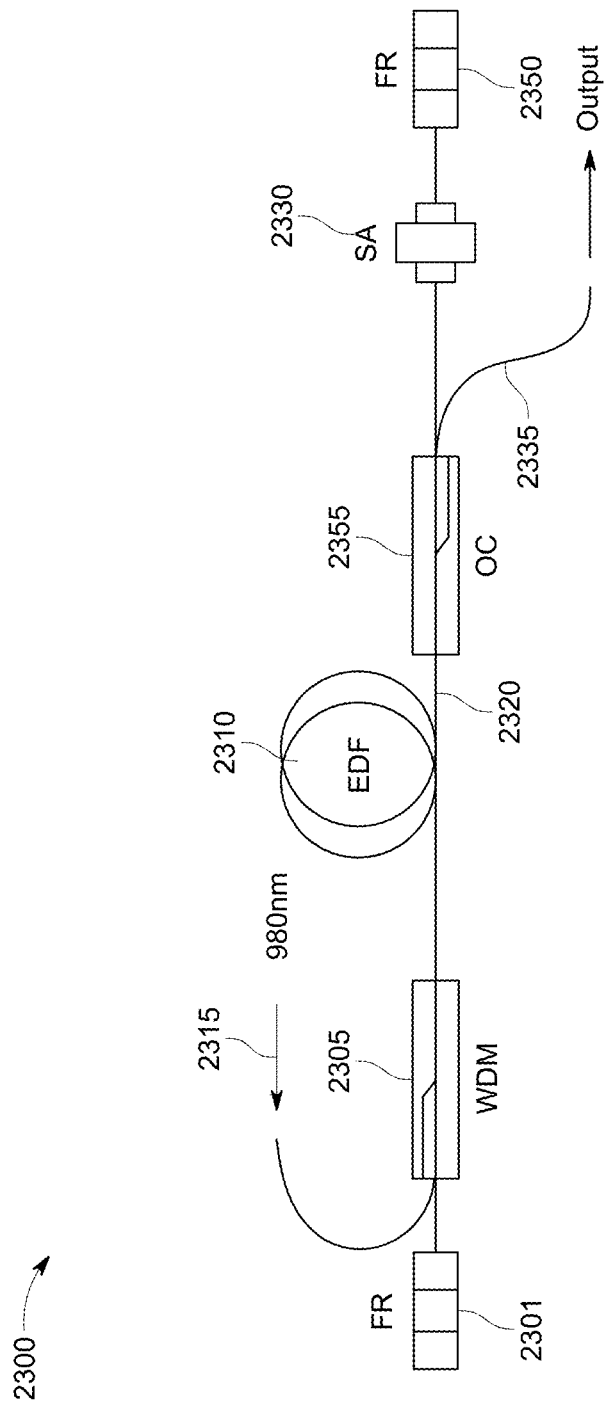

FIG. 23 illustrates an example system 2300 for generation of high optical harmonic USPL pulse streams having high pulse repetition rate using a saturable absorber (SA) device 2330. The SA device 2330 can in some examples include carbon nanotubes. Passive mode-locked fiber lasers using carbon nanotubes SA (CNT-SA) make another attractive option for high rep rate sources due to their ability to generate high harmonics of the fundamental rep rate. In the approach described, a closed, self-contained optical cavity is established, in which two Faraday reflectors 2301 and 2350 form the optical cavity. Although a high-power erbium doped fiber amplifier (EDFA) 2310 is shown in FIG. 23, any inverting medium producing a non-linear optical cavity can be used. A seed laser 2315, such as for example a 980 nm pump laser as shown in FIG. 23 can be used in generating a high-repetition rate optical train. In particular, any suitable pump laser may be considered in terms of optical wavelength and pulse repetition rate required. The SA element 2330 can be placed within the cavity to establish required optical pulse characteristics 2350 as required through design requirements.

FIG. 23 shows the schematics of an example of a laser that can be used in one or more implementations of the current subject matter. Unlike the active laser shown in FIG. 22, here the MZ modulator can be replaced by the SA element 2330. A technique similar to those described herein can be utilized within a fiber based plant distribution system or within a FSO system, for terrestrial, submarine or FSO system either in air, space or submarine applications.

Figure 24:
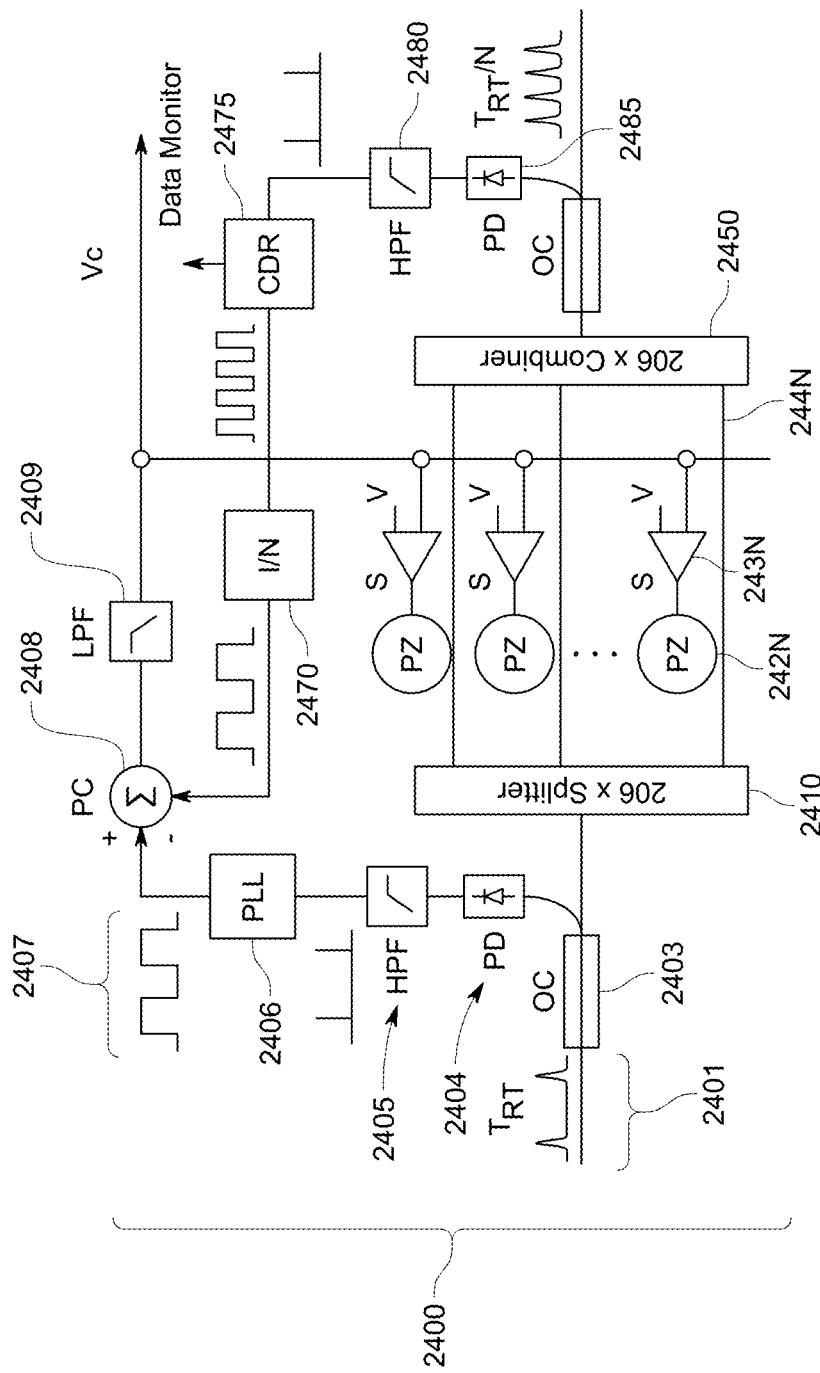
FIG. 24 depicts an example of a time-delay stabilization mechanism: optical coupler (OCin, OCout), photo-detector (PDin, PDout), high-pass filter (HPF), low-pass filter (LPF), phase-locked loop (PLL), phase-comparator (PC), frequency-divider (1/N), clock-data recovery system (CDR), piezoelectric actuator (PZ1 . . . . PZN), summing op amp, for use in stabilizing the optical pulse to pulse relationship produced from the USPL source.

FIG. 24 illustrates an approach to providing time-domain multiplexing (TDM) where the TDM multiplexes a pulse train using parallel time delay channels. In some instances, it can become important to manipulate the delay channels such that they are "consistent" relative to each another. The frequency of the output multiplexed pulse train can ideally as much as possible be insensitive to environmental changes. For that, a proposed feedback loop control system is design to correct the delay units for any fluctuations which compromises the stability of the output rep rate.

FIG. 24 shows a diagram of an example of a delay control system 2400. The control loop can be implemented in one of several ways consistent with the current subject matter. FIG. 24 describes one possibility for illustration purposes. The input pulse train enters the TDM and multiplexes into N paths, each with its own delay line. If the paths are made of low "bending-loss" fiber waveguides, then each path can be coiled around a cylindrical piezoelectric actuator (PZ) of radius R. The actuators generally expand in a radial direction as a result of a controlling voltage (Vc). This expansion $\Delta R$, which is linearly proportional to Vc, causes a change in length of the fiber $\Delta L=2\pi N\Delta R$, where N is the number of fiber turns around the PZ. For Terahertz multiplexing, the delay between the pulses (and thus of PZ1) must be 1 picosecond. This can require a change in length equals to 200 microns, which, for a one turn PZ actuator corresponds to a $\Delta R=32.5$ microns. Most commercially available piezoelectric actuators are highly linear and operate well within this range. The control mechanism can, therefore, be based on several PZ actuators, each with a number of turns corresponding to multiples of the first delay, i.e. (32, 64, 96 microns, etc.), and controlled by a single voltage Vc. The controlling voltage is determined by the feedback system, which compares the frequency of the output signal using a 1/N divider, with the frequency of the input signal, using a phase comparator (PC). The frequency of the "slow" input optical signal (represented by the waveform with $\tau RT$ in FIG. 24 is converted to an RF signal using photo-detector PDin. In order to reduce the effects of electronic jitter, a "differentiator" (or high pass filter) can be applied to the RF signal as to steepen the leading edges of the pulses. A phase-locked loop is used to track-and-lock the signal, and to regenerate it into a 50% duty-cycle waveform. Likewise, in the output side, the optical signal is picked-up by photo-detector PDout, high-pass filtered, and regenerated using the clock output port of a clock-and-data recovery system. The clock of the output signal, which has a frequency N times the frequency of the input signal, is send to an N times frequency divider before going to the phase comparator. From the phase comparator, a DC voltage level representing the mismatch between the input and output signals (much as what is used in the architecture of PLL circuits) indicates the direction of correction for the actuators. A low-pass filter adds a time constant to the system to enhance its insensitivity to spurious noise.

A CDR can advantageously be used in the output, as opposed to a PLL such that the output signal may, or may not, be modulated. This system can be designed to work in both un-modulated, and "intra-TDM modulated" (i.e. one modulator at each delay path) schemes. However, this is a completely deterministic approach to compensating for variations on the length of the delay lines. Ideally, and within a practical standpoint, the delay paths should all be referenced to the same "thermal level" i.e. be sensitive to the same thermal changes simultaneously. In the event that each line senses different variation, this system would not be able to correct for that in real time.

In the alternative, a completely statistical approach can include summing of op amp circuits (S1 . . . SN) to deliver the controlling voltage to the actuators. Using such an approach, input voltages (V1 to VN) can be used to compensate for discrepancies in length between the lines, in a completely static sense, otherwise they can be used for initial fine adjustments to the system. The approach typically must also compensate or at least take into account any bending loss requirements of the fibers used. Some new fibers just coming out in the market may have a critical radius of only a few millimeters.

In the event that each path delay line senses different variation in temperature or experiences uncorrelated length changes due to spurious localized noise, the previously described approach, as is, may suffer from difficulties in performing a real time correction. A more robust approach operating in a completely statistical sense can be used consistent with some implementations of the current subject matter. In such an approach, summing op amp circuits (S1 . . . SN) can be used to deliver the controlling voltages to the actuators. In this case, the input voltages (V1 to VN) can be used to compensate for discrepancies in length between the delay lines in a completely statistical sense, otherwise they can only be useful for initial fine adjustments to the system (calibration).

Referring again to FIG. 24, an incoming USPL source identified as element 2401 is coupled to an optical coupler element 2403, such that one leg of the coupler connects to an optical photodiode selected for operation at the operational data rate of 2401. Using standard electronic filtering techniques described by elements 2404, 2405, and 2406 an electrical square wave representation of the incoming USPL signal is extracted and identified by element 2407. The second optical leg of coupler 2403 is interfaced into an appropriate optical splitter element identified by 2410, where the incoming signal into 2410 is split into 206 parallel optical paths. Also illustrated are variable rate optical delay lines established in parallel for each of the parallel branches of the splitter element 2410. The parallel piezoelectric elements are identified by elements 242N and are controlled electronically through feedback circuitry within the diagram. A control voltage identified by Vc is generated through a photodiode 2485 along with electronic circuitry elements 2480 and 2475. The clock-and-data Recovery (CDR) element 2475 produces a clock source that is used in controlling each of the PZ elements. Optical paths identified as 244N are combined after a proper delay is introduced into each leg of element 2410. The pulse multiplied USPL signal 2490 is thereby generated.

Figure 25:
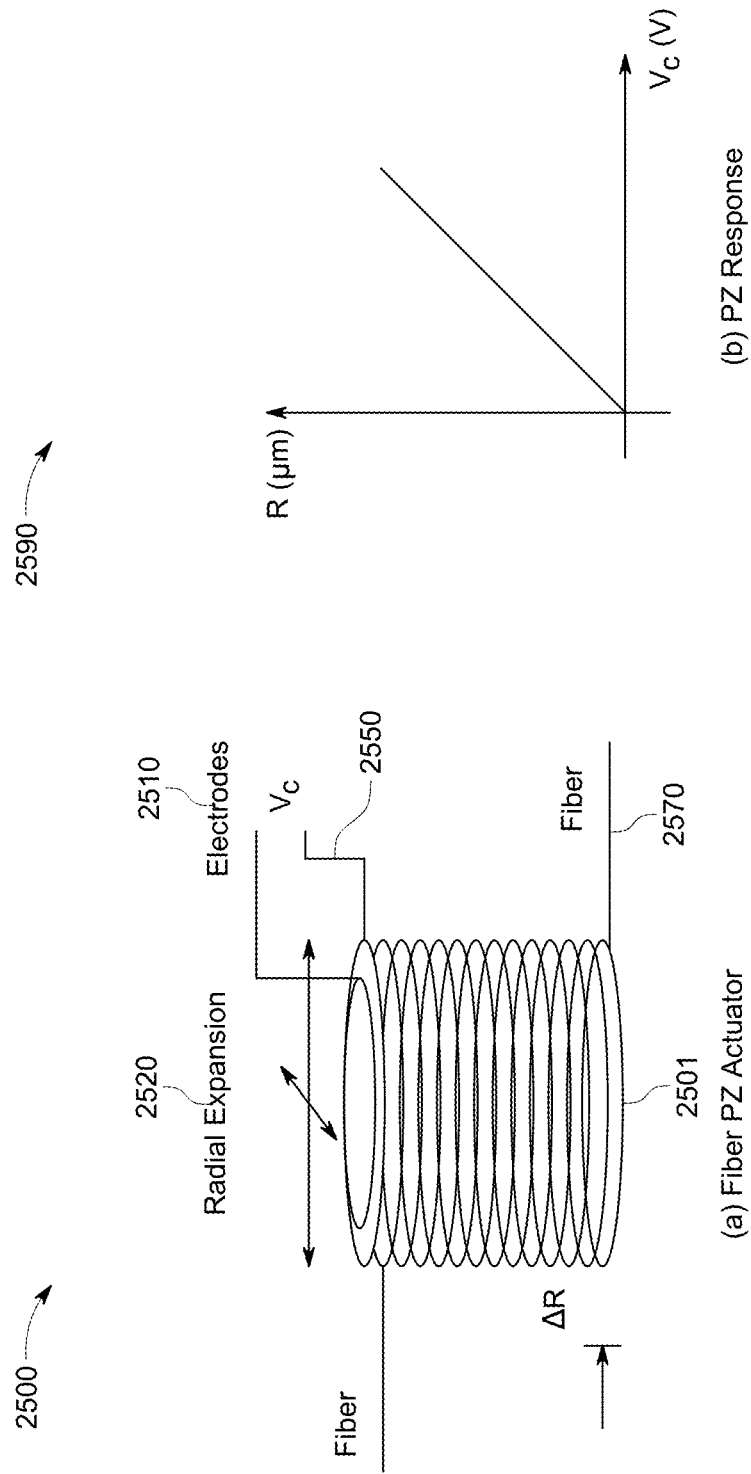
FIG. 25A and FIG. 25B respectively include a schematic diagram and a graph relating to an example of a controlling mechanism to stabilize the output frequency of TDM sources utilizing an idealized PZ actuator.

FIG. 25A shows a schematic of a fiber PZ actuator 2500, and FIG. 25B shows a graph 2590 of radius vs. voltage for such an actuator. Together, these drawings illustrate operation of a PZ actuator for increasing the pulse repetition rate of an incoming USPL pulse train through induced optical delay. Although shown for use as an element for enhancing pulse repetition rate generation for USPL signals, the same technique can be used for other optical devices requiring or benefiting from optical delay. The basic structure for the device is a fiber based PZ actuator 2501. When a voltage 2550 is applied to electrodes 2520 a voltage induced stress results within the fiber, causing a time delay of the optical signal traveling through the fiber. By varying applied voltage a performance curve of optical delay vs. applied voltage is obtained as shown in the graph 2590 of FIG. 25B.

Figure 26:
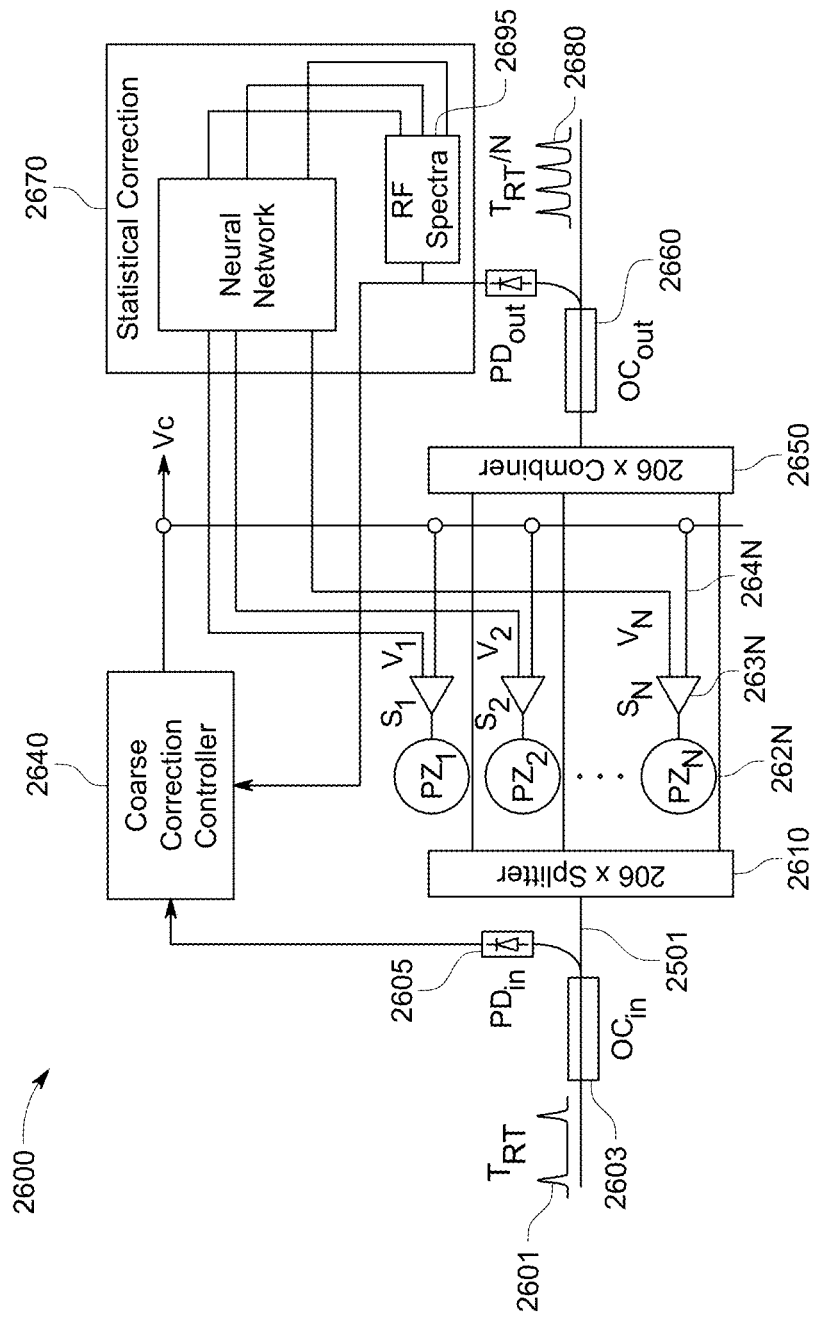
FIG. 26 depicts an example of a Time-Domain Multiplexing (TDM) where the TDM multiplexes a pulse train using parallel time delay channels, having the delay channels to be "consistent" relative to each another (Because the frequency of an output multiplexed pulse train is ideally as insensitive as possible to environmental changes, a feedback loop control system can correct the delay units for any fluctuations which compromise the stability of the output rep rate, and feedback can be provides through interconnection to a Neural Network).

FIG. 26 shows a diagram illustrating features of an example statistical corrector 2600. The coarse correction controller 2640 shown in FIG. 26 corresponds to the system described in the previous section, which can correct for length variations simultaneously picked up by all delay lines. As mentioned, these variations are expected to occur in a time scale much slower than the "intra delay line" spurious variations. This latter effect can manifest itself as a period-to-period jitter introduced on the system. This type of jitter can be monitored using an RF Spectrum Analyzer (RFA), causing the rep rate line of the system to display "side lines" (or side bands), which are the result of the analyzer beating together noisy frequencies resulting from uneven time intervals between consecutive pulses. One such pattern can be processed using an analog-to-digital converter (ADC) and saved as an array of values, which can then be fed to a neural network (NN) machine. Neural network machines are known to possess excellent adaptability characteristics that allow them to essentially learn patterns from outside events by adapting to new set of input and outputs. A set of inputs in this case can be generated from a set of "imperfect observations", i.e. "noisy" outputs of the TDM system as detected by the RFA and converted to digital arrays by the ADC ({f1, f2, . . . , fN}, where fi is a frequency component picked up by the RFA). A set of outputs can be generated from the corrections ({V1, V2, . . . , VN}, where Vt is a compensating input voltage to the summing op amp) required to rid the output frequency set from the undesired excess frequency noise, which is due to the outside perturbations to the system. With a sufficiently large number of {f,V} pairs, where f, V are frequency, voltage arrays, one can build an statistical set to train the NN machine to learn the underlying pattern associated with the presence of the intra-channel noise. These machines can be found commercially in an IC format from several manufacturers, or implemented as software and used in conjunction with a computer feedback control mechanism. A single layer Perceptron type neural network, or ADALINE (Adaptive Linear Neuron or later Adaptive Linear Element), should be sufficient to accomplish the task.

Similar to the description provided above in relation to FIG. 24, a statistical corrector element 2670 can include electronic circuitry that is similar to or that provides similar functionality as the electrical circuitry elements 2480 and 2475 and the photodiode 2485 of FIG. 24. For the approach illustrated in FIG. 26, a RF spectra analyzer 2695 along with a Neural Network 2670 and a Coarse Correction Controller element 2640 are used to perform the requirement of optical delay introduced into a parallel series of PZ elements 262N.

Figure 27:
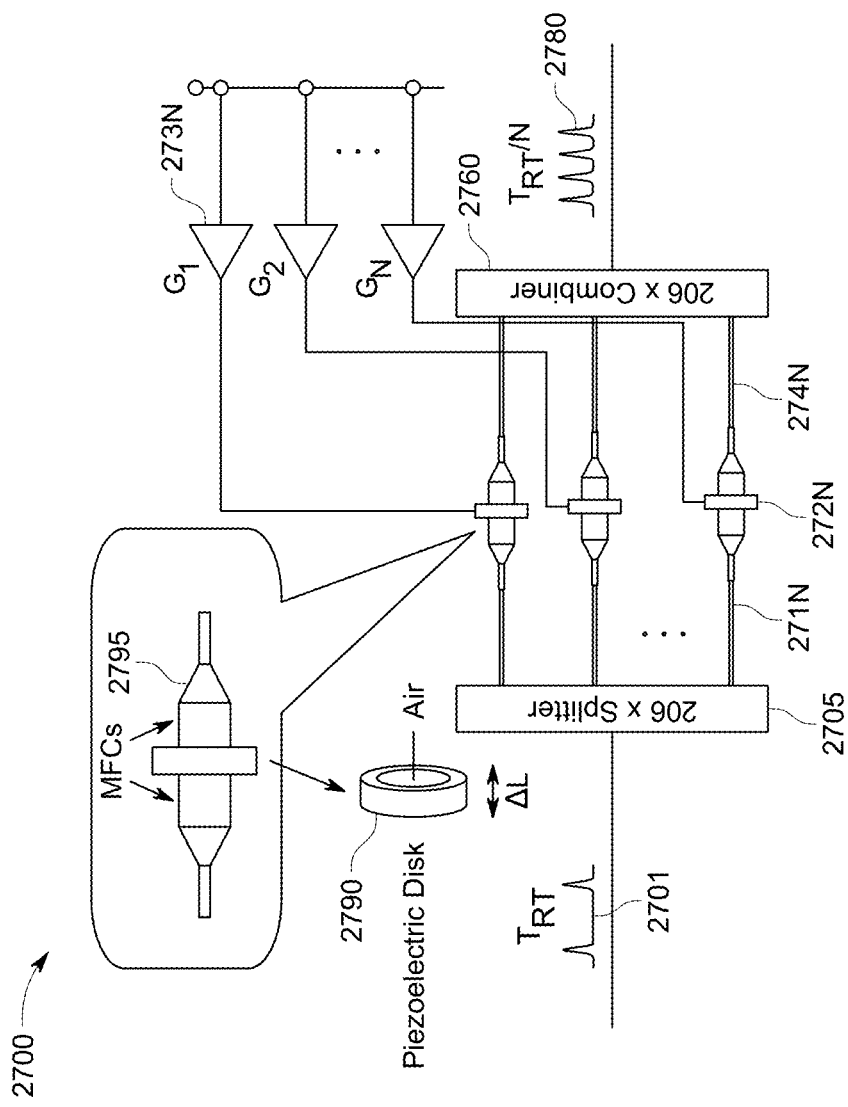
FIG. 27 depicts an example of use of fiber based collimators along with Piezoelectric transducers for controlling individual MFC circuits.

FIG. 27 illustrates concepts and capabilities of approaches consistent with implementations of the current subject matter in which performance, accuracy, and resolution can be improved through replacement of piezoelectric disk (PZ) modules identified by elements 2795 and 272N, where compact micro fiber based collimators (MFC) 2795 encircled by ceramic disks are used to obtain optical delay lines. Although illustrating a technique for increasing the native pulse repetition rate for a USPL pulse train, the design illustrated is not limited to such applications but can be applied or extended to other needs within the optical sector wherever optical delay is required. In so doing, a more controlled amount of temporal delay can be introduced within each MFC element of the circuit. The improvement through the use of utilizing MFC elements can improve response, resolution, and the achievement of reproducing in a rapid fashion required voltage responses in a mass production means. The concept identified within FIG. 27 can be incorporated into precisely produced elements that can serve as complementary paired units for use in reducing USPL pulse-to-pulse jitter as well as for the purposes of data encryption needs.

With further reference to FIG. 27, a USPL source 2701 having a certain pulse repetition rate is split into a preselected number of optical paths 271N (which can number other than 206) as identified by splitter element 2705. An appropriately controlled delay 273N is introduced into each parallel leg of the split optical paths 271N using elements described by 2795 and 272N. The resulting delayed paths 274N are added together through an optical combiner element 2760. The pulse multiplied USPL signal 2780 results.

One potential disadvantage of some previously available TDM designs, in which fibers are "wrapped-around" the piezo actuators, is that the mechanism must comply with the bending loss requirements of the fibers used. Some new fibers just coming out in the market have critical radius of only a few millimeters. To correct for this issue, implementations of the current subject matter can use of micromachined air-gap U-brackets in lieu of the fiber-wrapped cylindrical piezo elements. FIG. 27 illustrates this principle. In this approach, the piezoelectric actuators (PZ1, ... PZN) can be replaced by air gap U-bracket structures constructed using micro-fiber collimators (MFCs), and micro-rings made of a piezoelectric material. In this case, however, the piezoelectric actuator expands longitudinally, increasing (or decreasing) the air gap distance between the collimators, in response to the controlling voltages (V1, V2, ... VN). As in the case of the cylindrical piezoelectric, a single voltage Vc can be use to drive all the piezoelectric devices, provided that the gains of each channel (G1, G2, ... GN) are adjusted accordingly to provide the correct expansion for each line. Ideally, except for inherent biases to the system (i.e. intrinsic differences between op amps), the gain adjustments should be as G1, 2G1, 3G1, and so forth, in order to provide expansions, which are multiples of the τRT/N. Another way of implementing such an approach can be the use of multiple piezoelectric rings at the channels. In that manner, one can have channels with 1, 2, 3, N piezoelectric rings driven by the same voltage with all amplifiers at the same gain.

FIG. 28 provides a conceptual presentation of an optical chip system 2800 to successfully bridge between two remote 10 GigE switches. Ideally, such a connection can perform similarly to a simple piece of fiber. The timing of the TDM chip can be driven by the 10 GigE switch.

In reference to FIG. 28, a USPL source 2805 having a predetermined native pulse repetition rate identified by 2806 connects to an optical Pulse multiplier chip 2807. Element 2807 is designed to convert the incoming pulse repetition rate signal 2806 into an appropriate level for operation with high-speed network Ethernet switches as identified by 2801. Switch 2801 provides a reference signal 2802 used to modulate signal 2809 by way of a standard electro-optic modulator 2820 at the data rate of interest. A resulting RZ optical signal is generated as shown in element 2840.

An alternative to having the timing run from the 10 GigE switch is to buildup the USPL to a Terabit/second (or faster) with a multiplier photonic chip, and then modulate this Terabit/second signal directly from the 10 GigE switch. Each bit will have 100 or so pulses. An advantage of this approach can be the elimination of a need for separate timing signals to be run from the switch to the USPL. The USPL via multiplier chip just has to pump out the Terabit/second pulses. Another advantage is that the output of the Multiplier Chip does not have to be exactly 10.313 or 103.12 Gbps. It just has to at a rate at about 1 Terabit/second. Where each 10 GigE bit has 100 or 101 or 99 pulses, this limitation is a non-issue. Another advantage is each bit will have many 10 USPL, so the 10 GigE signal will have the atmospheric propagation (fog and scintillation) advantage. Another advantage can be realized at the receiver end. It should be easier for a detector to detect a bit if that bit has 100 or so USPL pulses within that single bit. This could result in improved receiver sensitivity, and thus allow improved range for the FSO system. An additional advantage can be realized in that upgrading to 100 GigE can be as simple as replacing the 10 GigE switch with a 100 GigE switch. Each bit will have around 10 pulses in this case.

From a purely signal processing perspective this approach demonstrates an efficient way to send data and clock combined in a single transmission stream. Much like a "sampling" of the bits using an optical pulse stream, this approach has the advantage that the bit "size" is determined by the maximum number of pulses the it carries, therefore establishing a basis for counting bits as they arrive at the receiving end. In other words, if the bit unit has a time slot which can fit N pulses, the clock of the system can be established as "one new bit of information" after every 5th.

A technique similar to those described herein can be utilized within a fiber based plant distribution system or within a FSO system, for terrestrial, submarine or FSO system either in air, space or submarine applications, and illustrates for the first time how the interconnection from USPL sources to optical network elements is achieved for networking applications.

Figure 29:
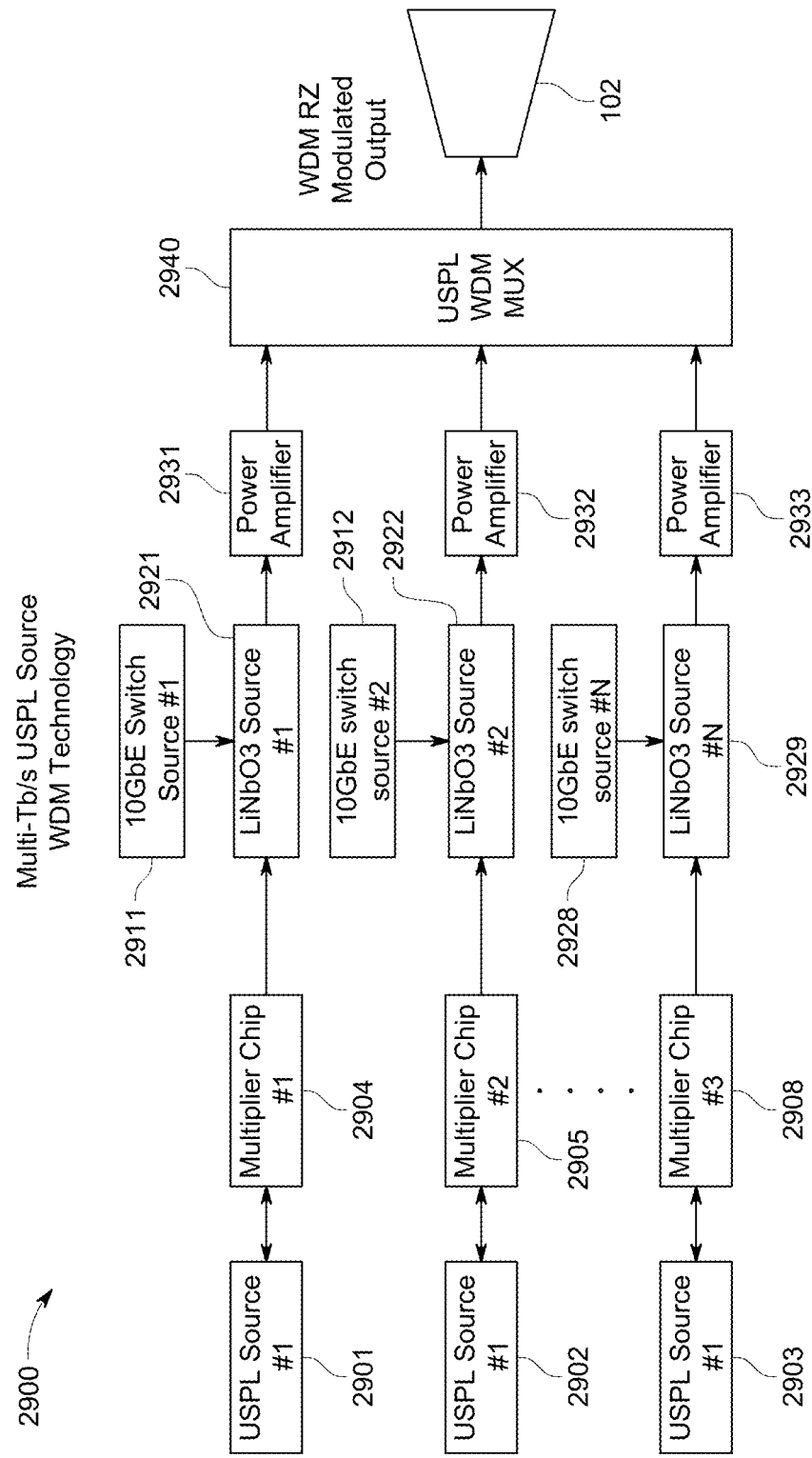
FIG. 29 depicts an example of timing of the TDM chip from the USPL modulation source to provide a Terabit/second (or faster) with a Multiplier Photonic chip operating in a WDM configuration.

FIG. 29 shows a system 2900 that illustrates a conceptual network extension for the design concept reflected within FIG. 28. As multiple USPL sources 2901, 2902, 2903 (it should be noted that while three are shown, any number is within the scope of the current subject matter), each modulated through dedicated optical switches and USPL laser Multiplier Chips circuits are configured in a WDM arrangement. As described in reference to FIG. 28, electrical signals from each Ethernet switch can be used to modulate dedicated optical modulators 2911, 2922, 2928 for each optical path. Optical power for each segment of the system can be provided by optical amplification elements 2931, 2932, 2933 for amplification purposes. Each amplified USPL path can then be interfaced to an appropriate optical combiner 2940 for transport to a network 2950, and can be either free space or fiber based as required. The output from the WDM module can then be configured to a transmitting element 102 for FSO transport or into fiber plant equipment.

The technique described herein can be utilized within a fiber based plant distribution system or within a FSO system, for terrestrial, submarine or FSO system either in; air, space or submarine applications, and illustrates for the first time how the interconnection from USPL sources to optical network elements is achieved for networking applications.

Figure 30:
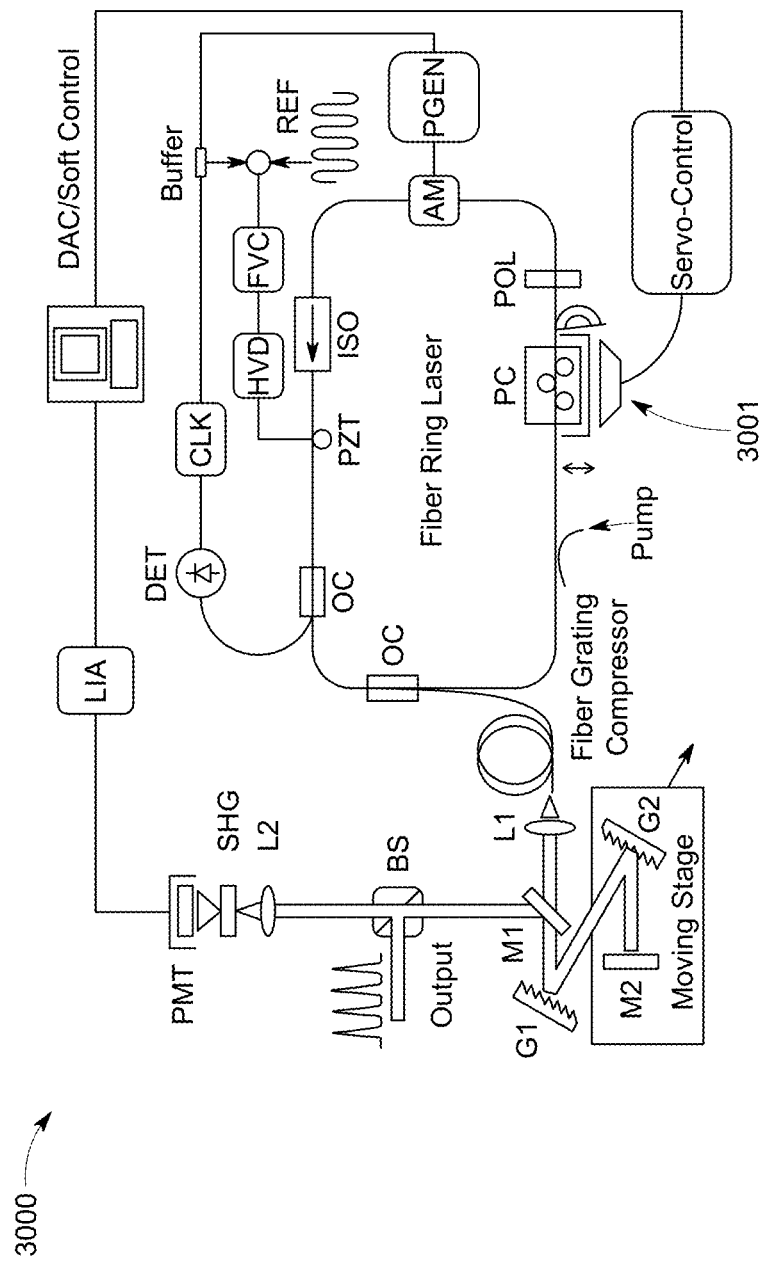
FIG. 30 depicts an example of construction of a computer assisted system, which can control the pulse width of an all-fiber mode-locked laser using recursive linear polarization adjustments with simultaneous stabilization of the cavity's repetition rate using a synchronous self-regenerative mechanism and can also offer tunability of the repetition rate, and pulse width.

FIG. 30 shows the schematics of an experimental setup for implementations of the current subject matter to include construction of a computer assisted system to control the pulse width of an all-fiber mode-locked laser using recursive linear polarization adjustments with simultaneous stabilization of the cavity's repetition rate using a synchronous self-regenerative mechanism. The design can also offer tune-ability of the repetition rate, and pulse width.

The fiber ring laser is represented by the inner blue loop, where all intra-cavity fiber branches are coded in blue, except for the positive high dispersion fiber outside the loop, which is part of the fiber grating compressor (coded in dark brown). The outside loops represent the feedback active systems.

FIG. 30 shows a diagram of a system 3000 illustrating features of an USPL module providing control of pulse width and pulse repetition rate control through mirrors (M1, M2), gratings (G1,G2), lengths (L1,L2), second-harmonic generator (SHG), photomultiplier tube (PMT), lock-in amplifier (LIA), data acquisition system (DAC), detector (DET), clock-extraction mechanism (CLK), frequency-to-voltage controller (FVC), high-voltage driver (HVD), reference signal (REF), pulse-generator (PGEN), amplitude modulator (AM), isolator (ISO), piezoelectric actuator (PZT), optical coupler (OC), polarizer (POL), and polarization controller (PC) all serve to provide control of pulse repetition rate and pulse width control.

The passive mode-locking mechanism can be based on nonlinear polarization rotation (NPR), which can be used in mode-locked fiber lasers. In this mechanism, weakly birefringent single mode fibers (SMF) can be used to create elliptically polarized light in a propagating pulse. As the pulse travels along the fiber, it experiences a nonlinear effect, where an intensity dependent polarization rotation occurs. By the time the pulse reaches the polarization controller (PC) 3001 the polarization state of the high intensity portion of the pulse experiences more rotation than the lower intensity one. The controller can perform the function of rotating the high intensity polarization component of the pulse, bringing its orientation as nearly aligned to the axis of the polarizer (POL) as possible. Consequently, as the pulse passes through the polarizer, its lower intensity components experience more attenuation than the high intensity components. The pulse coming out of the polarizer is, therefore, narrowed, and the entire process works as a Fast-Saturable Absorber (FSA). This nonlinear effect works in conjunction with the Group-Velocity Dispersion (GVD) of the loop, and, after a number of round trips, a situation of stability occurs, and passive mode-locking is achieved. The overall GVD of the optical loop can be tailored to produce, within a margin of error, an specific desired pulse width, by using different types of fibers (such as single mode, dispersion shifted, polarization maintaining, etc. . . . ), and adding up their contributions to the average GVD of the laser.

An active control of the linear polarization rotation from the PC can greatly improve the performance of the laser. This can be achieved using a feedback system that tracks down the evolution of the pulse width. This system, represented by the outer loop in FIG. 1, can be used to maximize compression, and consequently, the average power of the pulse. A pulse coming out of the fiber ring laser through an OC is expected to have a width on the order of a few picoseconds. An external pulse compression scheme, which uses a fiber grating compressor, is used to narrow the pulse to a sub 100 fsec range. This technique has been extensively used in many reported experiments, leading to high energy, high power, USPL pulses. Here, the narrowed pulse is focused on a Second-Harmonic Generator (SHG) crystal and detected using a Photo-Multiplying Tube (PMT). The lock-in-amplifier (LIA) provides an output DC signal to a Data Acquisition Card (DAC). This signal follows variations of the pulse width by tracking increases, or decreases, in the pulses' peak power. A similar technique has been successfully used in the past, except that, in that case, a Spatial Light Modulator (SLM) was used instead. Here, a programmable servo-mechanism directly controls the linear polarization rotation using actuators on the PC. With the DC signal data provided by the DAC, a decision-making software (such as, but not limited to, LABVIEW or MATLAB SIMULINK) can be developed to control the servo-mechanism, which in turn adjusts the angle of rotation of the input pulse relative to the polarizer's axis. These adjustments, performed by the actuators, are achieved using stress induced birefringence. For instance, if the pulse width decreases, the mechanism will prompt the actuator to follow a certain direction of the linear angular rotation to compensate for that, and if the pulse width increases, it will act in the opposite direction, both aimed at maximizing the average output power.

A self-regenerative feedback system synchronized to the repetition rate of the optical oscillation, and used as a driving signal to an amplitude modulator (AM), can regulate the round trip time of the laser. In the active system, the amplitude modulator acts as a threshold gating device by modulating the loss, synchronously with the round trip time. This technique has can successfully stabilize mode-locked lasers in recent reports. A signal picked up from an optical coupler (OC) by a photo-detector (DET) can be electronically locked and regenerated by a clock extraction mechanism (CLK) such as a Phase-Locked Loop or a Synchronous Oscillator. The regenerated signal triggers a Pulse Generator (PGen), which is then used to drive the modulator. In a perfectly synchronized scenario, the AM will "open" every time the pulse passes through it, at each round trip time (TRT). Because the CLK follows variations on TRT, the driving signal of the AM will vary accordingly.

An outside reference signal (REF) can be used to tune the repetition rate of the cavity. It can be compared to the recovered signal from the CLK using a mixer, and the output used to drive a Piezoelectric (PZT) system, which can regulate the length of the cavity. Such use of a PZT system to regulate the cavity's length is a well-known concept, and similar designs have already been successfully demonstrated experimentally. Here a linear Frequency-to-Voltage Converter (FVC) may be calibrated to provide an input signal to the PZT's High Voltage Driver (HVD). The PZT will adjust the length of the cavity to match the repetition rate of the REF signal. If, for instance the REF signal increases its frequency, the output of the FVC will decrease, and so will the HV drive level to the piezoelectric-cylinder, forcing it to contract and, consequently increasing the repetition rate of the laser. The opposite occurs when the rep. rate of the reference decreases.

It is possible to have the width of the pulse tuned to a "transformed-limited" value using a pair of negative dispersion gratings. This chirped pulse compression technique is well established, and there has been reports of pulse compressions as narrow as 6 fs. The idea is to have the grating pair pulse compressor mounted on a moving stage that translates along a line which sets the separation between the gratings. As the distance changes, so does the compression factor.

In an example of a data modulation scheme consistent with implementations of the current subject matter, a passively mode locked laser can be used as the source of ultrafast pulses, which limits our flexibility to change the data modulation rate. In order to scale up the data rate of our system, we need to increase the base repetition rate of our pulse source. Traditionally, the repetition rate of a passively mode locked laser has been increased by either shortening the laser cavity length or by harmonic mode-locking of the laser. Both techniques cause the intra-cavity pulse peak power to decrease, resulting in longer pulse-widths and more unstable mode-locking.

Figure 31:
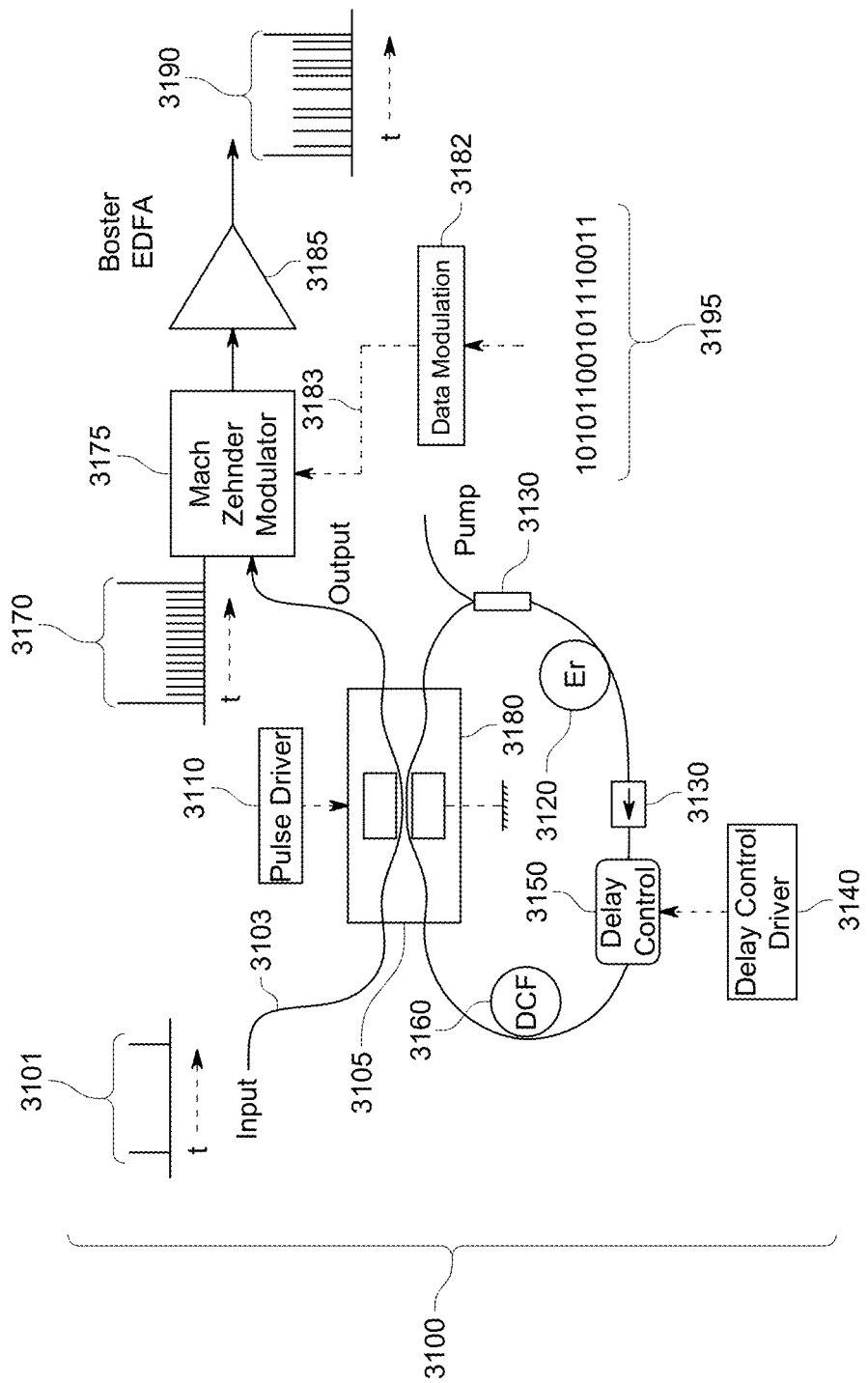
FIG. 31 depicts an example of a modified pulse interleaving scheme, by a pulse multiplication technique, in which the lower repetition rate pulse train of a well-characterized, well-mode locked laser can be coupled into an integrated-optical directional coupler, where a well-determined fraction of the pulse is tapped off and "re-circulated" in an optical loop with an optical delay equal to the desired inter-pulse spacing in the output pulse train, and re-coupled to the output of the directional coupler.

One approach to solving this problem involves use of a modified pulse interleaving scheme, by a technique which we call pulse multiplication. FIG. 31 illustrates this concept. The lower repetition rate pulse train of a well-characterized, well-mode locked laser 3101 is coupled into an integrated-optical directional coupler 3180, where a well-determined fraction of the pulse is tapped off and "re-circulated" in an optical loop with an optical delay 3150 equal to the desired inter-pulse spacing in the output pulse train, and re-coupled to the output of the directional coupler. For instance, to generate a 1 GHz pulse train from a 10 MHz pulse train, an optical delay of 1ns is required, and to enable the 100th pulse in the train to coincide with the input pulse from the 10 MHz source, the optical delay might have to be precisely controlled. The optical delay loop includes optical gain 3120 to compensate for signal attenuation, dispersion compensation 3160 to restore pulse-width and active optical delay control 3150. Once the pulse multiplication has occurred, the output pulse train is OOK-modulated 3175 with a data stream 3182 to generated RZ signal 3190, and amplified in an erbium-doped fiber amplifier 3185 to bring the pulse energy up to the same level as that of the input pulse train (or up to the desired output pulse energy level).

One or more of the features described herein, whether taken alone or in combination, can be included in various aspects or implementations of the current subject matter. For example, in some aspects, an optical wireless communication system can include at least one USPL laser source, which can optionally include one or more of pico-second, nano-second, femto-second and atto-second type laser sources. An optical wireless communication system can include USPL sources that can be fiber-coupled or free-space coupled to an optical transport system, can be modulated using one or more modulation techniques for point-to-multi-point communications system architectures, and/or can utilize optical transport terminals or telescopes manufactured through one or more of hyperbolic mirror fabrication techniques, conventional Newtonian mirror fabrication techniques, or other techniques that are functionally equivalent or similar. Aspheric optical designs can also or alternatively be used to minimize, reduce, etc. obscuration of a received optical signal.

Free-space optical transport systems consistent with implementations of the current subject matter can utilize USPL laser designs that focus a received signal at one ideal point. In some implementations one telescope or other optical element for focusing and delivering light can be considered as a transmitting element and a second telescope or other optical element for focusing and receiving light positioned remotely from the first telescope or other optical element can function as a receiving element to create an optical data-link. Both optical communication platforms can optionally include components necessary to provide both transmit and receive functions, and can be referred to as USPL optical transceivers. Either or both of the telescopes or other optical elements for focusing and delivering light can be coupled to a transmitting USPL source through either via optical fiber or by a free-space coupling to the transmitting element. Either or both of the telescopes or other optical elements for focusing and receiving light can be coupled to a receive endpoint through either optical fiber or a free-space coupling to the optical receiver. A free-space optical (FSO) wireless communication system including one or more USPL sources can be used: within the framework of an optical communications network, in conjunction with the fiber-optic backhaul network (and can be used transparently within optical communications networks within an optical communications network (and can be modulated using On-Off keying (OOK) Non-Return-to-Zero (NRZ), and Return-to-Zero (RZ) modulation techniques, within the 1550 nm optical communications band), within an optical communications network (and can be modulated using Differential-Phase-Shift Keying (DPSK) modulation techniques), within an optical communications network (and can be modulated using commonly used modulation techniques for point-to-point communications system architectures using commonly used free-space optical transceiver terminals), within an optical communications network utilizing D-TEK detection techniques, within a communications network for use in conjunction with Erbium-Doped Fiber Amplifiers (EDFA) as well as high power Erbium-Ytterbium Doped Fiber Amplifiers (Er/Yb-DFA), within an optical communications network (and can be modulated using commonly used modulation techniques for point-to-multi-point communications system architectures), etc.

USPL technology can, in some aspects, be utilized as a beacon source to providing optical tracking and beam steering for use in auto-tracking capabilities and for maintaining terminal co-alignment during operation. The recovered clock and data extracted at the receive terminal can be used for multi-hop spans for use in extending network reach. The optical network can be provided with similar benefits in WDM configurations, thereby increasing the magnitude of effective optical bandwidth of the carrier data link. USP laser sources can also or alternatively be polarization multiplexed onto the transmitted optical signal to provide polarization multiplex USP-FSO (PM-USP-FSO) functionality. The recovered clock and data extracted at the receive terminal can be used for multi-hop spans for use in extending network reach, and can include a generic, large bandwidth range of operation for providing data-rate invariant operation.

An optical pre-amplifier or semi-conductor optical amplifier (SOA) can be used prior to the optical receiver element and, alternatively or in combination with the recovered clock and data extracted at the receive terminal, can be used for multi-hop spans for use in extending network reach, having a generic, large bandwidth range of operation for providing data-rate invariant operation. Terminal co-alignment can be maintained during operation, such that significant improvement in performance and terminal co-alignment can be realized through the use of USPL technology, through the use of USPL data source as well as providing a improved approach to maintaining transceiver alignment through the use of USPL laser beacons.

USPL-FSO transceivers can be utilized in some aspects for performing remote-sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. USPL-FSO transceivers consistent with implementations of the current subject matter can be utilized in non-line of sight lasercom applications. USPL-FSO transceivers consistent with implementations of the current subject matter can allow adjustment of the distance at which the scattering effect (enabling NLOS technique) takes place, reception techniques to improve detection sensitivity using DTech detection schemes, and improved bandwidth via broadband detectors including frequency combs. USPL-FSO transceivers consistent with implementations of the current subject matter can be utilized in conjunction with Adaptive Optic (AO) Techniques for performing incoming optical wave-front correction (AO-USPL-FSO). USPL-FSO transceivers consistent with implementations of the current subject matter can be utilized and operate across the infrared wavelength range.

USPL-FSO transceivers consistent with implementations of the current subject matter can be utilized in conjunction with optical add-drop and optical multiplexing techniques, in both single-mode as well as multi-mode fiber configurations. A USPL-FSO transceiver consistent with implementations of the current subject matter can be utilized and operated across the infrared wavelength range as a range-finder and spotting apparatus for the purposes of target identification and interrogation applications.

In other aspects of the current subject matter, a series of switched network connections, such as for example 10 GigE, 100 GigE, or the like connections can be connected from one point to another, either over fiber or free-space optics, for example via Time Division Multiplexing (TDM).

A mode-locked USPL source consistent with implementations of the current subject matter can be used to generate both clock and data streams. Mode-locked lasers can represent a choice of a high performance, high finesse source for clocks in digital communication systems. In this respect, mode-locked fiber lasers—in either linear or ring configuration—can make an attractive candidate of choice, as they can achieve pulse widths of the USPL sources region and repetition rate as high as GHz.

High harmonic generation can be achieved using carbon nano-tubes saturable absorbers. Passive mode-locked fiber lasers using carbon nano-tubes saturable absorbers (CNT-SA) make an option for high rep rate sources due to their ability to readily generate high harmonics of the fundamental rep rate.

FSO can be used in terrestrial, space and undersea applications.

Conditional path lengths control from splitter to aperture can be an important parameter. TDM multiplexes can be employed consistent with implementations of the current subject matter to control the relative temporal time delay between aperture-to-source paths. Each pulse train can be controlled using parallel time delay channels. This technique can be used to control conventional multiple-transmit FSO aperture systems employing WDM as well as TDM systems. USPL laser pulse-to-pulse spacing can be maintained and controlled to precise temporal requirements for both TDM and WDM systems. The techniques described can be used in TDM and WDM fiber based system. The use of TDM multiplexers as described herein can be used implement unique encryption means onto the transmitted optical signal. A complementary TDM multiplexer can be utilized to invert the incoming received signal, and thereby recover the unique signature of the pulse signals. A TDM multiplexer described herein can be utilized to control WDM pulse character for the purpose of WDM encryption. A TDM multiplexer can be used in conventional FSO systems wherein multiple apertures connected to a common source signal are capable of having the temporal delay between pulses controlled to maintain constant path lengths. A TDM multiplexer can be used for TDM fiber based and FSO based systems. A TDM multiplexer can be an enabling technology to control optical pulse train relationship for USPL sources. A TDM multiplexer can be used as an atmospheric link characterization utility across an optical link through measurement of neural correction factor to get same pulse relational ship.

Any combination of PZ discs can be used in a transmitter and can have an infinite number of encryption combinations for USPL based systems, both fiber and FSO based. The timing can run from 10 GigE switches or the equivalent and to build up the USPL to a Terabit/second (or faster) rate with a Multiplier Photonic chip, and this Terabit/second signal can be modulated directly from the 10 GigE switch. While operating in a WDM configuration, an interface either to a fiber based system or to a FSO network element can be included.

A system can accept an ultrafast optical pulse train and can generate a train of optical pulses with pulse-width, spectral content, chirp characteristics identical to that of the input optical pulse, and with a pulse repetition rate being an integral multiple of that of the input pulse. This can be accomplished by tapping a fraction of the input pulse power in a 2×2 optical coupler with an actively controllable optical coupling coefficient, re-circulating this tapped pulse over one round trip in an optical delay line provided with optical amplification, optical isolation, optical delay (path length) control, optical phase and amplitude modulation, and compensation of temporal and spectral evolution experienced by the optical pulse in the optical delay line for the purpose of minimizing temporal pulse width at the output of the device, and recombining this power with the 2×2 optical coupler.

Passive or active optical delay control can be used, as can optical gain utilizing rare-earth-doped optical fiber and/or rare-earth-doped integrated optical device and/or electrically- or optically-pumped semiconductor optical amplification. Dispersion compensation can be provided using fiber-Bragg gratings and/or volume Bragg gratings. Wavelength division multiplexing data modulation of the pulse traversing the delay line can be sued as can pulse code data modulation of the pulse traversing the delay line.

The tailoring of conventional USPL sources through synthesis of USPL square wave pulses can be accomplished utilizing micro-lithographic amplitude and phase mask technologies, for FSO applications. The ability to adjust pulse widths using technology and similar approaches to control and actively control pulse with this technology can improve propagation efficiency through FSO transmission links, thereby improving system availability and received optical power levels.

Active programmable pulse shapers can be used to actively control USPL pulse-width can include matching real-time atmospheric conditions to maximize propagation through changing environments. One or more of the following techniques can be used in FSO applications to adapt the optical temporal spectrum using techniques: Fourier Transform Pulse shaping, Liquid Crystal Modular (LCM) Arrays, Liquid Crystal on Silicon (LCOS) Technology, Programmable Pulse Shaping using Acousto-optic modulators (AOM), Acousto-optic Programmable Dispersive Filter (AOPDF), and Polarization Pulse Shaping.

Figure 32:
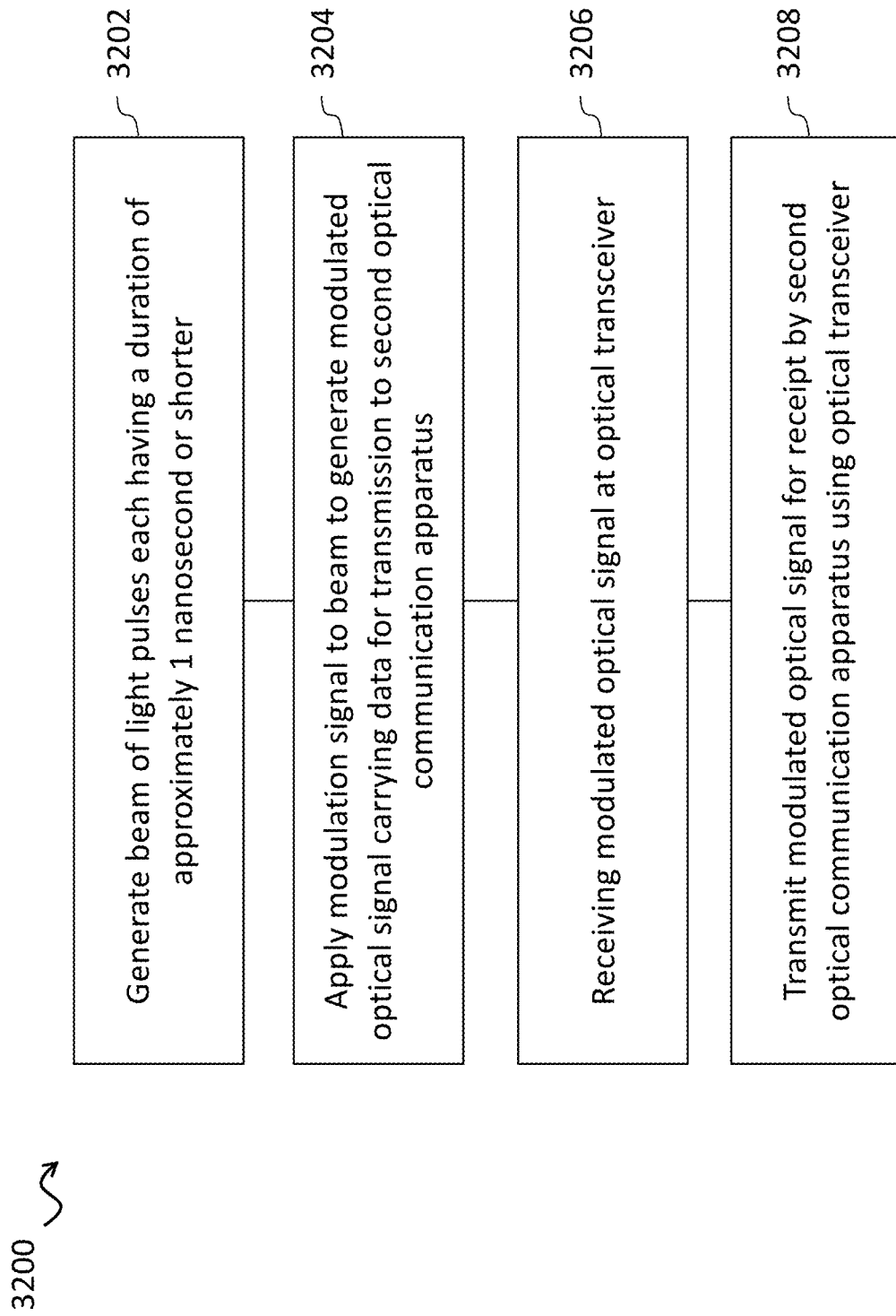
FIG. 32 is a process flow chart illustrating features of a method consistent with implementations of the current subject matter.
Figure 33:
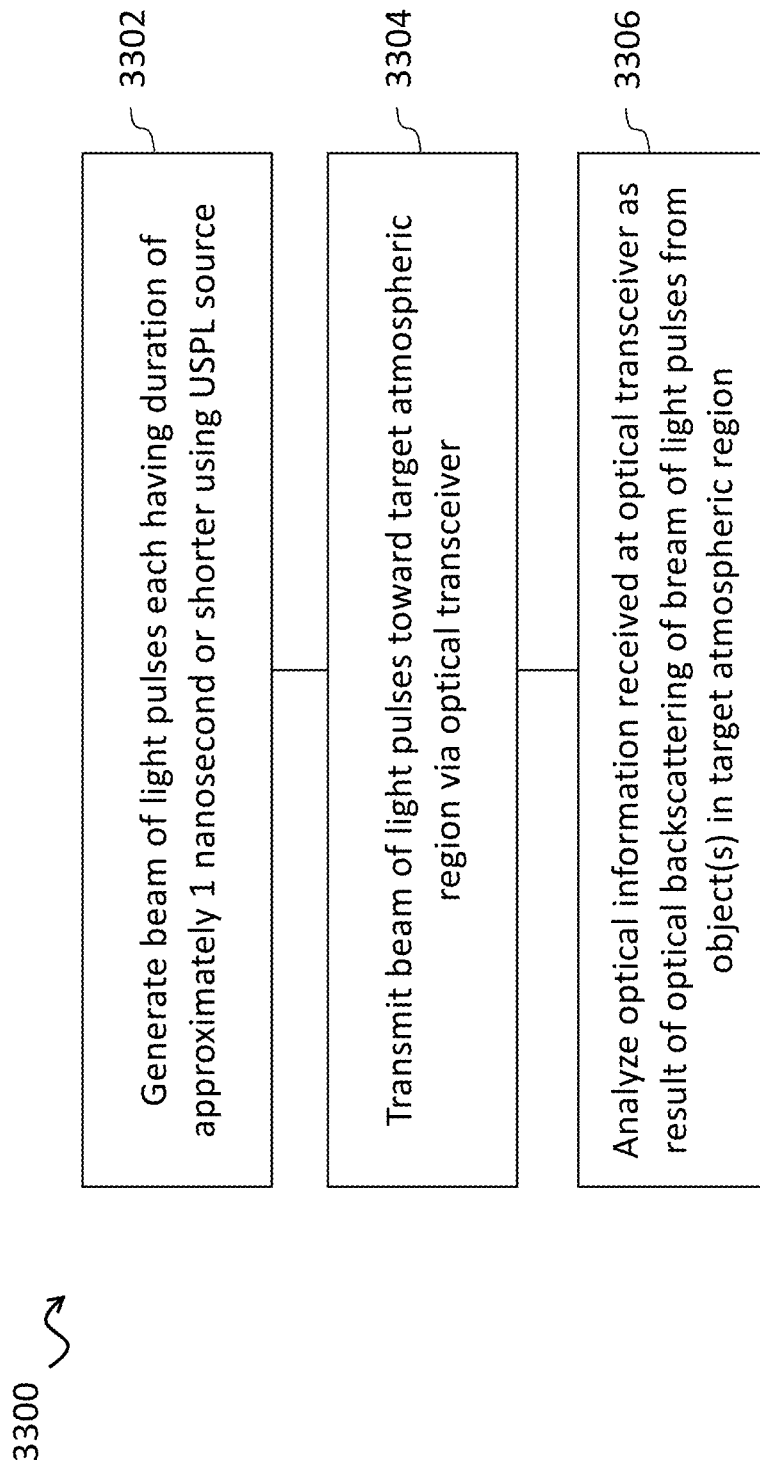
FIG. 33 is another process flow chart illustrating features of a method consistent with implementations of the current subject matter.

FIG. 32 shows a process flow chart 3200 illustrating features of a method, one or more of which can appear in implementations of the current subject matter. At 3202, a beam of light pulses each having a duration of approximately 1 nanosecond or shorter is generated. At 3204, a modulation signal is applied to the beam to generate a modulated optical signal. The modulation signal carrying data for transmission to a remote receiving apparatus. The modulated optical signal is received at an optical transceiver within an optical communication platform at 3206, and at 3210 the modulated optical signal is transmitted using the optical transceiver for receipt by the second optical communication apparatus FIG. 33 shows another process flow chart 3300 illustrating features of a method, one or more of which can appear in implementations of the current subject matter. At 3302, a beam of light pulses each having a duration of approximately 1 nanosecond or shorter is generated, for example using a USPL source. The beam of light pulses is transmitted at 3304 toward a target atmospheric region via an optical transceiver. At 3306, optical information received at the optical transceiver as a result of optical backscattering of the beam of light pulses from one or more objects in the target atmospheric region is analyzed.

Figure 34:
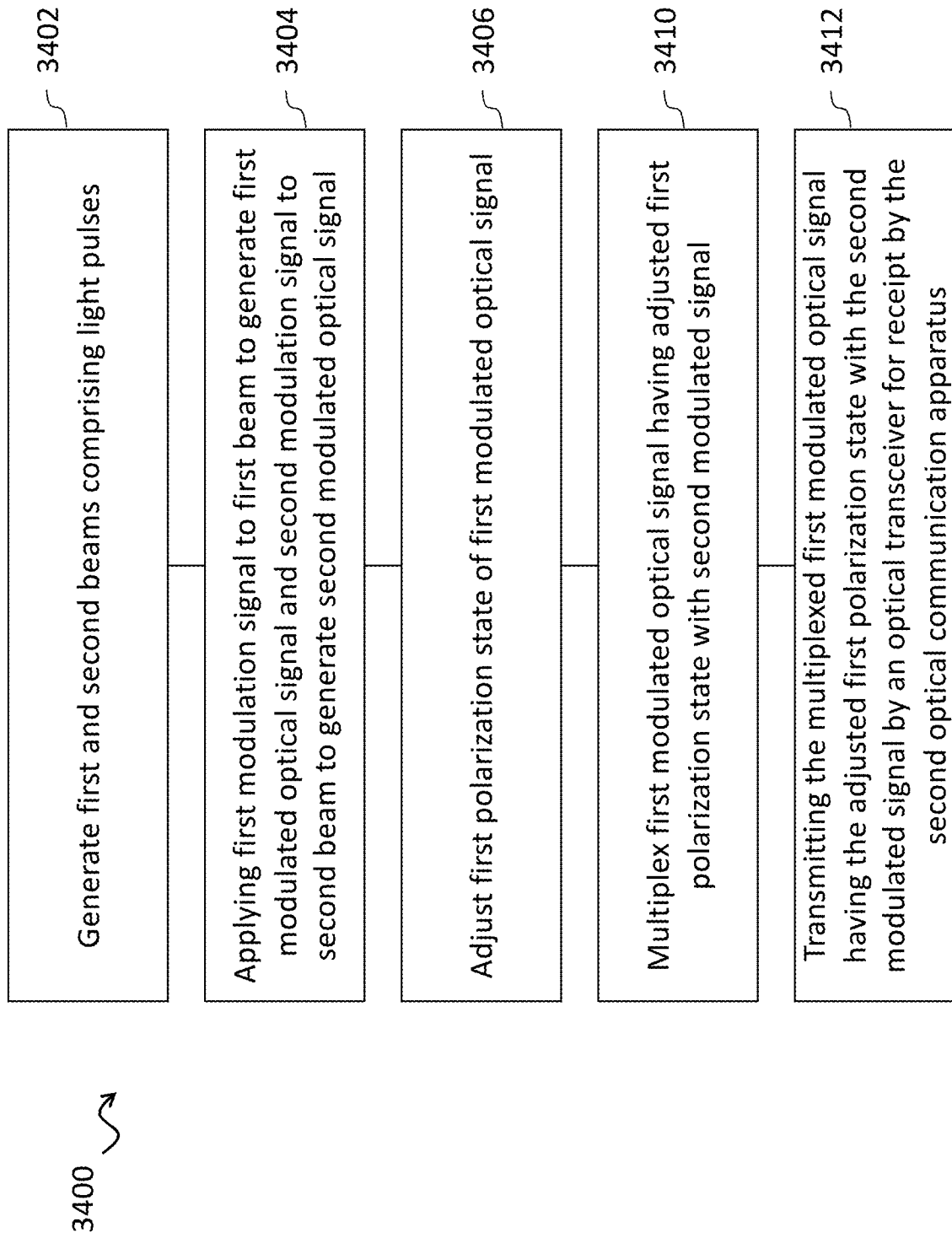
FIG. 34 is another process flow chart illustrating features of a method consistent with implementations of the current subject matter.

FIG. 34 shows another process flow chart 3400 illustrating features of a method, one or more of which can appear in implementations of the current subject matter. At 3402, first and second beams comprising light pulses are generated, for example by a USPL source. At 3404, a first modulation signal is applied to the first beam to generate a first modulated optical signal and a second modulation signal is applied to the second beam to generate a second modulated optical signal. A first polarization state of the first modulated optical signal is adjusted at 3406. Optionally, a second polarization states of the second modulated optical signal can also be adjusted. At 3410, the first modulated optical signal having the adjusted first polarization state is multiplexed with the second modulated signal. At 3412, the multiplexed first modulated optical signal having the adjusted first polarization state with the second modulated signal is transmitted by an optical transceiver for receipt by a second optical communication apparatus.

Figure 35A:
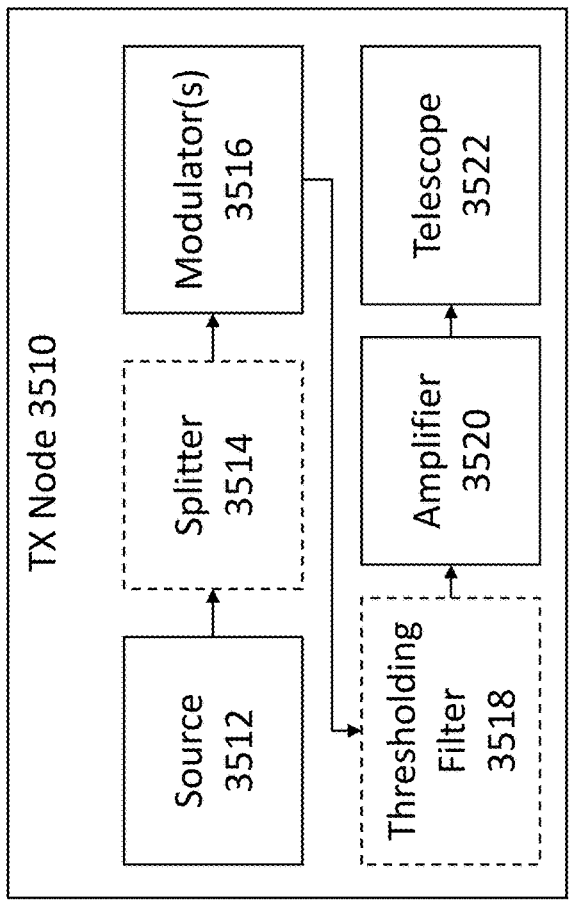
FIGS. 35A and 35B show exemplary nodes that can be used for transmitting and/or receiving information.
Figure 35B:
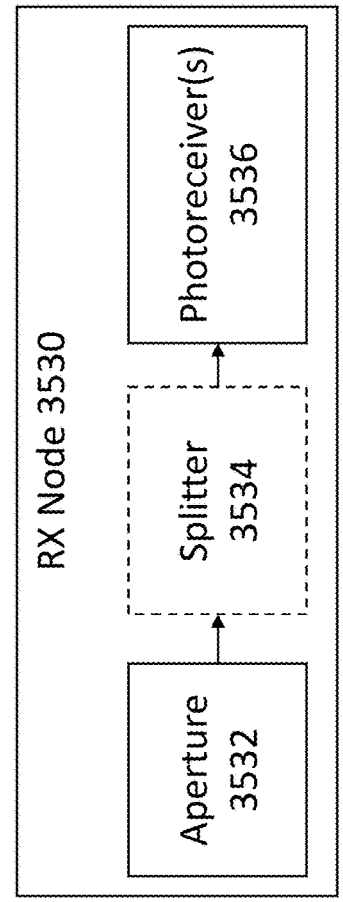

FIGS. 35A and 35B show exemplary nodes that can be used for transmitting and/or receiving information. Transmit node 3510 and receiving node 3530 may be communications platforms as described above, including with reference to FIGS. 1-9. Additionally, while transmit node 3510 is shown with components for generating and transmitting a data-bearing optical signal, and while receiving node 3530 is shown with components for receiving and extracting data from an optical signal, these components may be combined in a single node configured to both transmit and receive optical signals. In some embodiments, for example, a telescope 3522 may act as both an aperture for transmitting and receiving optical signals.

FIG. 35A shows an exemplary transmit node 3510. In some embodiments, transmit node 3510 may include a source 3512. In some embodiments, the source 3512 may be an USPL source, superluminescent diode, or other source. In other embodiments, the source 3512 may be a continuous wave source. Preferably, the source 3512 may be configured to generate a beam of light pulses, in which each pulse has a coherence length of less than 400 microns. The coherence length of the source is determined as:

$$L = C\frac{\lambda^2}{\Delta\lambda},$$

where C is a shaping constant equal to ½, λ is the central wavelength of the pulse, and Δλ is the full width at half maximum (FWHM) spectral width of the pulse. In some embodiments, the coherence length may be less than 1 mm, less than 600 microns, less than 400 microns, less than 200 microns, less than 100 microns, less than 50 microns, or less than 1 micron. In embodiments where a continuous wave source is used, these values may refer to the coherence length of the continuous wave beam, rather than that of the pulses.

In some embodiments, the source 3512 may have a central wavelength in the infrared range. For example, the central wavelength of the source 3512 may be between 1400 nm and 1700 nm. In some embodiments, the source 3512 may be configured to output pulses at a repetition rate of at least 50 MHz, 100 MHz, 200 MHz, 500 MHz, 800 MHz, 1 GHz, 1.25 GHz, 1.5 GHz, 2 GHz, 5 GHz, or 10 GHz. The source 3512 may include (internally or externally) a pulse multiplier, as generally described above, including with reference to FIGS. 15 and 18-20. In some embodiments, the pulse width may be less than 10 ns, less than 1 ns, less than 500 ps, less than 300 ps, less than 100 ps, less than 50 ps, less than 10 ps, less than 1 ps, less than 700 fs, less than 500 fs, less than 300 fs, less than 200 fs, or less than 100 fs.

Transmit node 3510 may optionally include a splitter 3514. Splitter 3514 may be configured to split pulses from source 3512 into a plurality of separated pulses having different wavelength bands. For example, a pulse having an original spectral width of 1500-1600 nm could be split into twenty-five pulses, each having a respective spectral width of 4 nm from 1500 nm to 1600 nm (e.g., 1500-1504 nm, 1504-1508 nm, 1508-1512 nm, and so on). Splitter 3514 may use any known beam-splitting mechanism. Each of the plurality of separated pulses may have coherence lengths of less than 1 mm, less than 600 microns, less than 400 microns, less than 200 microns, less than 100 microns, less than 50 microns, or less than 1 micron.

Transmit node 3510 may include one or more modulators 3516. In some embodiments, each of the modulators 3516 may be a Mach-Zehnder Modulator (MZM). The modulators 3516 may receive a data signal indicating data to be transmitted in an optical beam, and based on that data signal, may encode the data into the pulses of the beam using on-off keying or other modulation techniques. In some embodiments, the modulators 3516 may allow pulses to pass to indicate a '1' and may block or reduce the amplitude of a pulse to indicate a '0' in a bit stream. In embodiments where the beam is split, each of a plurality of separated pulses may be directed to a respective modulator 3516 of a plurality of modulators.

In other embodiments, each of the plurality of separated pulses may be modulated by a single modulator 3516. For example, the separated pulses may be delayed and staggered in time relative to one another, and the modulator 3516 may encode data into each pulse at a higher repetition rate than the pulse-generating repetition rate of the source. In a case where the source 3512 generates pulses at a rate of at least 1 GHz, for example, the splitter may split each pulse into twenty-five or more separated pulses, which can be modulated by one or more modulators 3516 to encode data at a rate of at least 25 Gbps. In some embodiments, the source may generate pulses at a rate of at least 1 GHz, and the splitter may split each pulse into at least ten, at least twenty, at thirty, at least forty, or at least fifty separated pulses, to produce data rates of at least 10 Gbps, at least 20 Gbps, at least 30 Gpbs, at least 40 Gpbs, or at least 50 Gbps. In some embodiments, the FWHM bandwidth of the source may be at least 100 nm, at least 150 nm, or at least 200 nm, which may allow pulses to be split into more separated pulses without reducing the coherence length of those pulses below the values described below with respect to FIGS. 40 and 41.

After being modulated, the pulses (optionally, the separated pulses in the case where a splitter is used) may be passed to an optional thresholding filter 3518. In some embodiments, the thresholding filter may be a saturable absorber (or a different nonlinear device) that attenuates weak pulses and transmits strong pulses. The thresholding filter 3518 may be configured to eliminate or substantially diminish pulses below a defined threshold, while allowing pulses above that threshold to pass. In some embodiments, modulator 3516 may significantly diminish pulses where a "0" is intended to be transmitted, but it may be imperfect and some amount of optical energy may pass through, which, when amplified by amplifier 3520, could produce signals strong enough to generate bit errors. By using a thresholding filter 3518, pulses that are intended to be eliminated may be more fully eliminated, thereby improving the system's data transmission accuracy.

The modulated pulses may be passed to an amplifier 3520, which may increase the magnitude of the pulses for transmission by telescope 3522 (which may be, for example, an aperture and/or lens). In cases where a splitter is used, the separated pulses may be recombined using a recombiner (not shown) before or after being passed to amplifier 3520.

FIG. 35B shows an exemplary embodiment of a receiving node 3530, which may be configured to receive and extract data from an optical beam transmitted by, e.g., a transmit node 3510. Receiving node 3530 may include an aperture 3532, an optional splitter 3534, and one or more photoreceivers 3536, which may have specific characteristics in relation to the source, as described in detail below. The photoreceivers 3536 may include a photodiode and processing circuitry. In some embodiments, the photoreceivers 3536 may be, for example, an avalanche photodiode. In some embodiments, the processing circuitry of a photoreceiver may determine whether received light in a detection window exceeds a detection threshold and output bit data (e.g., a '0' or '1') for that window based on the result of that determination. Receiving node 3530 may be an optical communications platform as described above. In some embodiments, the components of transmit node 3510 and receiving node 3530 may be included in a single transceiver node.

Aperture 3532 may be configured to receive an optical signal, such as an optical beam transmitted by a transmit node 3510 as described in FIG. 35A. In some embodiments, the light received at aperture 3532 may pass through a filter that screens wavelengths of light that are not near the center wavelength of the source. For example, the source in the transmit node may have a center wavelength between 1500 nm and 1700 nm, and the filter at the receiving node 3530 may block or reduce light outside of the source band. For example, the filter may reduce a magnitude of light below 1500 nm. Optionally, the filter may additionally block longer wavelengths of light, or the threshold may be set at lower wavelengths, such as at 1480 nm or 1460 nm. Optionally, receive node 3530 may include a splitter 3534, which may split pulses in a received beam into a plurality of separated pulses of different wavelength bands. In a case where the pulses are split and separately modulated at the transmit node 3510, the pulses may be split into the same wavelength bands by the splitter 3534 in the receive node. The pulses (combined pulses or separated pulses, in the case where a splitter is used) may then be processed by one or more photoreceivers 3536. In embodiments where a pulse is split into a plurality of separated pulses, each pulse may be directed to a respective photoreceiver, which may be configured to determine whether an "on" or "off" signal was transmitted in a given detection window. In some embodiments, encoding modalities other than on-off keying may be used, such as frequency modulation. Additional detail regarding photoreceivers 3536 is provided below with respect to FIG. 41.

Figure 36:
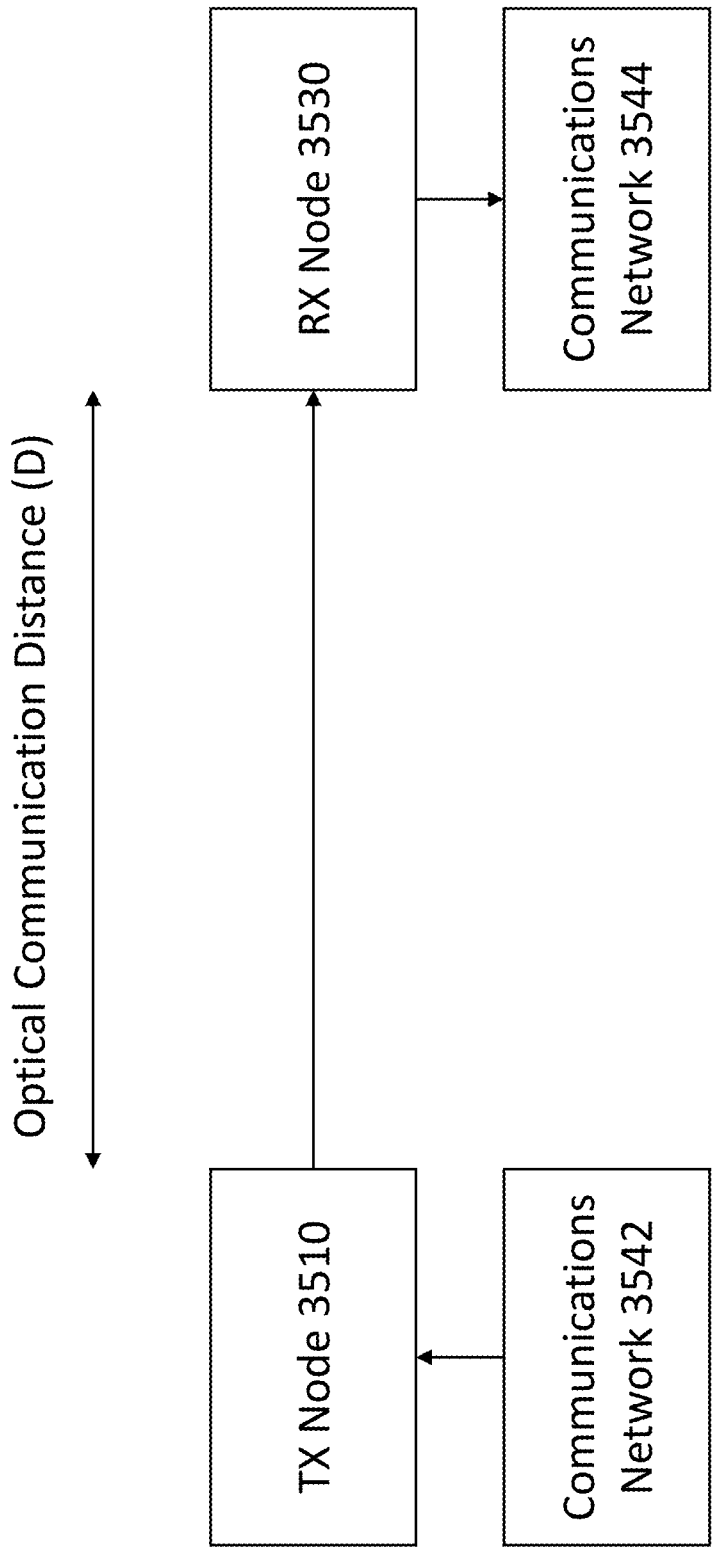
FIG. 36 shows an exemplary arrangement in which data is transmitted from a first communications network 3542 to a second communications network 3544 over an optical communication distance D using a transmit node 3510 and a receiving node 3530.

FIG. 36 shows an exemplary arrangement in which data is transmitted from a first communications network 3542 to a second communications network 3544 over an optical communication distance D using a transmit node 3510 and a receiving node 3530, such as those described above with respect to FIGS. 35A-35B. Data may be received from optical communications network 3542 encoded into an optical beam and transmitted across optical communications distance D using transmit node 3510. Receiving node 3530 may receive the optical beam, extract the transmitted data, and pass the data to communications network 3544. In some embodiments, data from communications 3544 may also be transmitted from node 3530 back to node 3510, which may pass that data to communications network 3542 to enable two-way communication. In some embodiments, optical communication distance may be at least 0.5 miles, at least 1 mile, at least 2 miles, at least 3 miles, at least 5 miles, at least 7 miles, at least 10 miles, or at least 20 miles.

Figure 37:
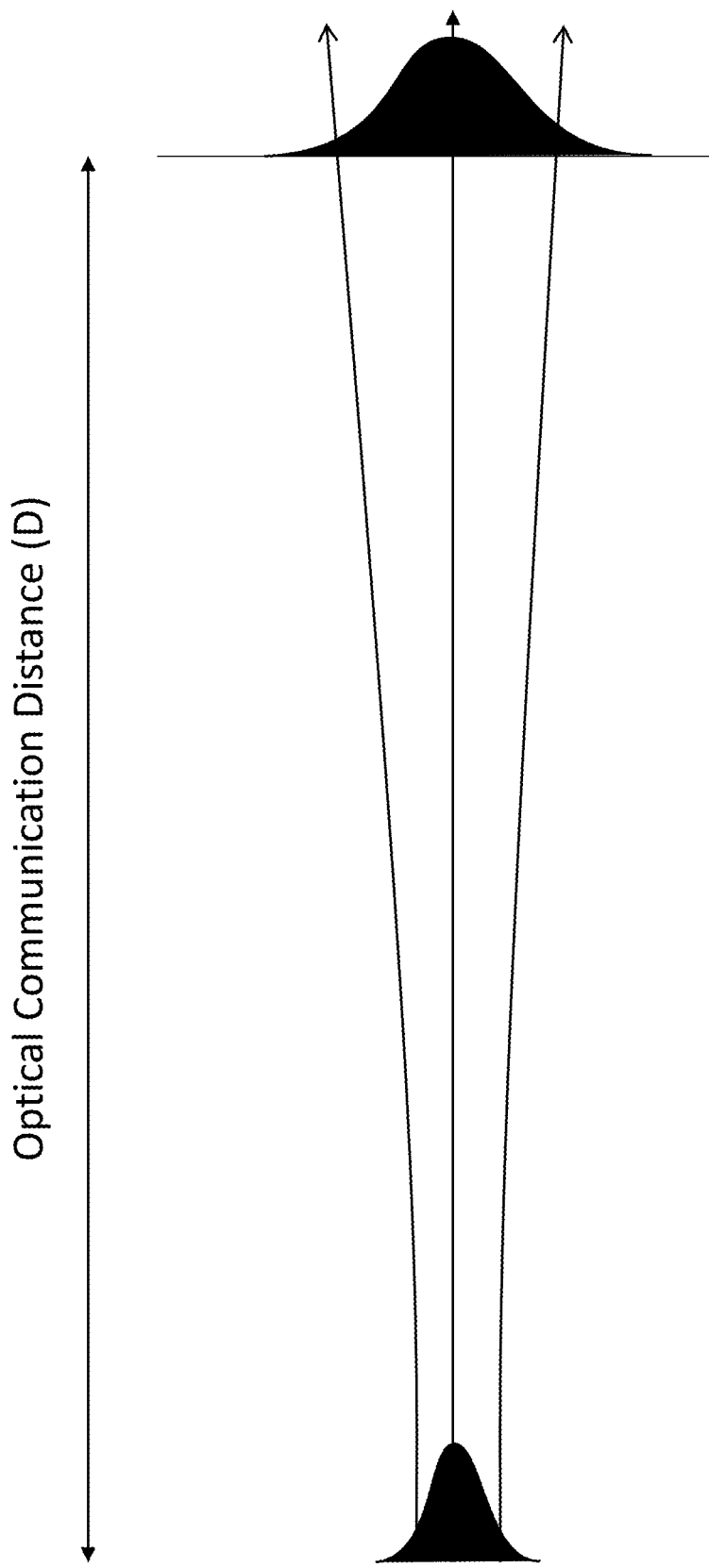
FIG. 37 shows an exemplary beam traveling over an optical communication distance D, such as 1 mile, through a constant refractive medium.

FIG. 37 shows an exemplary beam traveling over an optical communication distance D, such as 1 mile, through a perfectly uniform refractive index medium. Even in a medium of perfectly constant index of refraction, the beam will spread naturally due to diffraction, however the beam remains the same shape and simply expands by an amount that is proportional to the propagation distance, and there are no beam scintillation effects in a uniform index of refraction medium.

Figure 38:
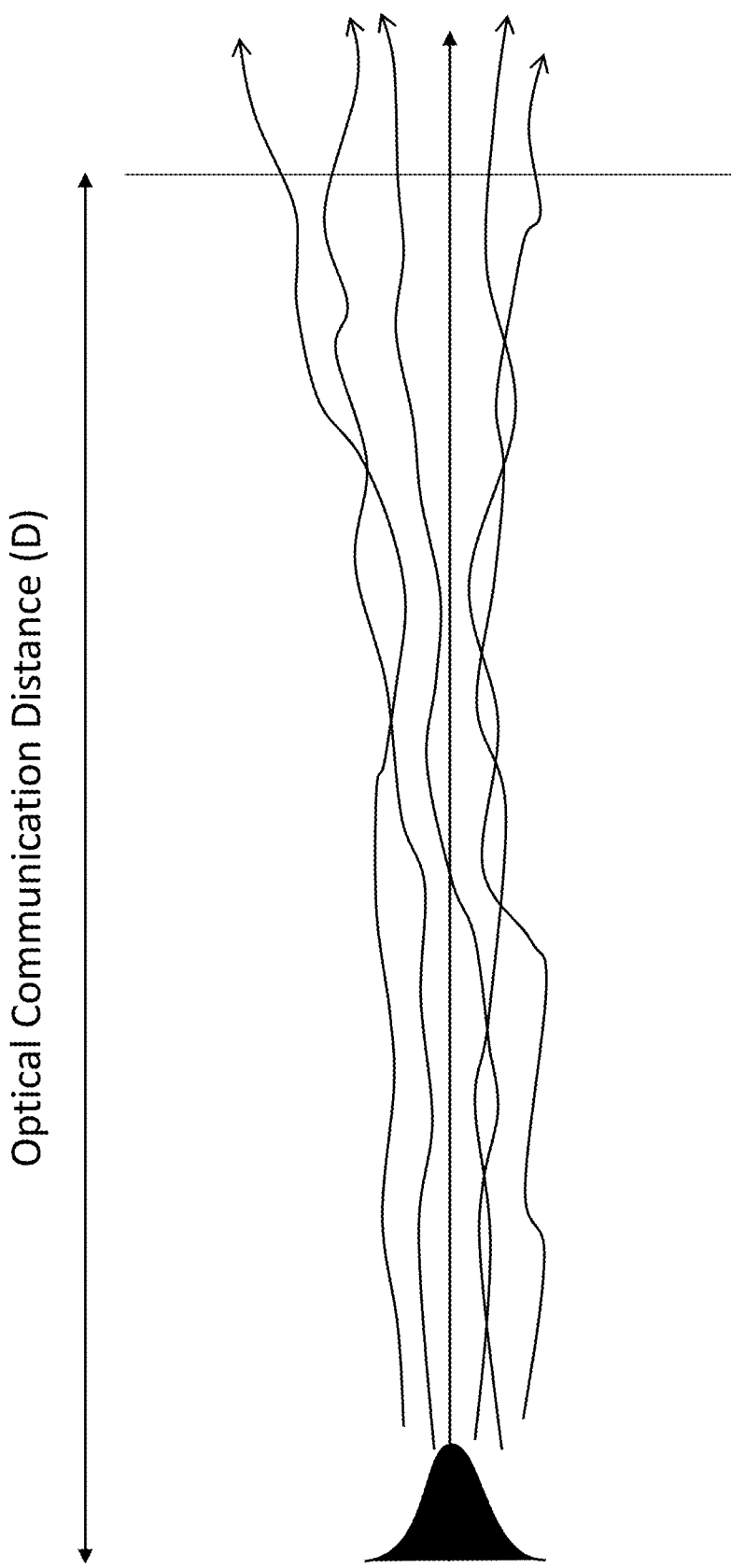
FIG. 38 provides a diagrammatic representation of photons in a beam traveling through a variably refractive medium.

FIG. 38 provides a diagrammatic representation of photons in a beam traveling through a variably refractive medium. The atmosphere has fluctuations in temperature, density, pressure, humidity, aerosols, wind, convection, and other parameters, which causes a refractive index of the atmosphere to vary. As an optical beam travels through the atmosphere or other variably refractive medium such as water, photons within the beam may be refracted slightly differently than other photons. As shown in FIG. 38, different ray paths within the beam may be refracted differently due to variations in the refractive index in the variably refractive medium. As a result, in a system such as that shown in FIG. 35 where a free space optical beam is transmitted over a sufficiently large optical communication distance D and received at a receiving node, different photons within a single pulse may take paths of different lengths to reach the receiving node and may arrive at different times. These differences in path length, and the time required for a photon to travel these distances, can produce coherent interference and diminish signal quality in a free space optical communications system if the time delays are less than the coherence length of the source. Solutions for this problem are described herein, including with reference to FIGS. 40 and 41 and as applied within a system such as those shown in FIGS. 35A, 35B, and 36.

In addition to variance in path length, photons in a pulse may travel at variable speeds to due to variations in atmospheric conditions, including humidity, temperature, and density. Because different photons in a pulse travel though slightly different atmospheric conditions, the photons may travel at different speeds and arrive at different times. Additionally, different wavelengths of light within a pulse may travel at different speeds, which can further broaden a pulse as it travels through a variably refractive medium.

Figure 39:
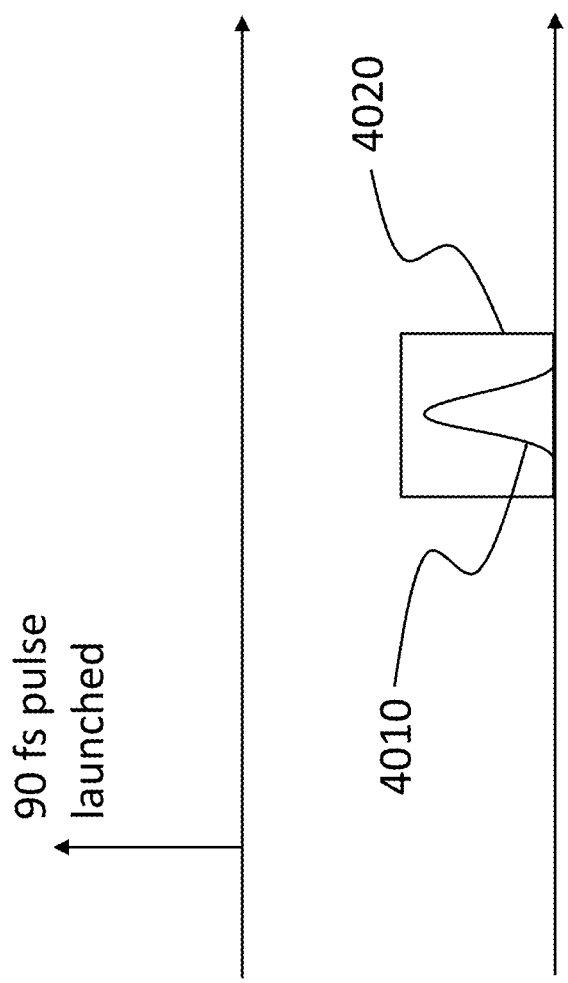
FIG. 39 shows a diagrammatic representation of a pulse broadening as it travels over an optical communication distance.

FIG. 39 shows a diagrammatic representation of a pulse as launched by a transmitter and as received by a photoreceiver. As shown in FIG. 39, the pulse may have a 90 femtosecond pulse width when it is transmitted by a transmit node. The pulse may then travel over an optical transmission distance where it may be received by a photoreceptor having a detection window 4020 of a defined duration, such as 500 picoseconds. When the pulse is received by the photoreceiver, its received pulsewidth may be broadened by passing through the variably refractive medium, as described above with respect to FIGS. 37-38. Due to variance in path lengths traveled by the beams and variance in atmospheric conditions through which the beams travel, different photons may arrive at the detector at different times according to a distribution curve, which may have a temporal duration that is longer than the pulse duration at launch. The amount of broadening can vary depending on the length of the optical communication distance and atmospheric conditions, including humidity, temperature, density, and the presence of aerosols such as fog. This broadening can be the order of picoseconds or more in some conditions.

The pulse may have a temporal distribution curve as shown. While a normal temporal distribution curve is shown, other pulse shapes are possible. By making the width of the curve 4010 longer (e.g., 3x longer) than the coherence length of pulses that are launched, coherent beam interference and coherent beam scintillation may be reduced.

Figure 40:
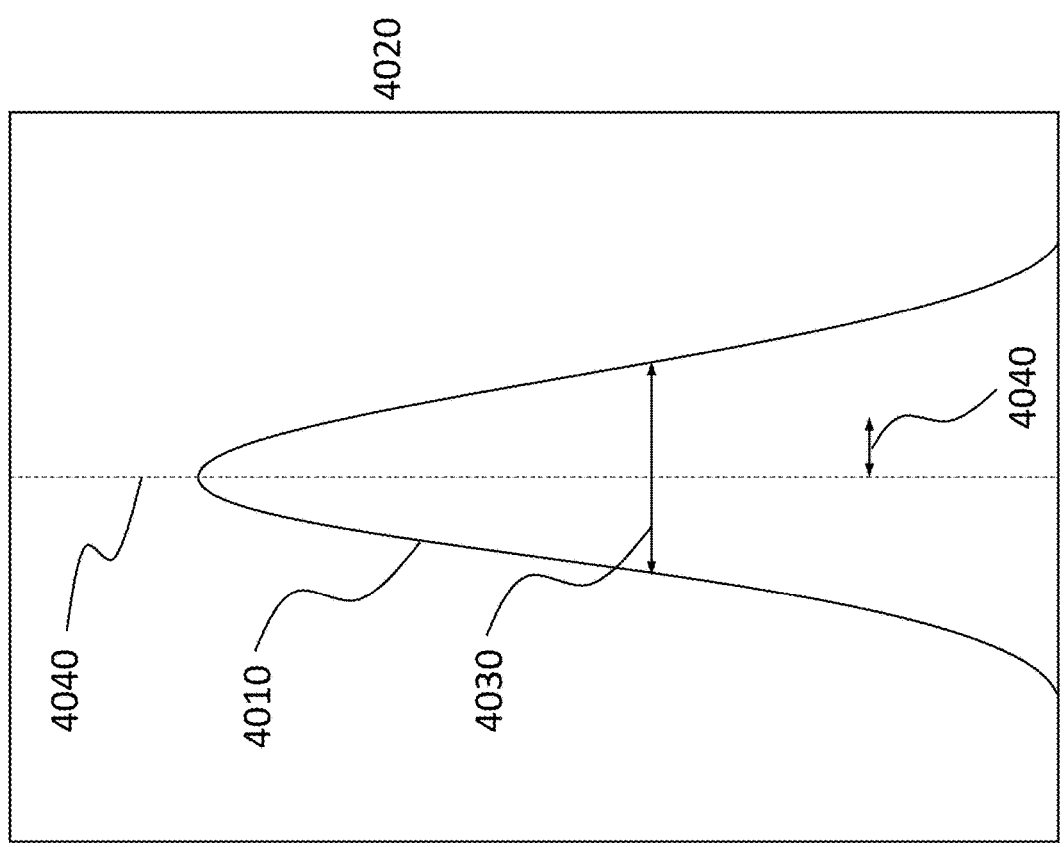
FIG. 40 shows an exemplary temporal distribution curve of a short-duration pulse 4010 that traveled a substantial distance through a variably refractive medium and has been temporally broadened.

FIG. 40 shows an exemplary temporal distribution curve of a short-duration (e.g., approximately 100 femtosecond) pulse 4010 that traveled a substantial distance (e.g., one mile) through a variably refractive medium and been temporally broadened. The pulse, as it arrives at the photoreceiver, may have a FWHM duration 4030 and a coherence time 4040, which may be equal to a coherence length of the pulse divided by the speed of light through the variably refractive medium. In some embodiments, the FWHM duration 4030 may be greater than the coherence time 4040 of the pulse. Preferably, the FWHM duration 4030 may be at least 2x, at least 3x, at least 4x, at least 5x, at least 6x, at least 8x, at least 10x, or at least 12x the coherence time 4040 of the pulse. By ensuring that the FWHM duration 4030 of the pulse as received at the photoreceiver is relatively large as compared to the coherence time 4040 of the pulse 4010, interference between the different ray paths of the pulse as they arrive at the photoreceivers at different times may be reduced, and a signal with reduced noise and higher quality may arrive at the photoreceiver.

The photoreceiver may have a detection window 4020 of a specified duration. A shorter detection window generally allows higher data throughput. For example, in a system that uses on-off keying for data modulation, a photoreceiver having a detection window of 1 nanosecond can extract up to 1 Gbps while a photoreceiver having a detection window of 100 picoseconds can extract up to 10 Gbps. The photoreceiver may have repeating detection windows of less than 100 ns, less than 10 ns, less than 1 ns, less than 100 ps, or less than 10 ps.

Pulse length and temporal broadening can, however, cause photons from a pulse intended to be received in one detection window to fall into an adjacent detection window. In the case where the adjacent detection window should not receive transmitted photons (e.g., because a '0' is transmitted in that bit position), this phenomenon can produce bit errors. Accordingly, to maximize data transmission accuracy, it is important that the FWHM duration 4030 of the pulse as received at the photoreceiver be greater (and preferably at least three times as large) than the coherence length 4040 of the pulse, while at the same time, the FWHM duration 4030 of the pulse as received at the photoreceiver should also be substantially less than the detection window 4020 of the photoreceiver.

For example, the detection window 4020 may be at least 2x, at least 5x, at least 6x, at least 7x, at least 8x, at least 10x, or at least 20x as large as the FWHM duration 4030 of the pulse as received at the photoreceiver. Preferably, at least 95%, at least 99%, or at least 99.99% of the photons in a pulse that arrive at the photoreceiver may arrive at a respective arrival time that is spaced from a center 4040 of the temporal distribution curve of the pulse by a respective time difference that is less than half of the detection window duration of the photoreceiver. Note that although the center 4040 of the temporal distribution curve of the pulse is shown at the center of the detection window 4020, this need not be the case, and pulses may arrive earlier or later than the midpoint of a detection window. It may be preferable that the center 4040 of the temporal distribution curve be at or near the center of the detection window 4020 to reduce the potential for photons in a pulse to spill over into an adjacent detection window. In some embodiments, the center 4040 of the temporal distribution curve may be less than 100 picoseconds, 50 picoseconds, 20 picoseconds, 10 picoseconds, 5 picoseconds, 1 picosecond, 800 femtoseconds, or 500 femtoseconds from the center of the detection window 4020.

By specifying relationships between the coherence time 4040 of the pulse, the FWHM duration 4030 of the pulse as it arrives at the photoreceiver, and the detection window 4020 of the photoreceiver in the manner described herein, data transmission accuracy and effective transmission range can be greatly improved (see below discussion with respect to FIG. 42 for test results). The FWHM duration 4030 of the pulse as it arrives at the photoreceiver may vary depending on the pulse length as transmitted from the source, the medium through which the pulse travels (e.g., atmospheric pressure, temperature, sunlight intensity, aerosols), and the distance over which the pulse travels to reach the photoreceiver. Accordingly, the coherence time 4040 of the pulse may need to be decreased and/or the detection window 4020 of one or more photoreceivers may need to be increased depending on conditions for the optical communication system. Decreasing coherence time 4040 and increasing detection window 4020 may thus improve data transmission quality while negatively impacting data throughput. In some embodiments, the system may be configured to determine a data transmission quality of the system (e.g., a bit error rate or a measurement of signal values above or below a detection threshold), and in response to the determined data transmission quality, modify either or both of the coherence time 4040 of the pulse or the detection window duration 4020 of the photoreceiver.

Similarly, when using a source that can continuously emit light, such as a continuous wave source or a superluminescent diode, the emitted light can be gated into pulses (or otherwise converted into pulses using data modulation or other known techniques) that occupy only a relatively small fraction of the duration of the detection window, and those pulses may be timed to arrive at or near the centers of the detection windows of the photoreceiver. Gating and timing the pulses in this manner can reduce the risk that photons in an "on" window (where light is intended to be transmitted) may spill over into an "off" window (where light is not intended to be transmitted) and produce bit errors. The pulse durations and positions relative to the detection windows described above may thus also apply to pulses generated using sources that can continuously emit light. In such cases, although the sources can continuously emit light, the effective output may be "off" for a majority of the time even during "on" transmission windows where light is intended to be transmitted, so that sufficient space may be left between the center of the pulse and the ends of the detection window to avoid spillover. For example, during an "on" bit window where light is intended to be transmitted, the effective output from the continuous emission source may be "on" less than 50%, less than 30%, less than 20%, or less than 10% of the respective transmission bit window.

Figure 41:
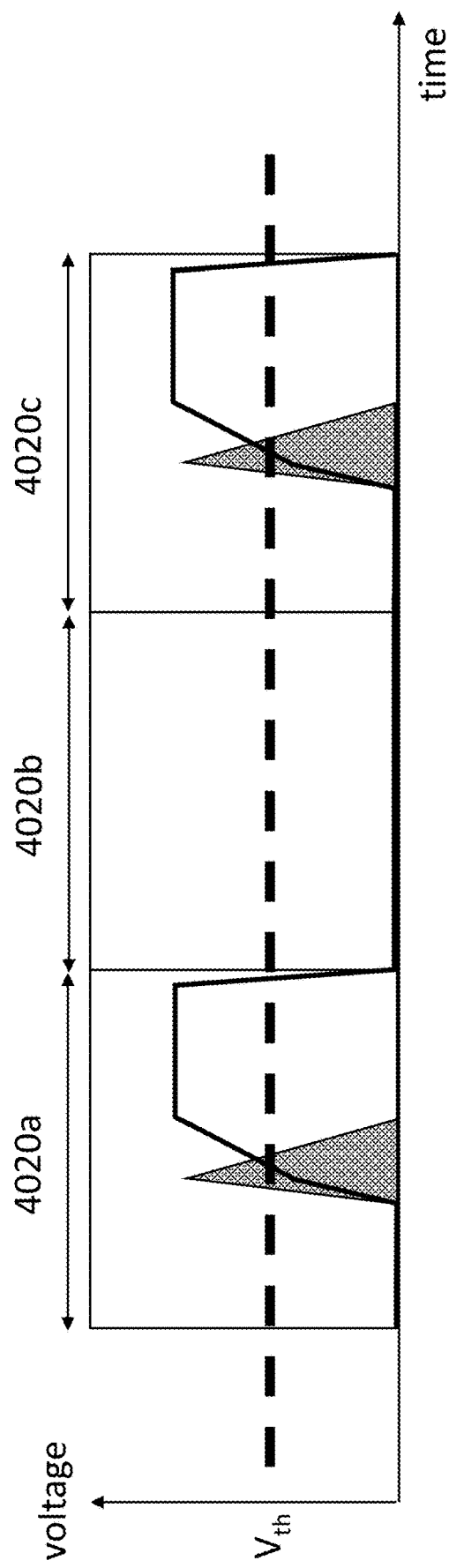
FIG. 41 shows a diagrammatic representation of light pulses arriving in detection windows of a photoreceiver.

FIG. 41 shows a diagrammatic representation of light pulses arriving in detection windows 4020a, 4020b, 4020c of a photoreceiver. The light pulses may be of any shape and generally may be broadened to some extent by traveling over an optical communication distance through a variably refractive medium. In a first detection window 4020a, a light pulse may arrive at or near the center of the window and may cause the total received light in that window to exceed a detection threshold $V_{th}$, which may be processed by circuitry of the photoreceiver to indicate that a pulse was received in that window. In some embodiments, this may cause the photoreceiver to output a '1' for this detection window. At the end of detection window 4020a and before detection window 4020b, the photoreceiver circuit may be reset and return to zero. In detection window 4020b, no pulse is transmitted (e.g., because a '0' is intended to be transmitted and a modulator at the transmit node blocked the pulse), and the total light received in window 4020b may be below the detection threshold $V_{th}$. This may cause the photoreceiver to output a '0' for this detection window. The photoreceiver circuit may again be reset and return to zero, and the cycle may repeat with a third window 4020c, and so on.

The detection threshold $V_{th}$ may be configured so that it is sufficiently high that environmental light will not trigger a false positive but sufficiently low that true pulses will reliably exceed the detection threshold $V_{th}$. It is important that pulses sufficiently exceed a noise floor so that there is sufficient signal difference between "on" and "off" bit windows so that the detection threshold $V_{th}$ may be both high enough to ignore environmental noise but low enough to capture every transmitted pulse. This is particularly challenging over longer distances (e.g., a mile or more) and in suboptimal environmental conditions (e.g., partly sunny, significant aerosols). The relationships between pulse length at the photoreceiver, coherence time, and detection window described herein with respect to FIGS. 39-41 greatly improve signal quality transmission and allow effective detection thresholds $V_{th}$ even for free space optical systems transmitting data over optical transmission distances in excess of 1 mile, 2 miles, 3 miles, 5 miles, or 7 miles.

In a case with a beam splitter and multiple photoreceivers, each of the multiple photoreceivers may generate a bit stream based on the separated pulses that are directed to that photoreceiver, and the bit streams from the respective photoreceivers may be interleaved to produce a combined bit stream having a higher data rate. The combined bit stream may be outputted to a communication network as described above, including with respect to FIG. 36.

Figure 42:
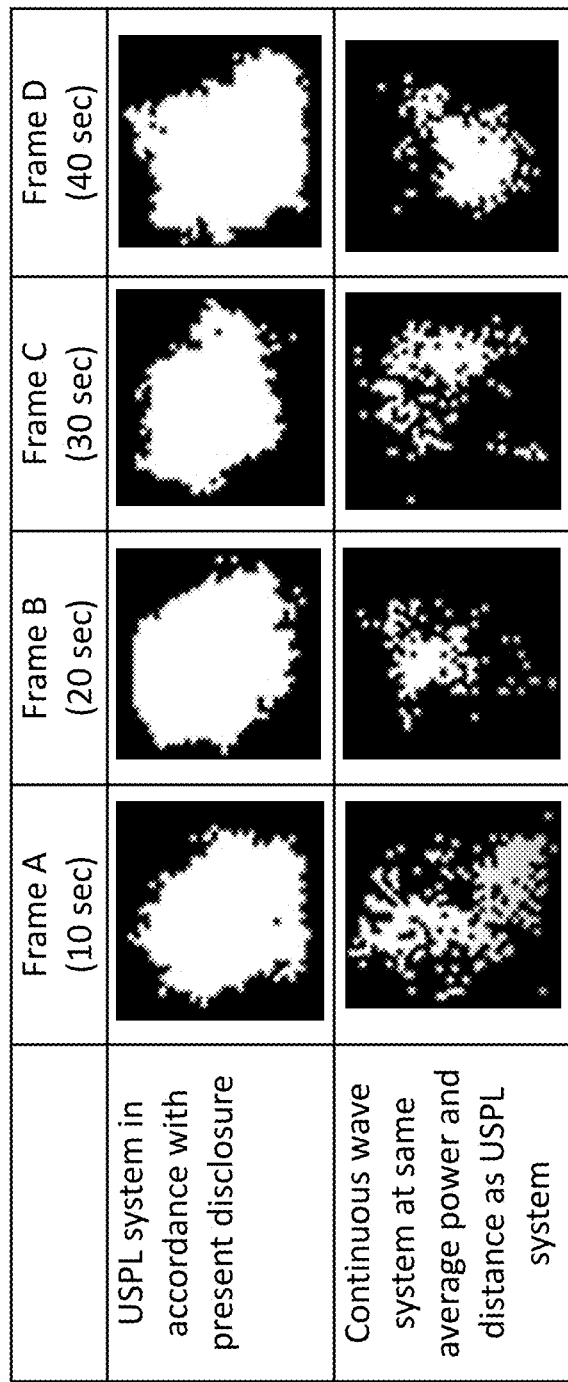
FIG. 42 shows an example of test data received over a one-mile optical communication distance.

FIG. 42 shows an example of test data received over a one-mile optical communication distance. The test data compares optical signals generated using a transmit node as described above with respect to FIG. 35A against optical signals generated using a continuous wave source having the same average power as the USPL source. Specifically, to generate the data shown in the top row of the chart shown in FIG. 42, a USPL source incorporated in a transmit node as described above with respect to FIG. 35A was used to transmit data over an optical communication distance of one mile. The received signal was directed at a piece of white paper, and an infrared camera was placed behind the paper to record the light that passed through the paper. To generate the data shown in the bottom row of the chart shown in FIG. 42, the same experimental setup was used with a continuous wave source having the same average power and same optical communication distance as the USPL source. The light from both the USPL source and the CW source was directed at the same sheet of white paper, and the two signal spots were captured in the same frame using the infrared camera. The spot sizes were approximately 12 inches in diameter. Background environmental light was subtracted from each pixel, and a each pixel was subjected to a thresholding logic such that pixels in which the received optical signal was above the threshold were set to "white" and pixels in which the received optical signal was below the threshold were set to "black." The four images shown for each source were taken from the same frames in the video feed, and those frames were equally spaced at intervals of 10 seconds. Frame A shows the received signals from the USPL and CW sources at 10 seconds, Frame B shows the shows the received signals from the USPL and CW sources at 20 seconds, Frame C shows the shows the received signals from the USPL and CW sources at 30 seconds, and Frame D shows the shows the received signals from the USPL and CW sources at 40 seconds.

This data shows that the transmit node as described herein produces ultrashort pulses that are substantially more clustered and, within the detection field, much more reliably exceed the detection threshold. As applied to a communication system using a photoreceiver having the characteristics described above, including with reference to FIGS. 35B to 41, this produces vastly improved data transmission accuracy. Applicant's testing of systems in accordance with this description has demonstrated free space optical communication distances in excess of 1 mile, 2 miles, 3 miles, 5 miles, and up to as much as 7.4 miles with zero bit error rate as measured over time intervals of at least 10 seconds, at least 30 seconds, at least 60 seconds, at least 10 minutes, at least 30 minutes, and at least 1 hour. In some embodiments, systems described herein may transmit data over an optical communication distance of at least one mile and have a measured bit error rate of less than one in one million, less than one in one billion, less than one in one trillion, or less than one in one quadrillion over a measurement period of at least sixty seconds. To Applicant's knowledge, no other free space optical system has achieved similarly low over optical communication distances of even one half of one mile.

Thus, the systems described herein allow for substantially improved data transmission accuracy, communication link distance, and they also allow free space optical communication to be used in inclement environmental conditions (e.g., rain, fog, atmospheric scintillation) that, in prior systems, rendered free space optical communication ineffective. In some embodiments, the improved data transmission quality and range may also allow for free space optical communication to be applied to systems that would have previously been impossible to use effectively. For example, a transmit node and/or receiving node in accordance with the present disclosure may be provided in an Earth-orbiting satellite to provide for ground-to-space and/or space-to-ground free space optical communication. Due to the amount of atmosphere that a beam must travel between Earth's ground level and space, effective optical data transmission has not been demonstrated using technologies prior to the present disclosure, but the technology described herein can achieve effective optical communication over this distance.

Figure 43:
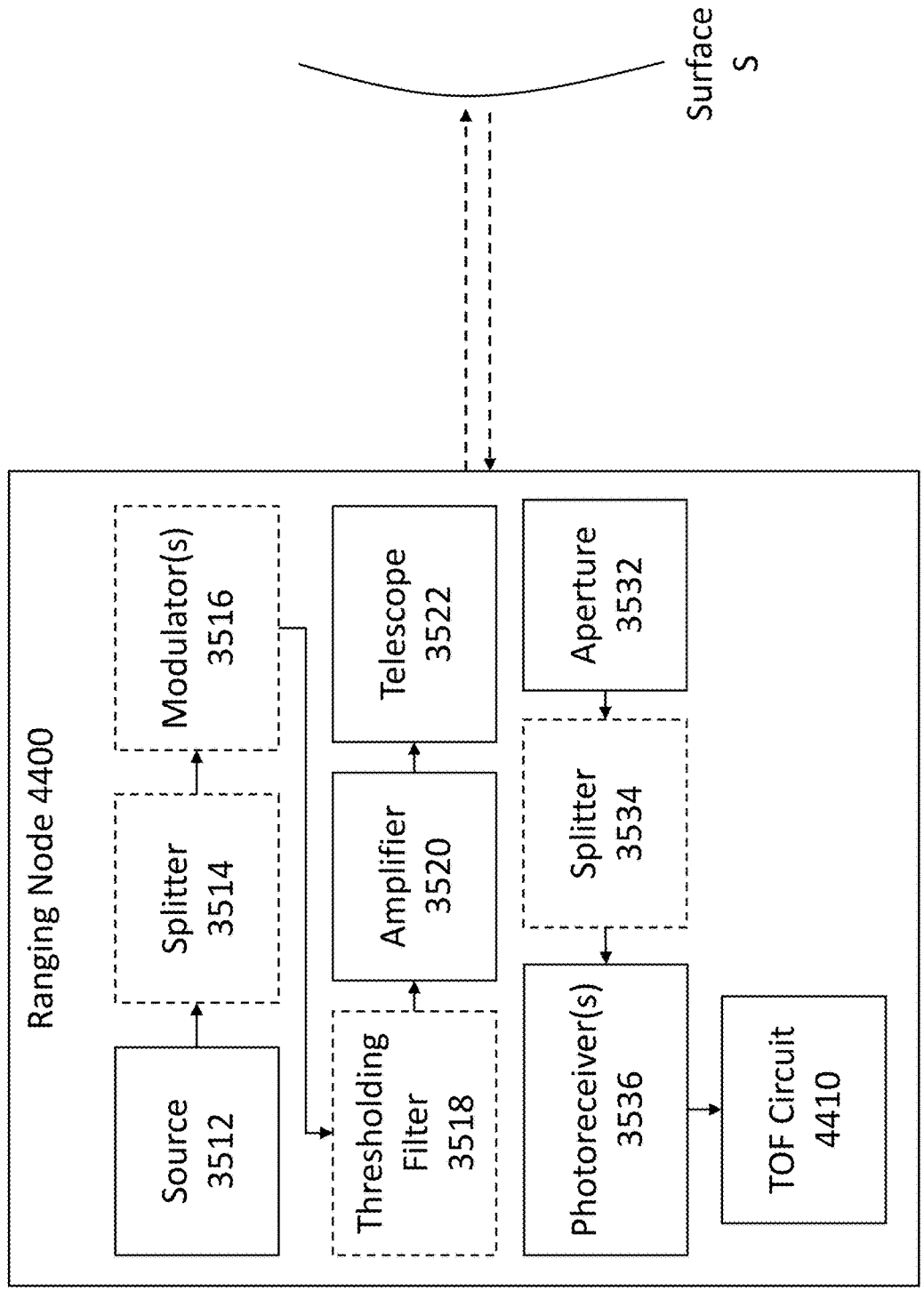
FIG. 43 shows an exemplary ranging node that can be used to detect objects or surfaces and determine positions of those objects relative to the node.

FIG. 43 shows an exemplary ranging node 4400 that can be used to detect objects or surfaces and determine positions of those objects relative to the node. The ranging node 4400 may generally include the components of the transmit and receiving nodes 3510, 3530 described above with respect to FIGS. 35A and 35B. For example, the ranging node 4400 may include a source 3512, a splitter, one or more modulators, an amplifier, and a telescope. These elements may collectively be configured to emit optical pulses that travel through a variably refractive medium toward a surface S. In the case of a laser ranging node, data modulation is optional but may be included to encode information relating to the pulses, nodes, or other information. Photons from the optical pulses may be reflected by surface S and return to the node 4400. The total travel distance of the optical pulses from transmission by the ranging node to receipt of the reflected pulse may be twice the distance of the node to the surface S. Upon return to the node, the pulses may be received by an aperture 3532, optionally split by a splitter 3534, and analyzed using one or more photoreceivers 3536. Each of these components may have the same properties and parameters as the corresponding components described above with respect to FIGS. 35A to 41. Ranging node 4400 may additionally include a time-of-flight (TOF) circuit 4410, which may be configured to determine the time of flight of a pulse to reach surface S and return to node 4400, and thereby determine a distance of that surface S from the ranging node 4400.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. A computer remote from an analyzer can be linked to the analyzer over a wired or wireless network to enable data exchange between the analyzer and the remote computer (e.g. receiving data at the remote computer from the analyzer and transmitting information such as calibration data, operating parameters, software upgrades or updates, and the like) as well as remote control, diagnostics, etc. of the analyzer.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A ranging system, the ranging system comprising:
an optical source configured to generate a series of light pulses;
a modulator configured to modulate the series of light pulses to generate a modulated series of light pulses;
a photoreceiver, the photoreceiver having a detection window duration,
wherein:
the modulated series of light pulses comprises a first pulse;
photons of the first pulse arrive at the photoreceiver, after traveling through a variably refractive medium, according to a temporal distribution curve;
a full-width-at-half-maximum value (FWHM value) of the temporal distribution curve is greater than a coherence time value equal to a coherence length of the first pulse divided by a speed of light through the variably refractive medium; and
the ranging system is configured to determine a time of flight based on the photons received at the photoreceiver.

2. The ranging system of claim 1, wherein the optical source and the photoreceiver are spaced by a free space optical communication distance of at least one mile, and the ranging system has a measured error rate of less than one in one billion over the free space optical communication distance of at least one mile for a measurement period of at least sixty seconds.

3. The ranging system of claim 1, wherein the FWHM value of the temporal distribution curve is at least three times as large as the coherence time value equal to the coherence length of the first pulse divided by the speed of light through the variably refractive medium.

4. The ranging system of claim 1, wherein each of the modulated series of light into pulses generates a respective temporal distribution curve as it travels to the photoreceiver, and the respective temporal distribution curve has a respective full width at half maximum (FWHM) value that is 50% or less than the detection window duration.

5. The ranging system of claim 1, wherein each of the modulated series of light pulses generate a respective temporal distribution curve as the modulated series of light pulses travel to the photoreceiver, and the respective temporal distribution curve has a respective FWHM value that is 30% or less than the detection window duration.

6. The ranging system of claim 1, wherein the FWHM value of the temporal distribution curve is at least six times as large as the coherence time value equal to the coherence length of the first pulse divided by the speed of light through the variably refractive medium.

7. The ranging system of claim 1, wherein at least 95% of the photons of the first pulse that arrive at the photoreceiver arrive at a respective arrival time that is spaced from a center of the temporal distribution curve by a respective time difference that is less than half of the detection window duration of the photoreceiver.

8. The ranging system of claim 1, wherein the optical source is located on a ground station and the photoreceiver is disposed on an earth-orbiting satellite, and the ranging system has a measured bit error rate of less than one in one billion over a free space optical distance between the ground station and the earth-orbiting satellite for a measurement period of at least sixty seconds.

9. The ranging system of claim 1, wherein the modulated series of light pulses have a center wavelength between 1500 nm and 1700 nm, and the photoreceiver is disposed on a detection node that includes a filter configured to reduce an amount of light having a wavelength below 1500 nm that reaches the photoreceiver.

10. The ranging system of claim 1, wherein:
the optical source is disposed in a transmit node;
the transmit node comprises a beam splitter configured to split a combined pulse generated by the ranging system into a plurality of separated pulses having different wavelength bands, the first pulse being among the plurality of separated pulses; and
the transmit node is configured to separately modulate each of the plurality of separated pulses in response to a data transmission signal, thereby encoding data of the data transmission signal into the plurality of separated pulses.

11. The ranging system of claim 1, further comprising:
an amplifier, the amplifier being configured to amplify a magnitude of the modulated series of light pulses; and
a thresholding filter, the thresholding filter being configured to receive the modulated series of light pulses after the modulator and before the amplifier, wherein the thresholding filter is configured to selectively attenuate pulses having a magnitude less than a threshold of the thresholding filter.

12. An optical system for guiding and/or targeting, the optical system comprising:
an optical source configured to generate a first beam of light; and
a modulator configured to modulate the first beam of light to generate a second beam of light;
wherein:
the second beam of light comprises a first portion;
photons of the first portion arrive at a target, after traveling through a variably refractive medium, according to a temporal distribution curve; and
a full-width-at-half-maximum value (FWHM value) of the temporal distribution curve is greater than a coherence time value equal to a coherence length of the first portion divided by a speed of light through the variably refractive medium.

13. A method for power beaming, the method comprising:
generating, by an optical source, a beam of light; and
transmitting the beam of light through a variably refractive medium to a target system;
wherein:
photons of the beam of light arrive at the target system, after traveling through a variably refractive medium, according to a propagation time distribution curve,
the target system uses the beam of light to remotely power the target system,
the beam of light has a coherence length, and
the coherence length is less than the propagation time distribution curve.

14. The method of claim 13, wherein the optical source comprises an ultra-short pulse laser (USPL) source.

15. The method of claim 13, wherein the coherence length of the beam of light is less than 400 microns.

16. The method of claim 13, wherein the target system is located at least 0.5 miles from the optical source.

17. The method of claim 13, further comprising modulating the beam of light to encode data for transmission to the target system, and the target system is configured to re-transmit the data to a second target system.

18. The method of claim 13, wherein the target system comprises a photovoltaic cell configured to convert the beam of light into electrical power.

19. The method of claim 13, wherein a full width at half maximum (FWHM) value of the propagation time distribution curve is at least three times as large as a coherence time value of the beam of light.

20. The method of claim 13, wherein the optical source is located on Earth and the target system is located on a satellite in Earth orbit.

* * * * *